US012607792B2

(12) United States Patent
Aminaka et al.

(10) Patent No.: US 12,607,792 B2
(45) Date of Patent: Apr. 21, 2026

(54) CIRCULARLY POLARIZING PLATE AND SELF-LUMINOUS DISPLAY DEVICE

(71) Applicant: FUJIFILM Corporation, Tokyo (JP)

(72) Inventors: Eiichiro Aminaka, Kanagawa (JP); Shinya Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 274 days.

(21) Appl. No.: 18/612,697

(22) Filed: Mar. 21, 2024

(65) Prior Publication Data

US 2024/0264349 A1 Aug. 8, 2024

Related U.S. Application Data

(63) Continuation of application No. PCT/JP2022/035087, filed on Sep. 21, 2022.

(30) Foreign Application Priority Data

Sep. 29, 2021 (JP) ................................ 2021-158579

(51) Int. Cl.
*G02B 5/30* (2006.01)

(52) U.S. Cl.
CPC .................................. *G02B 5/3016* (2013.01)

(58) Field of Classification Search
CPC ...... G02B 5/3016; G02B 5/30; G02B 5/3008; G02B 5/3083; G02F 1/13; G02F 1/133;
(Continued)

(56) References Cited

U.S. PATENT DOCUMENTS

2009/0153783 A1 6/2009 Umemoto
2015/0378068 A1 12/2015 Hatanaka
(Continued)

FOREIGN PATENT DOCUMENTS

JP 2009-145776 A 7/2009
JP 4902516 B2 3/2012
(Continued)

OTHER PUBLICATIONS

International Search Report Issued in PCT/JP2022/035087 on Nov. 15, 2022.
(Continued)

*Primary Examiner* — Arnel C Lavarias
(74) *Attorney, Agent, or Firm* — Edwards Neils LLC; Jean C. Edwards, Esq.

(57) ABSTRACT

A circularly polarizing plate capable of suppressing occurrence of light leakage at a corner portion in a display device and suppressing the corner portion from being conspicuous in a reflected image when the circularly polarizing plate is used in a self-luminous display device in a high-temperature and changing humidity environment; and a self-luminous display device. The circularly polarizing plate includes, in order, a retardation layer, and first and second light-absorbing anisotropic layers, where a support is not provided between any of the three layers; the first light-absorbing anisotropic layer has an absorption axis in a plane of the first light-absorbing anisotropic layer; an angle θ between a transmittance central axis of the second light-absorbing anisotropic layer and a normal direction to the second light-absorbing anisotropic layer surface is 0° or more and 45° or less; and a thermal shrinkage force of the circularly polarizing plate is 5 N/m or less.

20 Claims, 2 Drawing Sheets

(58) Field of Classification Search
CPC .. G02F 1/1333; G02F 1/1335; G02F 1/13356; G02F 1/133562; G02F 1/13363; G02F 1/133638; G02F 1/133635
USPC ............ 359/483.01, 487.01, 487.02, 487.05, 359/487.06, 489.01, 489.07, 489.15; 362/19; 353/20; 349/117, 119, 162; 345/32, 76, 84, 87
See application file for complete search history.

(56) References Cited

U.S. PATENT DOCUMENTS

| | | | |
|---|---|---|---|
| 2019/0162889 A1 | 5/2019 | Delbaere et al. | |
| 2023/0037017 A1 | 2/2023 | Yamada et al. | |
| 2024/0069264 A1* | 2/2024 | Yoshinari | G02B 1/08 |

FOREIGN PATENT DOCUMENTS

| | | | | | |
|---|---|---|---|---|---|
| JP | 2016-027387 | A | | 2/2016 | |
| JP | 2018-022153 | A | | 2/2018 | |
| JP | 2019-522245 | A | | 8/2019 | |
| JP | 2020-122854 | A | | 8/2020 | |
| KR | 10-2020-0065428 | A | | 6/2020 | |
| WO | 2015/129706 | A1 | | 9/2015 | |
| WO | 2021/124803 | A1 | | 6/2021 | |
| WO | 2021/177308 | A1 | | 9/2021 | |
| WO | WO-2022234789 | A1 | * | 11/2022 | G09F 9/30 |

OTHER PUBLICATIONS

Written Opinion Issued in PCT/JP2022/035087 on Nov. 15, 2022.
International Preliminary Report on Patentability Issued in PCT/JP2022/035087 on Apr. 2, 2024.
Office Action, which was issued by the Korean Intellectual Property Office on Dec. 16, 2025, in connection with Korean Patent Application No. 10-2024-7007988.

* cited by examiner

CIRCULARLY POLARIZING PLATE AND SELF-LUMINOUS DISPLAY DEVICE

CROSS-REFERENCE TO RELATED APPLICATIONS

This application is a Continuation of PCT International Application No. PCT/JP2022/035087 filed on Sep. 21, 2022, which was published under PCT Article 21(2) in Japanese, and which claims priority under 35 U.S.C. § 119(a) to Japanese Patent Application No. 2021-158579 filed on Sep. 29, 2021. The above applications are hereby expressly incorporated by reference, in their entirety, into the present application.

BACKGROUND OF THE INVENTION

1. Field of the Invention

The present invention relates to a circularly polarizing plate and a self-luminous display device.

2. Description of the Related Art

In a case where an in-vehicle display such as a car navigation system is used, there is a problem in that light emitted upward from a display screen is reflected on a windshield or the like and interferes with driving.

In order to solve such a problem, for example, JP4902516B discloses "a viewing angle control system comprising a first polarizer and a second polarizer, which are in a form of a film and contain an absorption dichroic substance, in which the first polarizer has an absorption axis in a plane of the film, the second polarizer has a dichroic compound aligned in a liquid crystal polymer matrix, the alignment is fixed, and an angle between the absorption axis and a normal line to a surface of the film is 0° to 45°" ([claim 1]).

SUMMARY OF THE INVENTION

The present inventors have conducted studies on a self-luminous display device in which the viewing angle control system disclosed in JP4902516B is disposed, and have thus found that light leakage occurs in a corner portion of the display device due to use in a high-temperature environment and an environment in which humidity changes, and the corner portion in a reflected image is noticeable due to the light leakage.

Therefore, an object of the present invention is to provide a circularly polarizing plate capable of suppressing occurrence of light leakage at a corner portion in a display device and suppressing the corner portion from being conspicuous in a reflected image in a case where the circularly polarizing plate is used in a self-luminous display device in a high-temperature environment and an environment in which humidity changes; and a self-luminous display device.

As a result of intensive studies conducted by the present inventors in order to achieve the above-described object, it has been found that, in a case where a circularly polarizing plate including a retardation layer, a first light-absorbing anisotropic layer, and a second light-absorbing anisotropic layer, in which a thermal shrinkage force is set to 5 N/m or less, is used in a self-luminous display device in a high-temperature environment and an environment in which humidity changes, the occurrence of light leakage at the corner portion in the display device is suppressed and the corner portion is inconspicuous in the reflected image, thereby completing the present invention.

That is, the present inventors have found that the above-described object can be achieved by employing the following configurations.

[1] A circularly polarizing plate comprising, in the following order:

a retardation layer;

a first light-absorbing anisotropic layer; and a second light-absorbing anisotropic layer, in which a support is not provided between any layers of the retardation layer, the first light-absorbing anisotropic layer, and the second light-absorbing anisotropic layer, the first light-absorbing anisotropic layer has an absorption axis in a plane of the first light-absorbing anisotropic layer, an angle θ between a transmittance central axis of the second light-absorbing anisotropic layer and a normal direction to a surface of the second light-absorbing anisotropic layer is 0° or more and 450 or less, and a thermal shrinkage force of the circularly polarizing plate is 5 N/m or less.

[2] The circularly polarizing plate according to [1], in which a dehumidification shrinkage force of the circularly polarizing plate is 30 N/m or less.

[3] The circularly polarizing plate according to [1] or [2], in which both the first light-absorbing anisotropic layer and the second light-absorbing anisotropic layer are layers formed from a liquid crystal composition containing a liquid crystalline compound and a dichroic substance.

[4] The circularly polarizing plate according to any one of [1] to [3], in which the retardation layer is a layer formed from a liquid crystal composition containing a liquid crystalline compound.

[5] The circularly polarizing plate according to any one of [1] to [4], in which a total thickness of the circularly polarizing plate is 10 to 100 μm.

[6] The circularly polarizing plate according to any one of [1] to [5], in which all of the retardation layer, the first light-absorbing anisotropic layer, and the second light-absorbing anisotropic layer are laminated through pressure-sensitive adhesive layers.

[7] The circularly polarizing plate according to [6], in which a thickness of one layer of the pressure-sensitive adhesive layers is 2 to 50 μm.

[8] The circularly polarizing plate according to [6] or [7], in which a storage elastic modulus of the pressure-sensitive adhesive layer is 0.1 to 20 MPa.

[9] The circularly polarizing plate according to any one of [1] to [8], in which the thermal shrinkage force is 0.1 to 5 N/m.

[10] The circularly polarizing plate according to any one of [1] to [9], in which a dehumidification shrinkage force of the circularly polarizing plate is 5 to 30 N/m.

[11] A self-luminous display device in which the circularly polarizing plate according to any one of [1] to [10] is bonded to a panel on a viewing side through a pressure-sensitive adhesive layer.

[12] The self-luminous display device according to [11], in which the self-luminous display device is used for in-vehicle applications.

According to the present invention, it is possible to provide a circularly polarizing plate capable of suppressing occurrence of light leakage at a corner portion in a display device and suppressing the corner portion from being conspicuous in a reflected image in a case where the circularly polarizing plate is used in a self-luminous display device in a high-temperature environment and an environment in which humidity changes; and a self-luminous display device.

DESCRIPTION OF THE PREFERRED EMBODIMENTS

Figure 1:
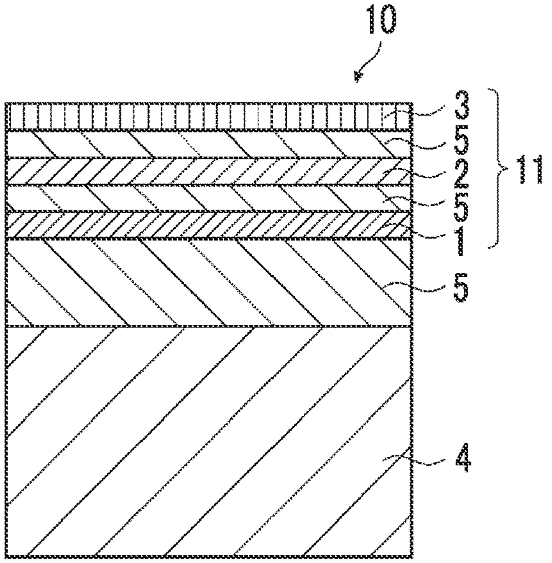
FIG. 1 is a schematic cross-sectional view of a self-luminous display device to which a circularly polarizing plate produced in Example 1 is applied.

Hereinafter, the present invention will be described in detail.

Although configuration requirements to be described below are described based on representative embodiments of the present invention, the present invention is not limited to the embodiments.

Any numerical range expressed using "to" in the present specification refers to a range including the numerical values before and after the "to" as a lower limit value and an upper limit value, respectively.

In addition, in the present specification, parallel and orthogonal do not respectively indicate parallel and orthogonal in a strict sense, but respectively indicate a range of parallel ±5° and a range of orthogonal ±5°.

In addition, in the present specification, concepts of a liquid crystalline composition and a liquid crystalline compound also include those that no longer exhibit liquid crystallinity due to curing or the like.

In addition, in the present specification, substances corresponding to respective components may be used alone or in combination of two or more kinds thereof. Here, in a case where two or more kinds of substances corresponding to respective components are used in combination, the content of the components indicates the total content of the substances used in combination unless otherwise specified.

In addition, in the present specification, "(meth)acrylate" denotes "acrylate" or "methacrylate", "(meth)acryl" denotes "acryl" or "methacryl", and "(meth)acryloyl" denotes "acryloyl" or "methacryloyl".

[Substituent W]

A substituent W used in the present specification represents any of the following groups. Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an alkylamino group having 1 to 10 carbon atoms, an alkylaminocarbonyl group, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a hetero ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($—B(OH)_2$), a phosphate group ($—OPO(OH)_2$), a sulfate group ($—OSO_3H$), and other known substituents.

Details of the substituent are described in paragraph [0023] of JP2007-234651A.

In addition, the substituent W may be a group represented by Formula (W1).

$$*—LW—SPW—Q \tag{W1}$$

In Formula (W1), LW represents a single bond or a divalent linking group, SPW represents a divalent spacer group, Q represents Q1 or Q2 in Formula (LC) described later, and * represents a bonding position.

Examples of the divalent linking group represented by LW include —O—, $—(CH_2)_g—$, $—(CF_2)_g—$, $—Si(CH_3)_2—$, $—(Si(CH_3)_2O)_g—$, $—(OSi(CH_3)_2)_g—$ (g represents an integer of 1 to 10), —N(Z)—, —C(Z)=C(Z')—, —C(Z)=N—, —N=C(Z)—, $—C(Z)_2—C(Z')_2—$, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. LW may be a group in which two or more of these groups are combined (hereinafter, also abbreviated as "L-C").

Examples of the divalent spacer group represented by SPW include a linear, branched, or cyclic alkylene group having 1 to 50 carbon atoms, and a heterocyclic group having 1 to 20 carbon atoms.

The carbon atoms of the alkylene group and the heterocyclic group may be substituted with —O—, $—Si(CH_3)_2—$, $—(Si(CH_3)_2O)_g—$, $—(OSi(CH_3)_2)_g—$ (g represents an integer of 1 to 10), —N(Z)—, —C(Z)=C(Z')—, —C(Z)=N—, —N=C(Z)—, $—C(Z)_2—C(Z')_2—$, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z" each independently represent hydrogen, an alkyl group having 1 to 4 carbon atoms, a cycloalkyl group, an aryl group, a cyano group, or a halogen atom), —C≡C—, —N═N—, —S—, —C(S)—, —S(O)—, —$SO_2$—, —(O)S(O)O—, —O(O)S(O)O—, —SC(O)—, —C(O)S—, or a group obtained by combining two or more of these groups (hereinafter, also abbreviated to as "SP—C").

The hydrogen atom of the above-described alkylene group or the hydrogen atom of the heterocyclic group may be substituted with a halogen atom, a cyano group, —$Z^H$, —OH, —$OZ^H$, —COOH, —C(O)$Z^H$, —C(O)$OZ^H$, —OC(O)$Z^H$, —OC(O)$OZ^H$, —$NZ^HZ^{H'}$, —$NZ^H$C(O)$Z^{H'}$, —$NZ^H$C(O)$OZ^{H'}$, —C(O)$NZ^HZ^{H'}$, —OC(O)$NZ^HZ^{H'}$, —$NZ^H$C(O)$NZ^{H'}OZ^{H''}$, —SH, —$SZ^H$, —C(S)$Z^H$, —C(O)$SZ^H$, or —SC(O)$Z^H$ (hereinafter, also abbreviated as "SP—H"). Here, $Z^H$ and $Z^{H'}$ represent an alkyl group having 1 to 10 carbon atoms, a halogenated alkyl group, or -L-CL (L represents a single bond or a divalent linking group, and specific examples of the divalent linking group are the same as those for LW and SPW described above; CL represents a crosslinkable group, examples thereof include a group represented by Q1 or Q2 in Formula (LC) described later, and a crosslinkable group represented by Formulae (P-1) to (P-30) described later is preferable).

[Circularly Polarizing Plate]

The circularly polarizing plate according to the embodiment of the present invention is a circularly polarizing plate including, in the following order, a retardation layer, a first light-absorbing anisotropic layer, and a second light-absorbing anisotropic layer.

In addition, in the circularly polarizing plate according to the embodiment of the present invention, a support is not provided between any layers of the retardation layer, the first light-absorbing anisotropic layer, and the second light-absorbing anisotropic layer.

In addition, in the circularly polarizing plate according to the embodiment of the present invention, the first light-absorbing anisotropic layer has an absorption axis in a plane of the first light-absorbing anisotropic layer, and an angle θ between a transmittance central axis of the second light-absorbing anisotropic layer and a normal direction to a surface of the second light-absorbing anisotropic layer (hereinafter, also abbreviated as "transmittance central axis angle θ") is 0° or more and 45° or less.

In addition, the circularly polarizing plate according to the embodiment of the present invention has a thermal shrinkage force of 5 N/m or less.

In addition, the circularly polarizing plate according to the embodiment of the present invention preferably has a dehumidification shrinkage force of 30 N/m or less.

A layer configuration of the circularly polarizing plate of the embodiment of the present invention is not particularly limited as long as it has a layer configuration including a retardation layer (hereinafter, also abbreviated as "first retardation layer"), a first light-absorbing anisotropic layer, and a second light-absorbing anisotropic layer in this order as described above; and the circularly polarizing plate according to the embodiment of the present invention may include a second retardation layer on a side of the first retardation layer opposite to the first light-absorbing anisotropic layer, a third retardation layer and/or a fourth retardation layer between the first light-absorbing anisotropic layer and the second light-absorbing anisotropic layer, or a fifth retardation layer on a side of the second light-absorbing anisotropic layer opposite to the first light-absorbing anisotropic layer.

As described above, in the layer configuration of the circularly polarizing plate according to the embodiment of the present invention, a support is not provided between any layers of the retardation layer, the first light-absorbing anisotropic layer, and the second light-absorbing anisotropic layer.

Here, the support is a polymer film used as a base material in a case where each of the retardation layer, the first light-absorbing anisotropic layer, and the second light-absorbing anisotropic layer is formed by coating, and in general, a polymer film having a thickness of 10 to 100 μm, a thermal shrinkage force of 4 N/m or more, and a dehumidification shrinkage force of 50 N/m or more is used.

Here, regarding the first light-absorbing anisotropic layer, the absorption axis means a direction in which light absorption is maximized.

Specifically, a direction of the absorption axis can be specified from an angle at which the transmittance is minimized by rotating a sample of the first light-absorbing anisotropic layer set in a commercially available automatic polarizing film measurement device equipped with a polarizer having a known absorption axis direction.

In addition, regarding the second light-absorbing anisotropic layer, the transmittance central axis means a direction exhibiting the highest transmittance in a case where the transmittance is measured by changing a tilt angle (polar angle) and a tilt direction (azimuthal angle) with respect to the normal direction to the surface of the light-absorbing anisotropic layer.

Specifically, Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the surface of the light-absorbing anisotropic layer in the normal direction is changed from −70° to 700 at intervals of 1° in the surface (the plane which has the transmittance central axis and is orthogonal to the layer surface) having the normal direction of the light-absorbing anisotropic layer along the azimuthal angle thereof, and the transmittance of the light-absorbing anisotropic layer is derived. As a result, the direction at which the highest transmittance is exhibited is defined as the transmittance central axis.

In addition, the thermal shrinkage force of the circularly polarizing plate refers to a value measured by the following procedure.

First, a strip-shaped sample piece having 32 mm in length×3 mm in width is collected from the circularly polarizing plate along the absorption axis direction of the first light-absorbing anisotropic layer.

Next, the sample piece is set with an initial chuck-to-chuck distance of 25 mm in a load variation measurement mode of a thermomechanical analyzer (manufactured by Rigaku Corporation, TMA8310). In a case where the size of the sample piece is different from the above, the initial chuck-to-chuck distance of the thermomechanical analyzer can be changed according to the size of the sample piece. Specifically, the chuck-to-chuck distance is set such that the ratio of the length of the sample piece to the chuck-to-chuck distance is 32:25, and the sample piece is set.

The sample is held at an initial temperature of 25° C. for 5 minutes, heated to 95° C. at a heating rate of 5° C./min, and held for 30 minutes.

An increase in load after the holding at 95° C. for 5 minutes with respect to load after the holding at the initial temperature of 25° C. for 30 minutes is measured and defined as the thermal shrinkage force.

In addition, the dehumidification shrinkage force of the circularly polarizing plate refers to a value measured by the following procedure.

First, a strip-shaped sample piece having 32 mm in length×3 mm in width is collected from the circularly polarizing plate along the absorption axis direction of the first light-absorbing anisotropic layer.

Next, the sample piece is set with an initial chuck-to-chuck distance of 25 mm in a load variation measurement mode of a thermomechanical analyzer (manufactured by Rigaku Corporation, TMA8310). In a case where the size of the sample piece is different from the above, the initial chuck-to-chuck distance of the thermomechanical analyzer can be changed according to the size of the sample piece. Specifically, the chuck-to-chuck distance is set such that the ratio of the length of the sample piece to the chuck-to-chuck distance is 32:25, and the sample piece is set.

Next, the state is maintained at a temperature of 30° C. and 50% RH (relative humidity) as an initial state for 10 minutes, allowed to reach an intermediate state of 30° C. and 80% RH at a humidification rate of 0.5% RH/min, and then maintained for 10 min.

Thereafter, the sample piece is allowed to reach a final state of 30° C. and 25% RH at a dehumidification rate of 1% RH/min and is held for 20 min.

An increase in load after the holding in the intermediate state at 30° C. and 80% RH for 10 minutes with respect to load after the holding in the final state at 30° C. and 25% RH for 20 minutes is measured and defined as the dehumidification shrinkage force.

In the present invention, in order to suppress a change in absorption axis of the light-absorbing anisotropic layer or in slow axis of the retardation layer in a plane of the circularly polarizing plate during heating, the thermal shrinkage force of the circularly polarizing plate is preferably 0.1 to 5 N/m, more preferably 0.1 to 2 5 N/m, still more preferably 0.1 to 1 5 N/m, and particularly preferably 0.1 to 1 0 N/m.

In addition, in order to suppress a change in absorption axis of the light-absorbing anisotropic layer or in slow axis of the retardation layer in a plane of the circularly polarizing plate during dehumidification, the dehumidification shrinkage force of the circularly polarizing plate is preferably 5 to 30 N/m, more preferably 5 to 28 N/m, and still more preferably 8 to 25 N/m.

Here, the thermal shrinkage force and the dehumidification shrinkage force in the circularly polarizing plate can be adjusted, for example, by adjusting materials of the retardation layer, the first light-absorbing anisotropic layer, and the second light-absorbing anisotropic layer, thicknesses thereof, and the number of retardation layers.

In the present invention, in order to reduce the thermal shrinkage force and the dehumidification shrinkage force of the circularly polarizing plate, the total thickness of the circularly polarizing plate is preferably 10 to 100 μm, more preferably 20 to 90 μm, and still more preferably 30 to 80 μm.

Hereinafter, the retardation layer (first retardation layer), the first light-absorbing anisotropic layer and the second light-absorbing anisotropic layer, and any other retardation layers (second to fifth retardation layers), which are included in the circularly polarizing plate according to the embodiment of the present invention, will be described.

In the following description, since it is not necessary to particularly distinguish the retardation layer (first retardation layer) as an essential configuration requirement from other retardation layers (second to fifth retardation layers) as optional configuration requirements, these will be collectively described as a retardation layer.

[Retardation Layer]

The retardation layer included in the circularly polarizing plate according to the embodiment of the present invention is not particularly limited, and for example, a positive A-plate, a negative A-plate, a positive C-plate, a negative C-plate, a B-plate, an O-plate, and the like can be used.

Among these, a positive A-plate or a positive C-plate is preferable, and a positive A-plate is more preferable.

Here, the positive A-plate and the positive C-plate are defined as follows.

The positive A-plate satisfies a relationship of Expression (A1) and the positive C-plate satisfies a relationship of Expression (C1), assuming that a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz. The positive A-plate has an Rth showing a positive value and the positive C-plate has an Rth showing a negative value.

Expression (A1)

$$nx > ny \approx nz$$

Expression (C1)

$$nz > nx \approx ny$$

The symbol "≈" encompasses not only a case where both sides are completely the same as each other but also a case where the both sides are substantially the same as each other. With regard to the positive A plate, the expression "substantially the same" means that, for example, a case where (ny−nz)×d (in which d is a thickness of a film) is −10 to 10 nm and preferably −5 to 5 nm is also included in "ny≈nz"; and a case where (nx−nz)×d is −10 to 10 nm and preferably −5 to 5 nm is also included in "nx≈nz". In addition, with regard to the positive C-plate, for example, a case where (nx−ny)×d (in which d is a thickness of a film) is 0 to 10 nm, and preferably 0 to 5 nm is also included in "nx≈ny".

In a case where the retardation layer is the positive A-plate, from the viewpoint that the retardation layer functions as a λ/4 plate, Re(550) is preferably 100 to 180 nm, more preferably 120 to 160 nm, still more preferably 130 to 150 nm, and particularly preferably 130 to 145 nm.

Here, the "λ/4 plate" is a plate having a λ/4 function, specifically, a plate having a function of converting linearly polarized light having a specific wavelength into circularly polarized light (or converting circularly polarized light into linearly polarized light).

In the present invention, since a desired retardation value can be achieved with a thin film thickness and a dimensional change rate due to changes in heat or humidity can be reduced, the above-described retardation layer is preferably a layer formed from a liquid crystal composition containing a liquid crystalline compound, and more preferably a layer formed by fixing an alignment state of the liquid crystal composition containing a liquid crystalline compound.

Examples of a method of forming the retardation layer include a method in which a liquid crystal composition containing a liquid crystalline compound is used for forming a desired alignment state, and then the alignment state is fixed by polymerization.

Here, polymerization conditions are not particularly limited, but ultraviolet rays are preferably used in the polymerization by light irradiation. An irradiation amount is preferably 10 $mJ/cm^2$ to 50 $J/cm^2$, more preferably 20 $mJ/cm^2$ to 5 $J/cm^2$, still more preferably 30 $mJ/cm^2$ to 3 $J/cm^2$, and particularly preferably 50 to 1,000 $mJ/cm^2$. In order to promote the polymerization reaction, the treatment may be performed under heating conditions.

The type of the liquid crystalline compound contained in the liquid crystal composition is not particularly limited, and examples thereof include compounds capable of being aligned in any of homeotropic alignment, homogeneous alignment, hybrid alignment, or cholesteric alignment.

Here, in general, the liquid crystalline compound can be classified into a rod-like type and a disk-like type based on the shape thereof. Furthermore, each type includes a low molecular type and a polymer type. The term high molecular generally refers to a compound having a degree of polymerization of 100 or more (Polymer Physics-Phase Transition Dynamics, written by Masao Doi, p. 2, published by Iwanami Shoten, 1992).

In the present invention, any type of liquid crystalline compound can be used, but a rod-like liquid crystalline compound or a disk-like liquid crystalline compound (discotic liquid crystalline compound) is preferably used. Two or more kinds of rod-like liquid crystalline compounds, two or more kinds of disk-like liquid crystalline compounds, or a mixture of the rod-like liquid crystalline compound and the disk-like liquid crystalline compound may be used.

The liquid crystalline compound preferably has a polymerizable group.

Examples of the polymerizable group include an acryloyl group, a methacryloyl group, an epoxy group, and a vinyl group.

By polymerizing a liquid crystalline compound having such a polymerizable group, the alignment of the liquid crystalline compound can be fixed. After the liquid crystalline compound is fixed by polymerization, it is no longer necessary to exhibit liquid crystallinity.

As the rod-like liquid crystalline compound, for example, compounds described in claim 1 of JP1999-513019A (JP-H11-513019A) or paragraphs [0026] to [0098] of JP2005-289980A are preferable, and as the discotic liquid crystalline compound, for example, compounds described in paragraphs [0020] to [0067] of JP2007-108732A or paragraphs [0013] to [0108] of JP2010-244038A are preferable.

In addition, as the liquid crystalline compound, a liquid crystalline compound having reverse wavelength dispersibility may be used.

[First Light-Absorbing Anisotropic Layer and Second Light-Absorbing Anisotropic Layer]

The first light-absorbing anisotropic layer included in the circularly polarizing plate according to the embodiment of the present invention is a light-absorbing anisotropic layer having an absorption axis in a plane.

In addition, the second light-absorbing anisotropic layer included in the circularly polarizing plate according to the embodiment of the present invention is a light-absorbing anisotropic layer in which the transmittance central axis angle θ is 0° or more and 450 or less.

Here, the transmittance central axis angle θ in the second light-absorbing anisotropic layer is preferably 0° or more and less than 45°, more preferably 0° or more and 35° or less, and still more preferably 0° or more and less than 35°.

In the present invention, since a desired transmittance can be achieved with a thin film thickness and a dimensional change rate due to changes in heat or humidity can be reduced, the first light-absorbing anisotropic layer and the second light-absorbing anisotropic layer (hereinafter, also abbreviated as simply "light-absorbing anisotropic layer" unless a particular distinction is required) are preferably light-absorbing anisotropic layers formed from a liquid crystal composition containing a liquid crystalline compound and a dichroic substance. That is, the light-absorbing anisotropic layer is preferably a light-absorbing anisotropic layer obtained by fixing an alignment state of the liquid crystalline compound and the dichroic substance contained in the liquid crystal composition containing a liquid crystalline compound and a dichroic substance.

In addition, the liquid crystal composition may contain an alignment agent, a solvent, a polymerization initiator, a polymerizable compound, an interface improver, and other additives.

Hereinafter, each component will be described.

<Liquid Crystalline Compound>

The liquid crystal composition contains a liquid crystalline compound. By containing the liquid crystalline compound, the dichroic substance can be aligned with a high alignment degree while the precipitation of the dichroic substances is suppressed.

In addition, the liquid crystalline compound contained in the liquid crystal composition can be typically classified into a rod-like type compound and a disk-like type compound depending on the shape thereof.

In addition, the liquid crystalline compound is preferably a liquid crystalline compound which does not exhibit dichroism in a visible region.

In the following description, the expression "the alignment degree of the light-absorbing anisotropic layer to be formed is further increased" is also referred to as "the effect of the present invention is more excellent".

As the liquid crystalline compound, any of a low-molecular-weight low-molecular-weight liquid crystalline compound or a high-molecular-weight liquid crystalline compound can be used.

Here, the "low-molecular-weight liquid crystalline compound" refers to a liquid crystalline compound having no repeating unit in the chemical structure.

In addition, the "high-molecular-weight liquid crystalline compound" refers to a liquid crystalline compound having a repeating unit in the chemical structure.

Examples of the low-molecular-weight liquid crystalline compound include liquid crystalline compounds described in JP2013-228706A.

Examples of the high-molecular-weight liquid crystalline compound include thermotropic liquid crystalline polymers described in JP2011-237513A. In addition, the high-molecular-weight liquid crystalline compound may include a crosslinkable group (such as an acryloyl group and a methacryloyl group) at a terminal.

From the reason that the effect of the present invention is likely to be realized, the liquid crystalline compound is preferably a rod-like liquid crystalline compound and more preferably a high-molecular-weight liquid crystalline compound.

The liquid crystalline compound may be used alone or in combination of two or more kinds thereof.

From the viewpoint that the effect of the present invention is more excellent, the liquid crystalline compound preferably includes the high-molecular-weight liquid crystalline compound, and particularly preferably includes both the high-molecular-weight liquid crystalline compound and the low-molecular-weight liquid crystalline compound.

It is preferable that the liquid crystalline compound includes a liquid crystalline compound represented by Formula (LC), or a polymer thereof. The liquid crystalline compound represented by Formula (LC) or the polymer thereof is a compound exhibiting liquid crystallinity. The liquid crystallinity may be a nematic phase or a smectic phase, or the liquid crystalline compound may exhibit both the nematic phase and the smectic phase, and it is preferable to exhibit at least the nematic phase.

The smectic phase may be a high-order smectic phase. The high-order smectic phase here denotes a smectic B phase, a smectic D phase, a smectic E phase, a smectic F phase, a smectic G phase, a smectic H phase, a smectic I phase, a smectic J phase, a smectic K phase, or a smectic L phase. Among these, a smectic B phase, a smectic F phase, or a smectic I phase is preferable.

In a case where the smectic liquid crystal phase exhibited by the liquid crystalline compound is any of these high-order smectic liquid crystal phases, the light-absorbing anisotropic layer with a higher alignment degree order can be produced. In addition, the light-absorbing anisotropic layer produced from such a high-order smectic liquid crystal phase with a high alignment degree order is a layer in which a Bragg peak derived from a high-order structure such as a hexatic phase and a crystal phase in X-ray diffraction measurement is obtained. The above-described Bragg peak is a peak derived from a plane periodic structure of molecular alignment, and according to the liquid crystal composition according to the present invention, a light-absorbing anisotropic layer having a periodic interval of 3.0 to 5.0 Å can be obtained.

Q1—S1—MG—S2—Q2 (LC)

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a hetero ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—$B(OH)_2$), a phosphate group (—$OPO(OH)_2$), a sulfate group (—$OSO_3H$), or a crosslinkable group represented by any of Formulae (P-1) to (P-30), and it is preferable that at least one of Q1 or Q2 represents a crosslinkable group represented by any of the following formulae.

(P-1)

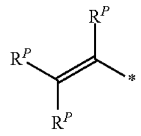

(P-2)

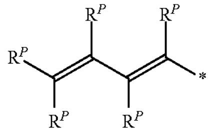

(P-3)

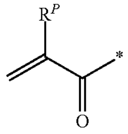

(P-4)

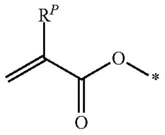

(P-5)

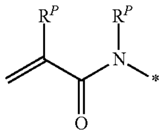

(P-6)

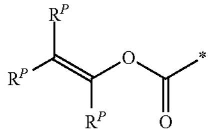

(P-7)

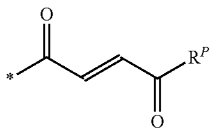

(P-8)

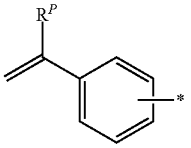

(P-9)

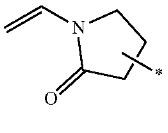

(P-10)

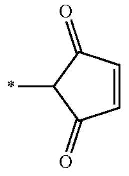

-continued (P-11)

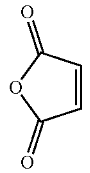

(P-12)

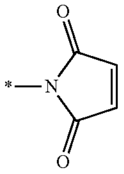

(P-13)

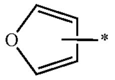

(P-14)

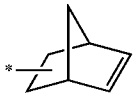

(P-15)

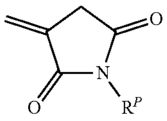

(P-16)

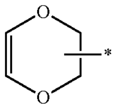

(P-17)

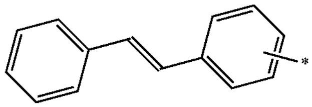

(P-18)

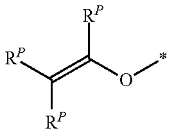

(P-19)

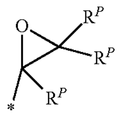

(P-20)

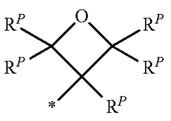

(P-21)

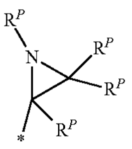

-continued (P-22)

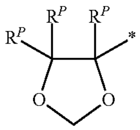

(P-23)

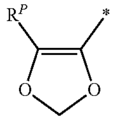

(P-24)

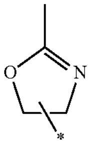

(P-25)

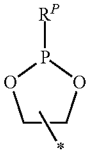

(P-26)

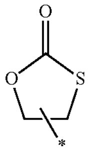

(P-27)

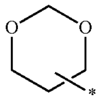

(P-28)

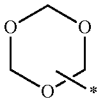

(P-29)

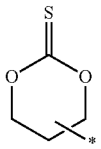

(P-30)

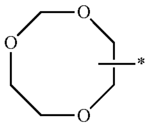

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($—B(OH)_2$), a phosphate group ($—OPO(OH)_2$), or a sulfate group ($—OSO_3H$), and a plurality of $R^P$'s may be the same or different from each other.

Examples of a preferred aspect of the crosslinkable group include a radically polymerizable group and a cationically polymerizable group. As the radically polymerizable group, a vinyl group represented by Formula (P-1), a butadiene group represented by Formula (P-2), a (meth)acryloyl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable. As the cationically polymerizable group, a vinyl ether group represented by Formula (P-18), an epoxy group represented by Formula (P-19), or an oxetanyl group represented by Formula (P-20) is preferable.

In Formula (LC), S1 and S2 each independently represent a divalent spacer group, and suitable aspects of S1 and S2 include the same structures as those for SPW in Formula (W1), and thus the description thereof will not be repeated.

In Formula (LC), MG represents a mesogen group described below. The mesogen group represented by MG is a group representing a main skeleton of a liquid crystal molecule which contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly description in Chapter 3 of "Liquid Crystal Handbook" (Maruzen, 2000) edited by Liquid Crystal Handbook Editing Committee can be referred to.

The mesogen group represented by MG preferably has 2 to 10 cyclic structures and more preferably has 3 to 7 cyclic structures.

Specific examples of the cyclic structure include an aromatic hydrocarbon group, a heterocyclic group, and an alicyclic group.

As the mesogen group represented by MG, from the viewpoint of expressing the liquid crystallinity, adjusting a liquid crystal phase transition temperature, availability of raw materials, and synthetic suitability, and from the viewpoint that the effect of the present invention is more excellent, a group represented by Formula (MG-A) or Formula (MG-B) is preferable, and a group represented by Formula (MG-B) is more preferable.

(MG-A)

$$*\!-\!\!\left(A1\right)_{a1}\!\!-\!*$$

-continued (MG-B)

$$*\!-\!\!\left(A2-LA1\right)_{a2}\!\!-A3-*$$

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. In addition, the divalent group represented by A1 may be a monocyclic ring or a fused ring.

In addition, * represents a bonding position to S1 or S2.

Examples of the divalent aromatic hydrocarbon group represented by A1 include a phenylene group, a naphthylene group, a fluorene-diyl group, an anthracene-diyl group, and a tetracene-diyl group. From the viewpoint of design diversity of the mesogenic skeleton and the availability of raw materials, a phenylene group or a naphthylene group is preferable.

The divalent heterocyclic group represented by A1 may be any of aromatic or non-aromatic, but from the viewpoint of further improving the alignment degree, a divalent aromatic heterocyclic group is preferable.

Examples of atoms other than carbon, constituting the divalent aromatic heterocyclic group, include a nitrogen atom, a sulfur atom, and an oxygen atom. In a case where the aromatic heterocyclic group has a plurality of atoms other than carbon, constituting a ring, these atoms may be the same or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

(II-1)

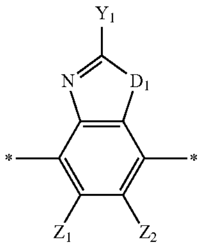

(II-2)

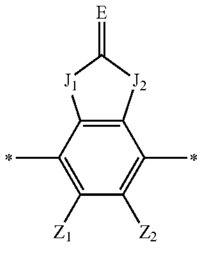

-continued (II-3)

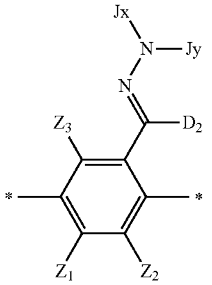

(II-4)

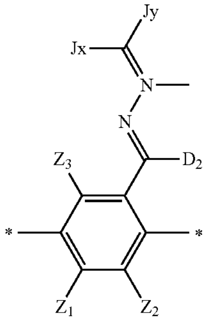

In Formulae (II-1) to (II-4), $D_1$ represents —S—, —O—, or $NR^{11}$—, in which $R^{11}$ represents a hydrogen atom or an alkyl group having 1 to 6 carbon atoms; $Y_1$ represents an aromatic hydrocarbon group having 6 to 12 carbon atoms or an aromatic heterocyclic group having 3 to 12 carbon atoms; $Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, $—NR^{12}R^{13}$, or $—SR^{12}$, in which $Z_1$ and $Z_2$ may be bonded to each other to form an aromatic ring or an aromatic heterocyclic ring, and $R^{12}$ and $R^{13}$ each independently represent a hydrogen atom or an alkyl group having 1 to 6 carbon atoms; $J_1$ and $J_2$ each independently represent a group selected from the group consisting of —O—, $—NR^{21}—$($R^{21}$ represents a hydrogen atom or a substituent), —S—, and C(O)—; E represents a hydrogen atom or a non-metal atom of Group 14 to Group 16, to which a substituent may be bonded; Jx represents an organic group having 2 to 30 carbon atoms, which has at least one aromatic ring selected from the group consisting of an aromatic hydrocarbon ring and an aromatic heterocyclic ring; Jy represents a hydrogen atom, an alkyl group having 1 to 6 carbon atoms, which may have a substituent, or an organic group having 2 to 30 carbon atoms, which has at least one aromatic ring selected from the group consisting of an aromatic hydrocarbon ring and an aromatic heterocyclic ring; the aromatic ring of Jx and Jy may have a substituent, Jx and Jy may be bonded to each other to form a ring; and $D_2$ represents a hydrogen atom or an alkyl group having 1 to 6 carbon atoms, which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $J_1$ and $J_2$ represent $—NR^{21}—$, the substituent as $R^{21}$ can refer to, for example, description in paragraphs 0035 to 0045 of JP2008-107767A, and the content thereof is incorporated in the present specification.

In Formula (II-2), in a case where E represents a non-metal atom of Group 14 to Group 16, to which a substituent may be bonded, =O, =S, =NR', or =C(R')R' is preferable. R' represents a substituent, and as the substituent, for example, description in paragraphs [0035] to [0045] of JP2008-107767A can be referred to, and $—NZ^{A1}Z^{A2}$ ($Z^{A1}$ and $Z^{A2}$ each independently represent a hydrogen atom, an alkyl group, or an aryl group) is preferable.

Specific examples of the divalent alicyclic group represented by A1 include a cyclopentylene group and a cyclohexylene group, and the carbon atoms thereof may be substituted with —O—, $—Si(CH_3)_2—$, —N(Z)— (Z represents hydrogen, an alkyl group having 1 to 4 carbon atoms, a cycloalkyl group, an aryl group, a cyano group, or a halogen atom), —C(O)—, —S—, —C(S)—, —S(O)—, $—SO_2—$, or a group obtained by combining two or more of these groups.

In Formula (MG-A), a1 represents an integer of 2 to 10. A plurality of A1's may be the same or different from each other.

In Formula (MG-B), A2 and A3 each independently represent a divalent group selected from the group consisting of an aromatic hydrocarbon group, a heterocyclic group, and an alicyclic group. Specific examples and suitable aspects of A2 and A3 are the same as those for A1 in Formula (MG-A), and thus the description thereof will not be repeated.

In Formula (MG-B), a2 represents an integer of 1 to 10, a plurality of A2's may be the same or different from each other, and a plurality of LA1's may be the same or different from each other. From the reason that the effect of the present invention is more excellent, it is more preferable that a2 is 2 or more.

In Formula (MG-B), LA1 represents a single bond or a divalent linking group. Here, in a case where a2 is 1, LA1 is a divalent linking group, and in a case where a2 is 2 or more, at least one of a plurality of LA1's is a divalent linking group.

In Formula (MG-B), the divalent linking group represented by LA1 is the same as LW, and thus the description thereof will not be repeated.

Specific examples of MG include the following structures, and the hydrogen atoms on the aromatic hydrocarbon group, the heterocyclic group, and the alicyclic group in the following structures may be substituted with the substituent W described above.

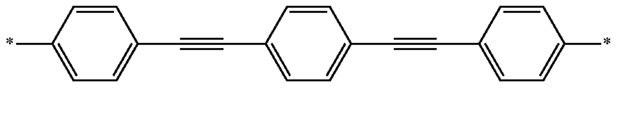

-continued
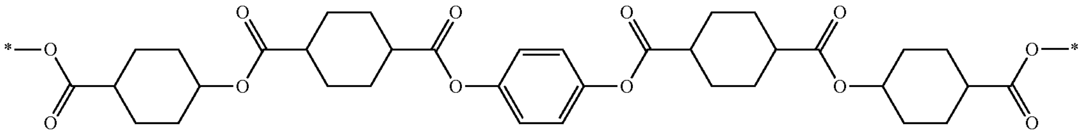
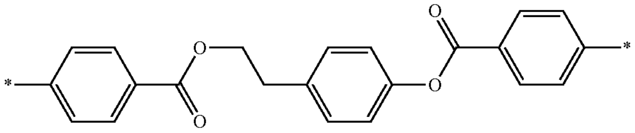
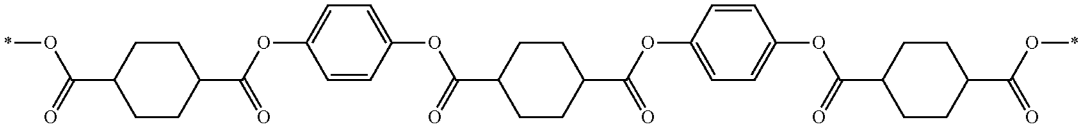
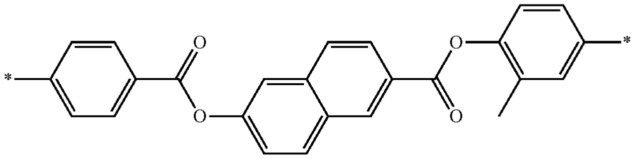
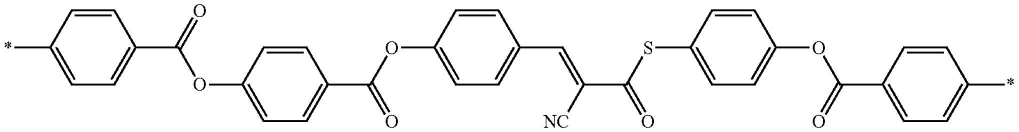
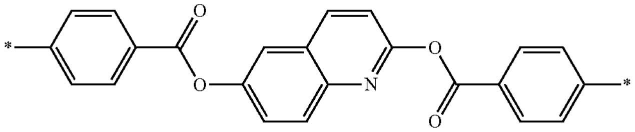
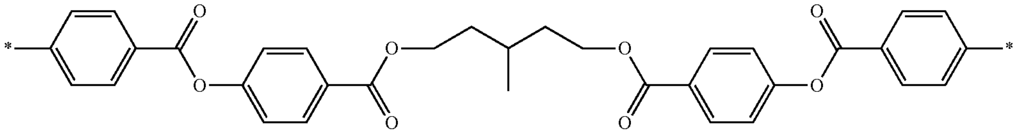
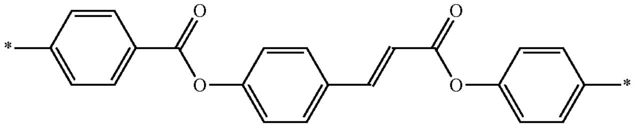
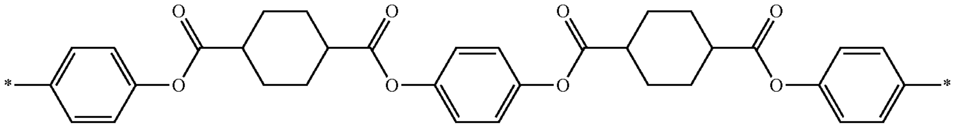
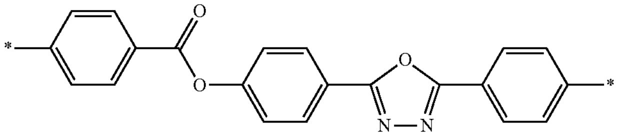
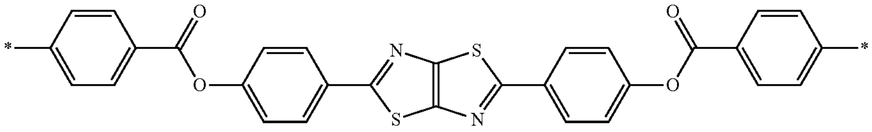
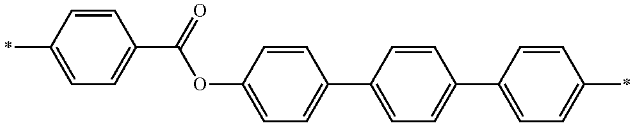
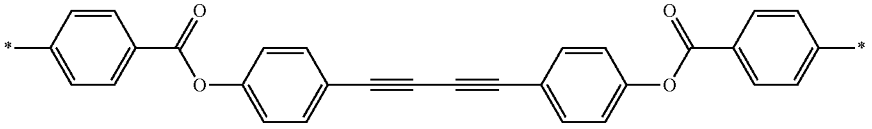

-continued
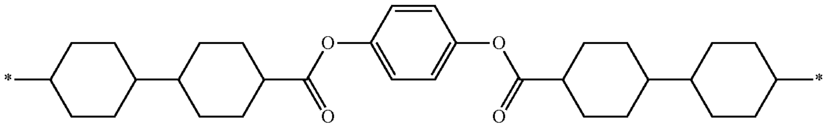
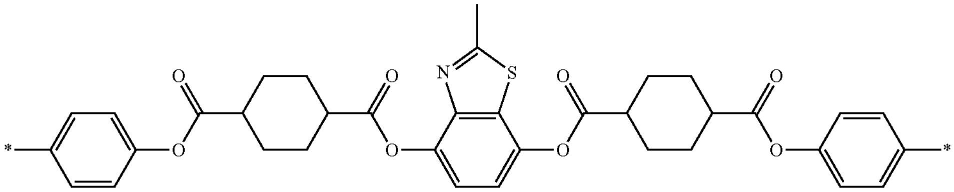
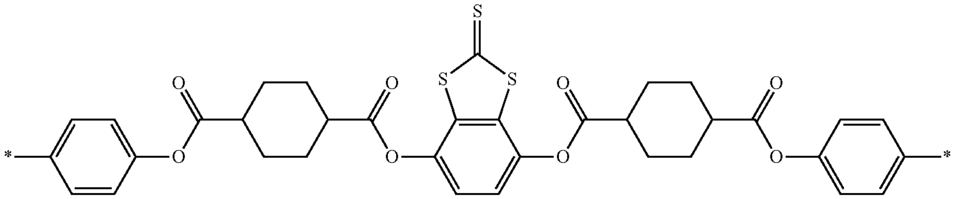
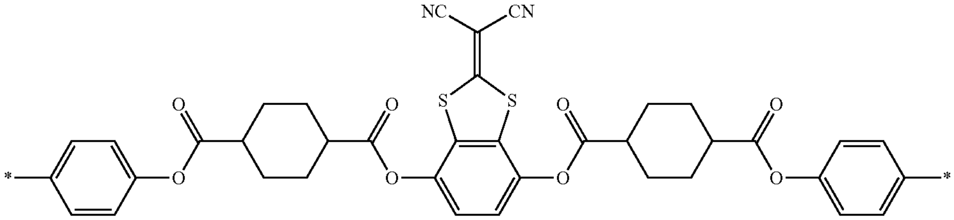
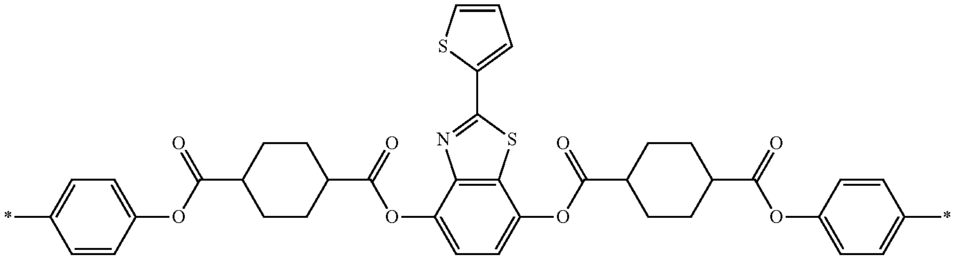
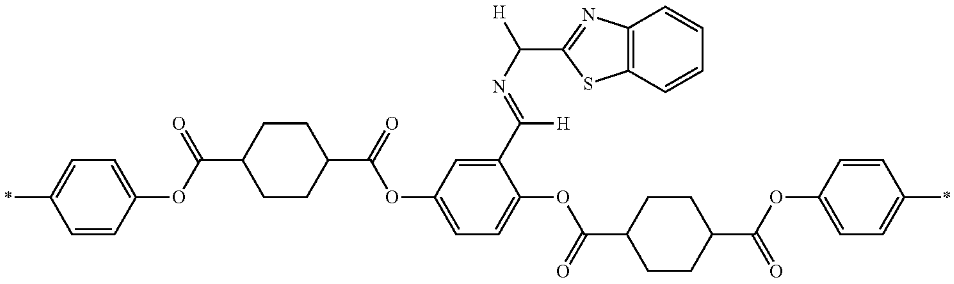
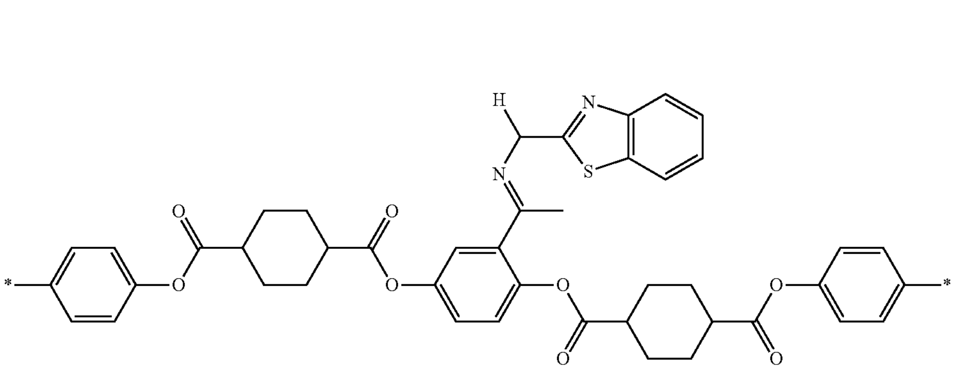

-continued
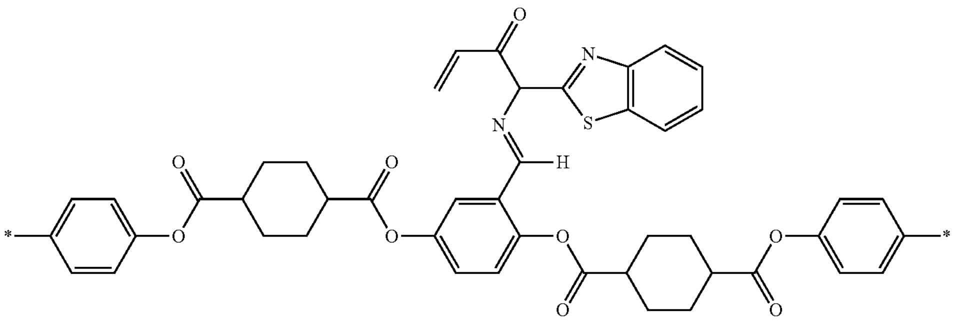
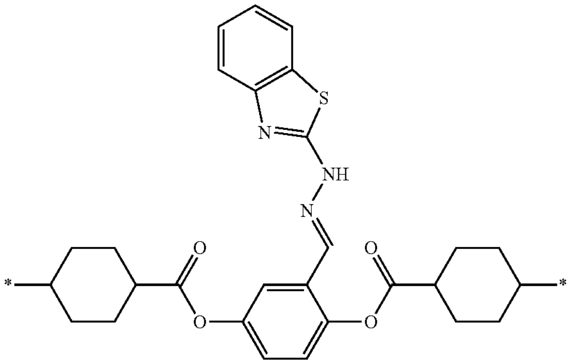
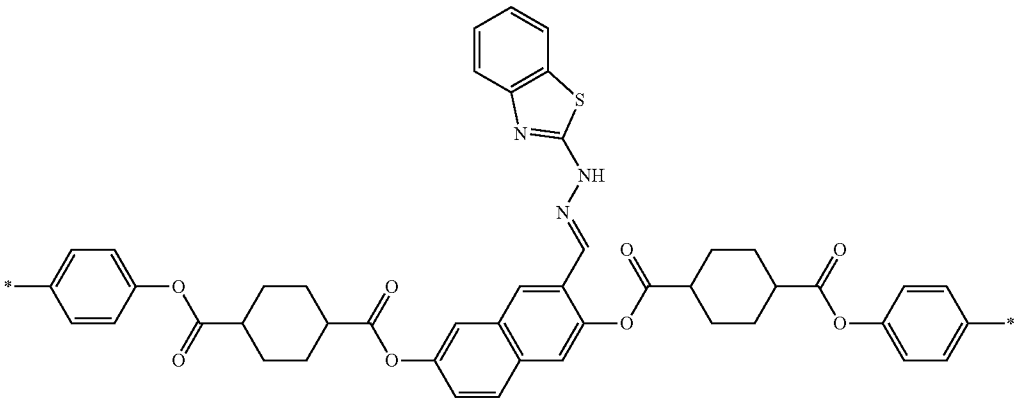
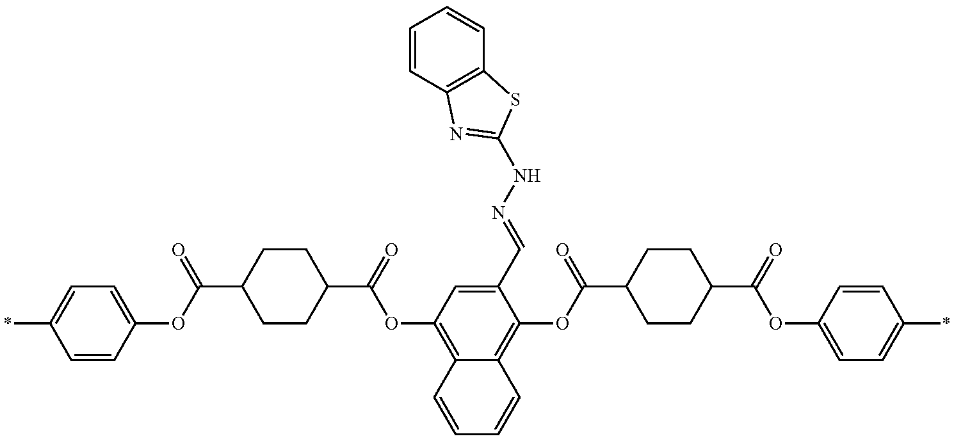

-continued
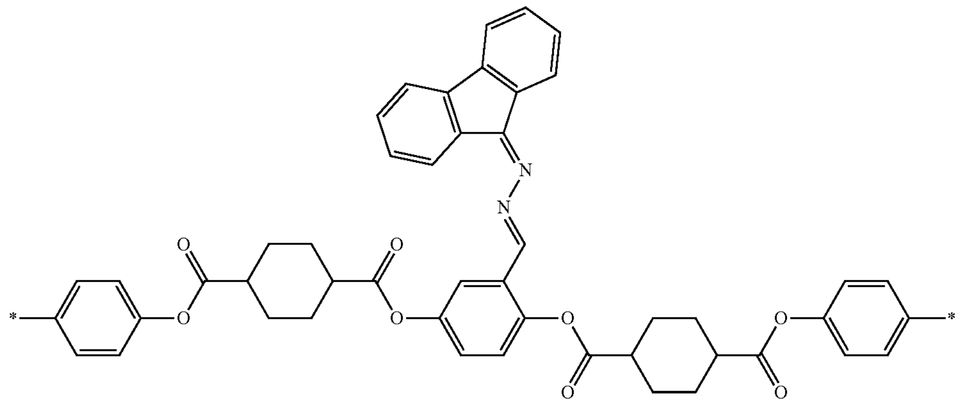
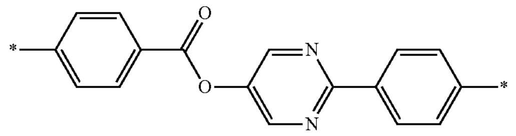
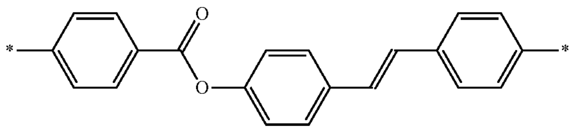
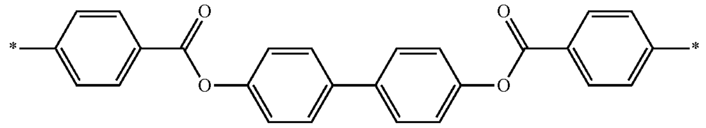
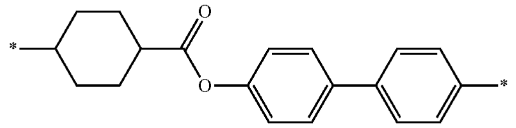
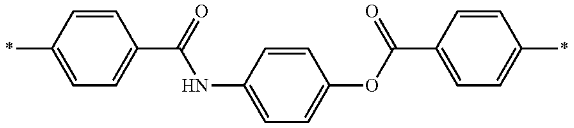
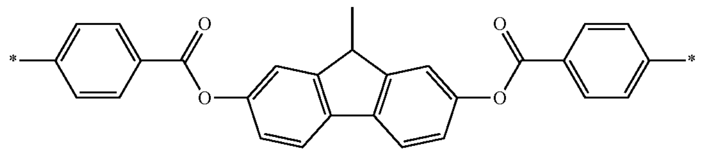
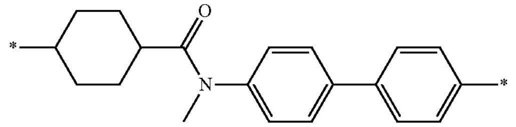
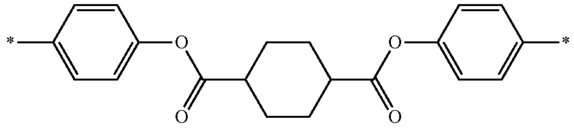
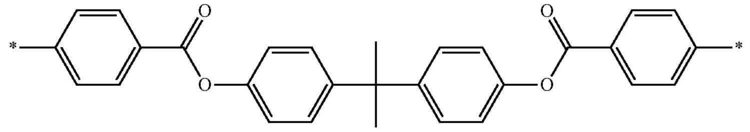
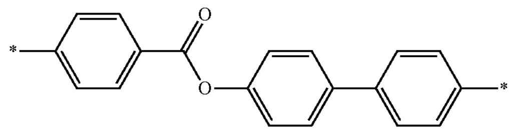
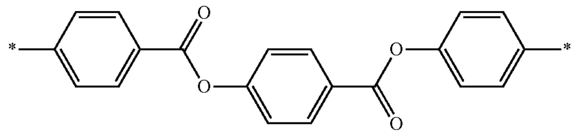
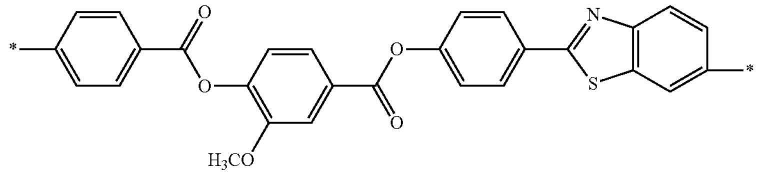
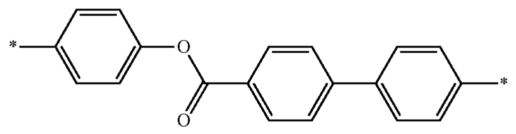
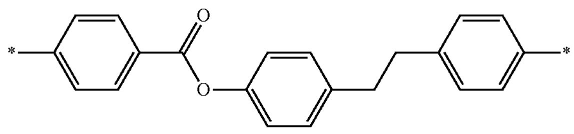

-continued
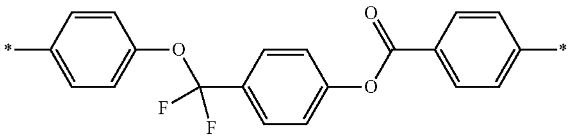
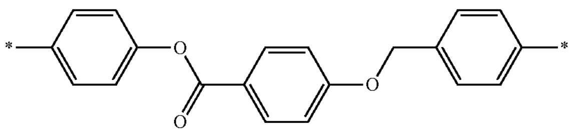
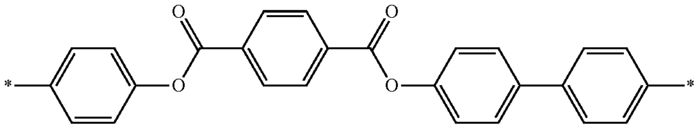
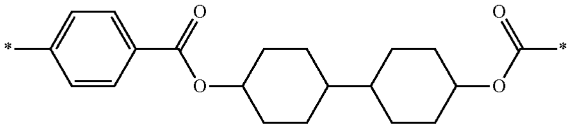
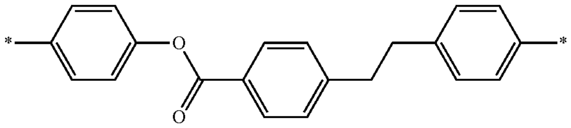
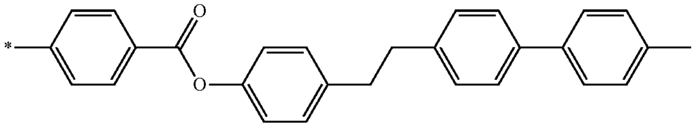
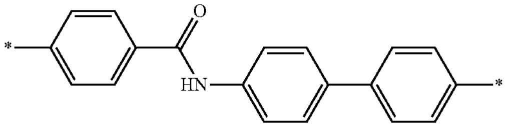
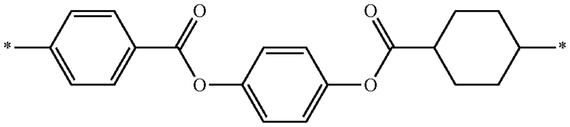
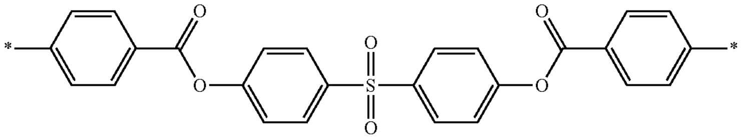
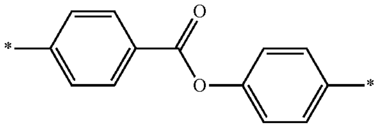
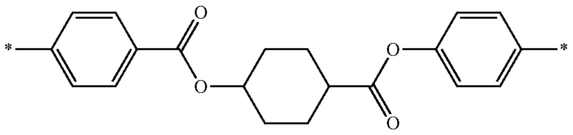
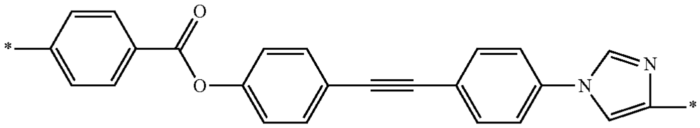
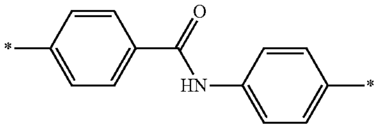
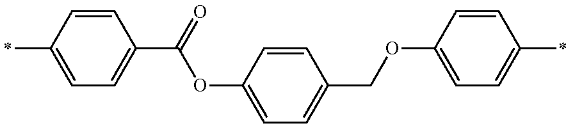
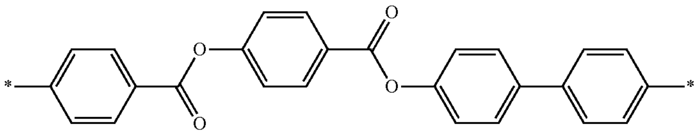
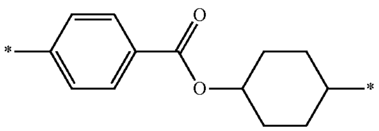
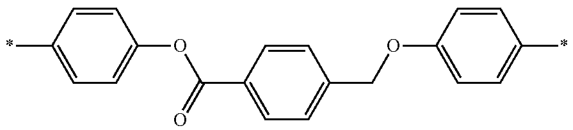
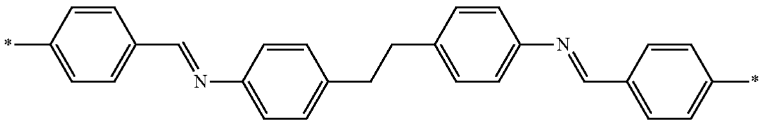
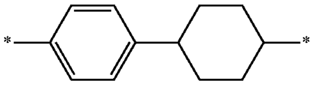
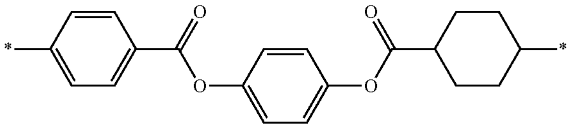

-continued
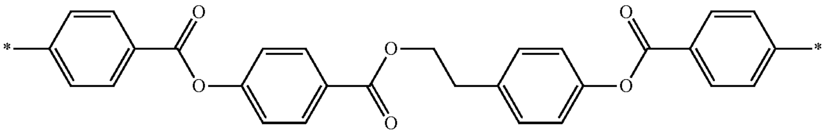
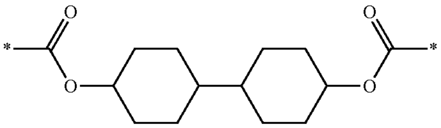
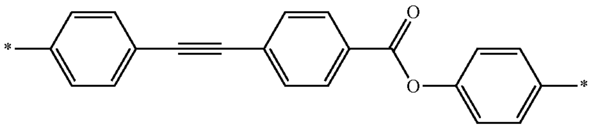
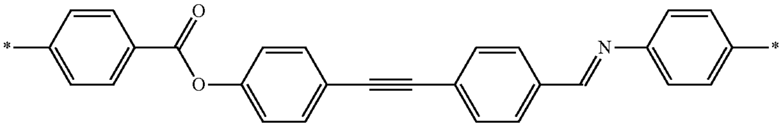
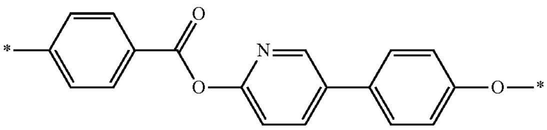
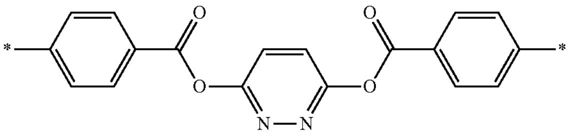
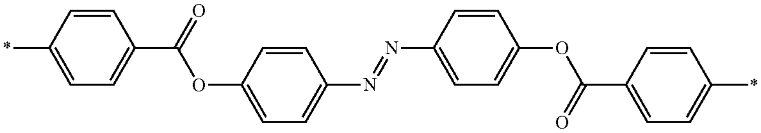
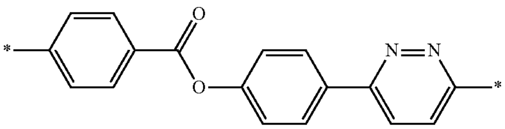
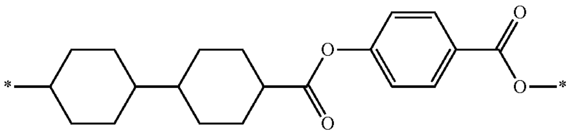
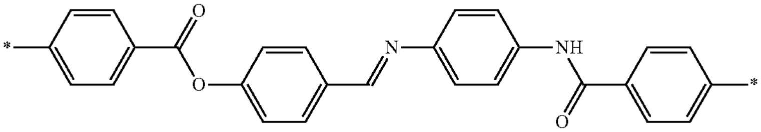
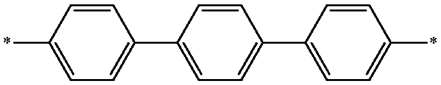
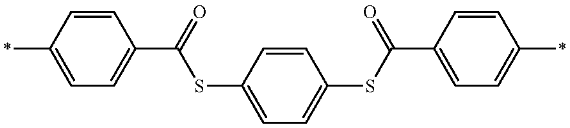
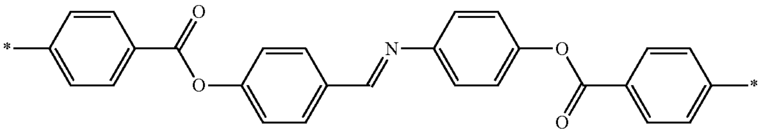
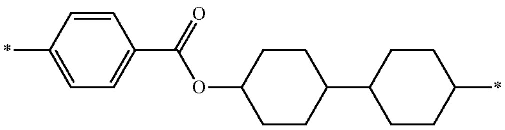
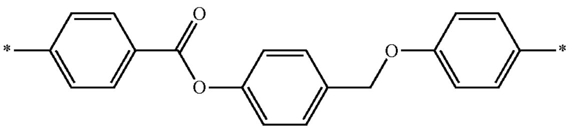
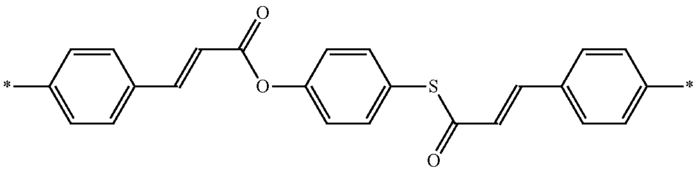
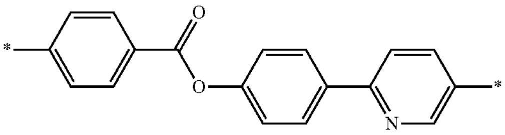
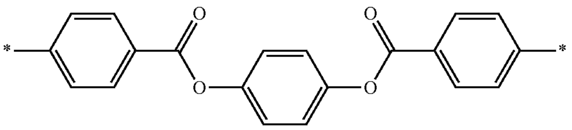

-continued

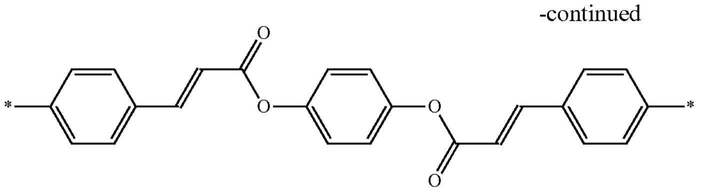

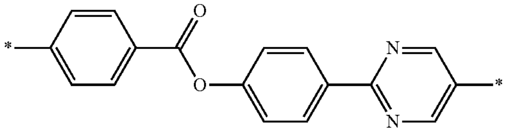

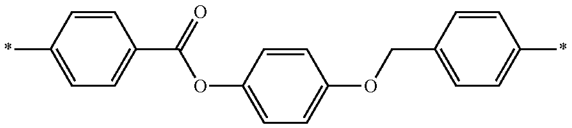

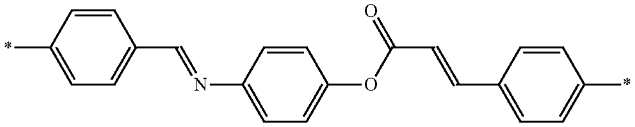

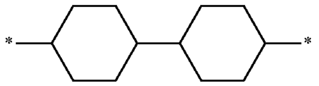

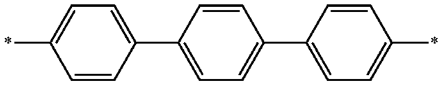

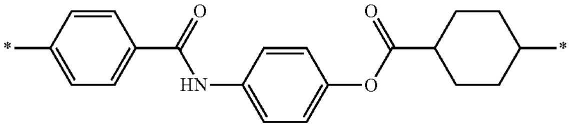

<Low-Molecular-Weight Liquid Crystalline Compound>

In a case where the liquid crystalline compound represented by Formula (LC) is the low-molecular-weight liquid crystalline compound, examples of preferred aspects of the cyclic structure of the mesogen group MG include a cyclohexylene group, a cyclopentylene group, a phenylene group, a naphthylene group, a fluorene-diyl group, a pyridine-diyl group, a pyridazine-diyl group, a thiophene-diyl group, an oxazole-diyl group, a thiazole-diyl group, and a thienothiophene-diyl group, and the number of cyclic structures is preferably 2 to 10 and more preferably 3 to 7.

Examples of preferred aspects of the substituent W in the mesogen structure include a halogen atom, a halogenated alkyl group, a cyano group, a hydroxy group, a nitro group, a carboxy group, an alkoxy group having 1 to 10 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an amino group, an alkylamino group having 1 to 10 carbon atoms, an alkylaminocarbonyl group, and a group in which LW in Formula (W1) represents a single bond, SPW represents a divalent spacer group, and Q represents a crosslinkable group represented by any of (P-1) to (P-30); and as the crosslinkable group, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is preferable.

Preferred aspects of the divalent spacer groups S1 and S2 are the same as those for SPW described above, and thus the description thereof will not be repeated.

In a case where a low-molecular-weight liquid crystalline compound exhibiting smectic properties is used, the number of carbon atoms in the spacer group (the number of atoms in a case where the carbon atoms are substituted with "SP—C") is preferably 6 or more and more preferably 8 or more.

In a case where the liquid crystalline compound represented by Formula (LC) is the low-molecular-weight liquid crystalline compound, a plurality of low-molecular-weight liquid crystalline compounds may be used in combination, and it is preferable that 2 to 6 kinds of low-molecular-weight liquid crystalline compounds are used in combination, and it is more preferable that 2 to 4 kinds of low-molecular-weight liquid crystalline compounds are used in combination. By using the low-molecular-weight liquid crystalline compounds in combination, solubility can be improved, and the phase transition temperature of the liquid crystal composition can be adjusted.

Specific examples of the low-molecular-weight liquid crystalline compound include compounds represented by Formulae (LC-1) to (LC-77), but the low-molecular-weight liquid crystalline compound is not limited thereto.

(LC-1)

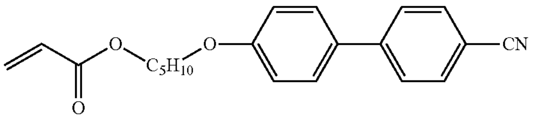

(LC-2)

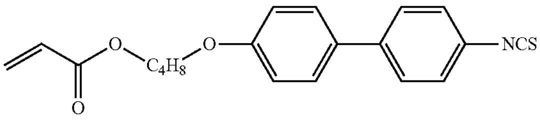

-continued
(LC-3)
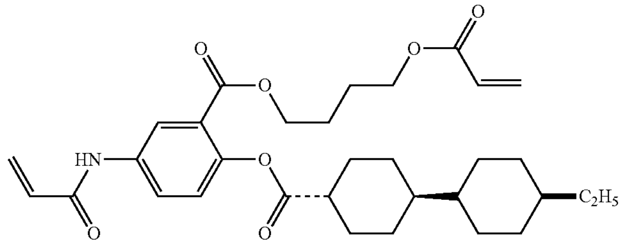
(LC-4)
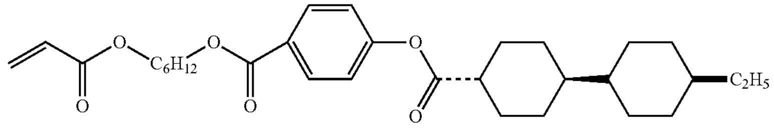
(LC-5)
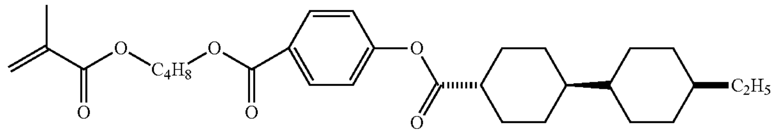
(LC-6)
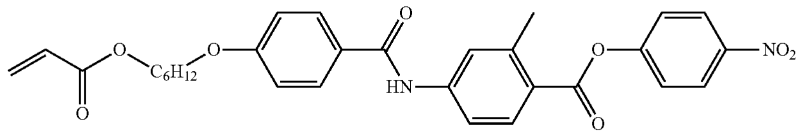
(LC-7)
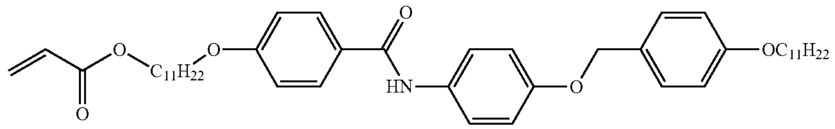
(LC-8)
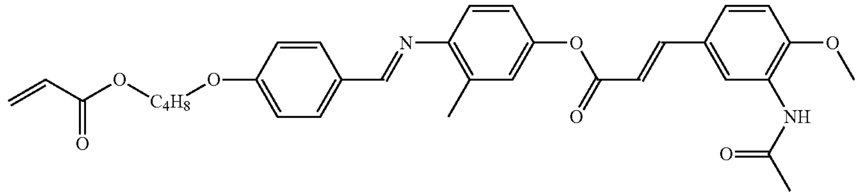
(LC-9)
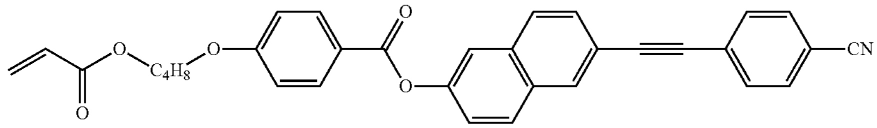
(LC-10)
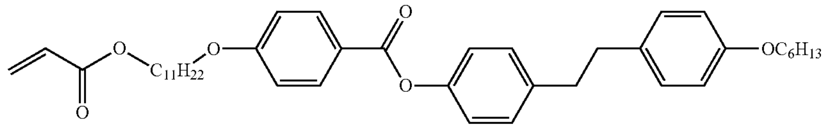
(LC-11)
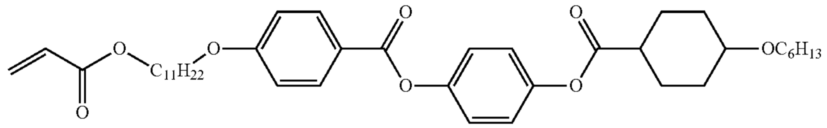
(LC-12)
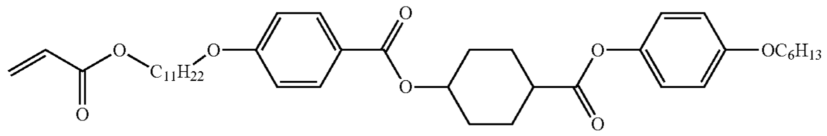

-continued
(LC-13)
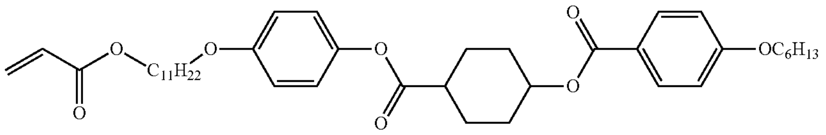
(LC-14)
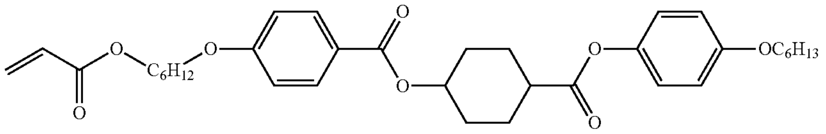
(LC-15)
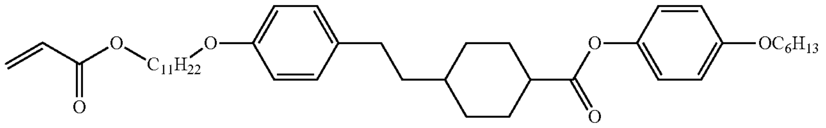
(LC-16)
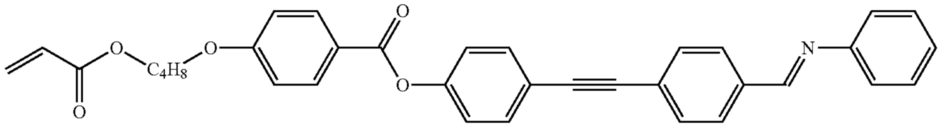
(LC-17)
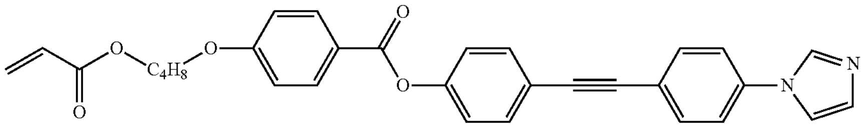
(LC-18)
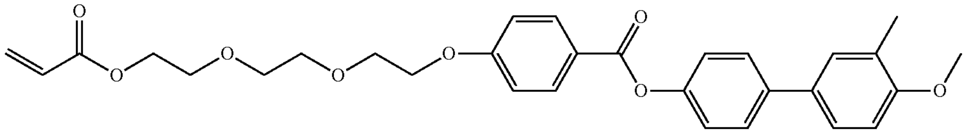
(LC-19)
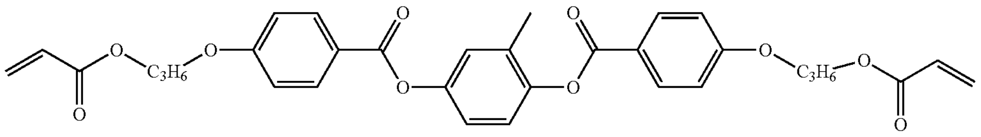
(LC-20)
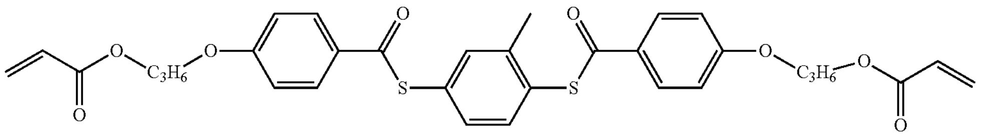
(LC-21)
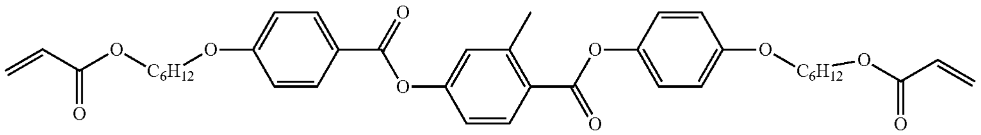
(LC-22)
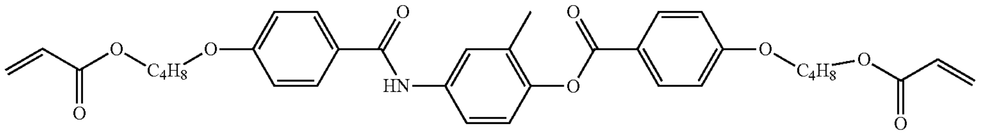
(LC-23)
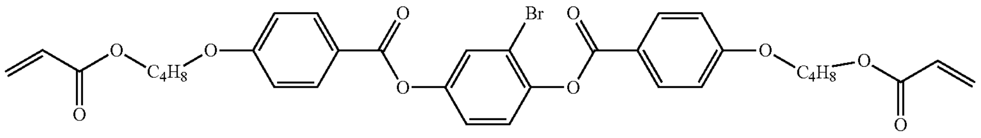

-continued
(LC-24)
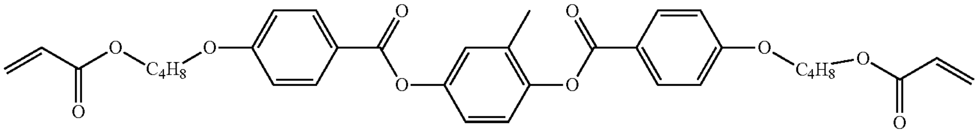
(LC-25)
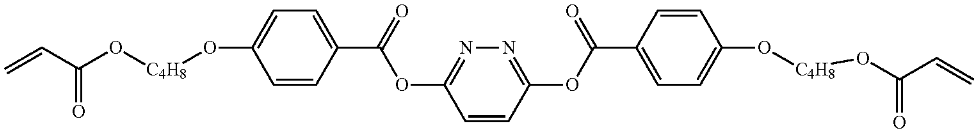
(LC-26)
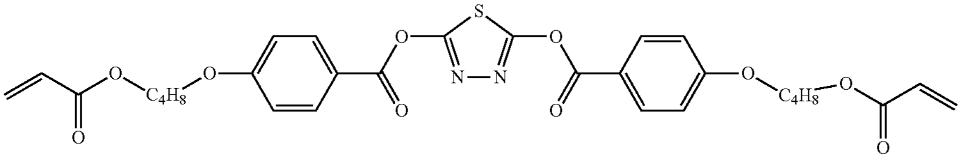
(LC-27)
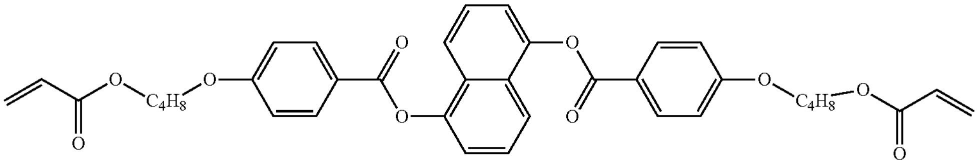
(LC-28)
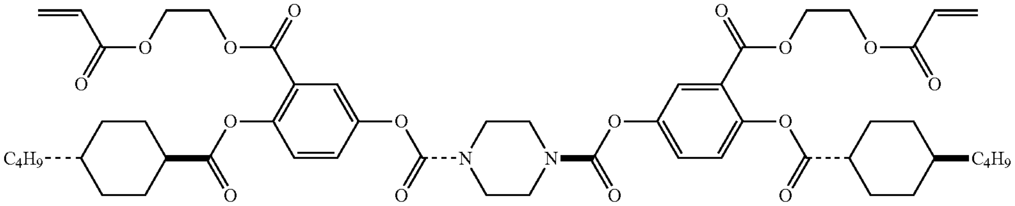
(LC-29)
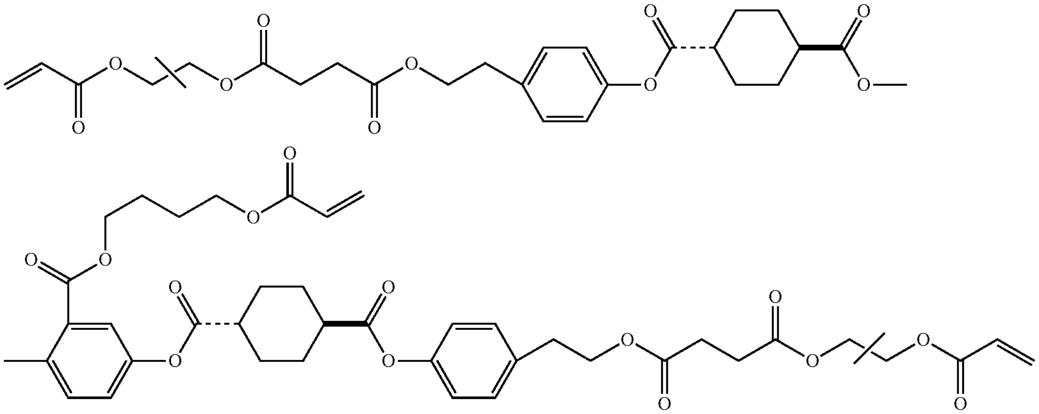
(LC-30)
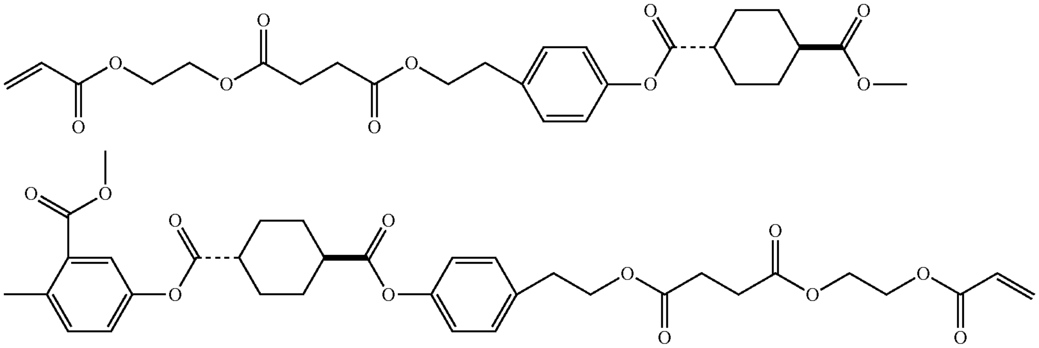

-continued
(LC31)
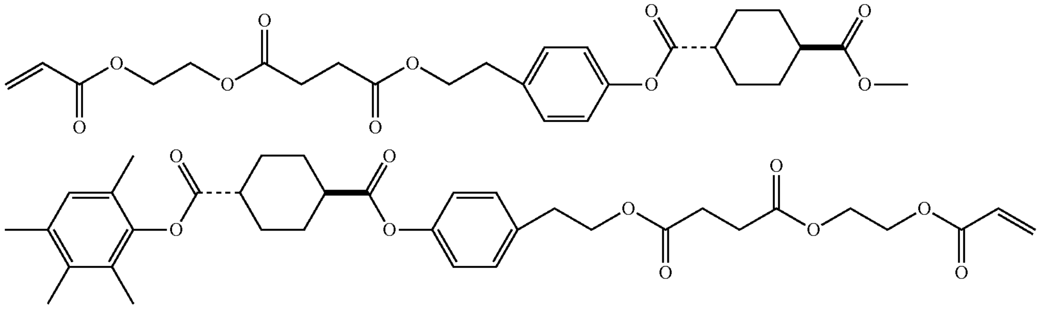
(LC-32)
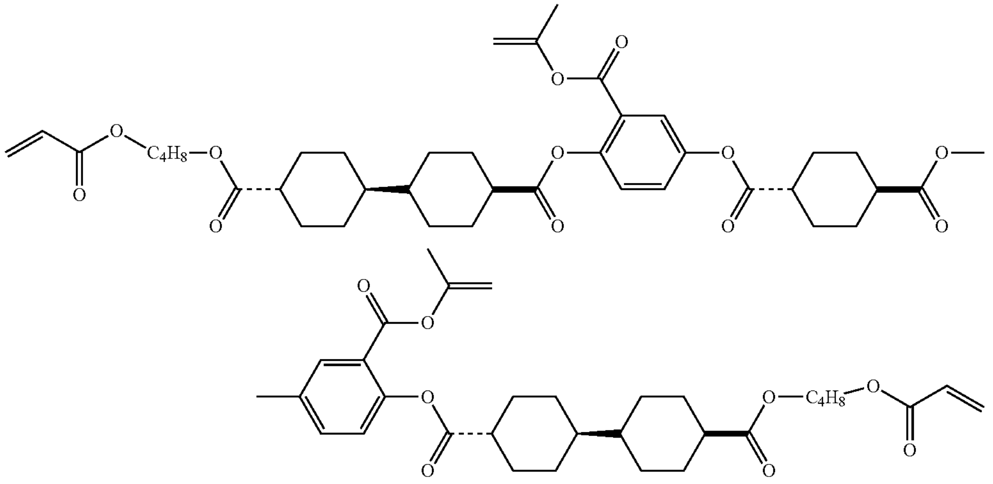
(LC-33)
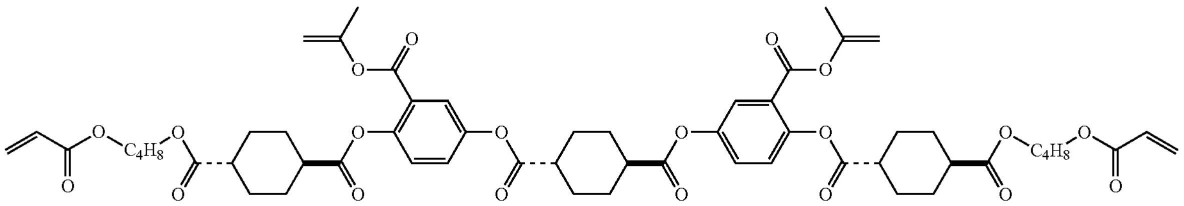
(LC-34)
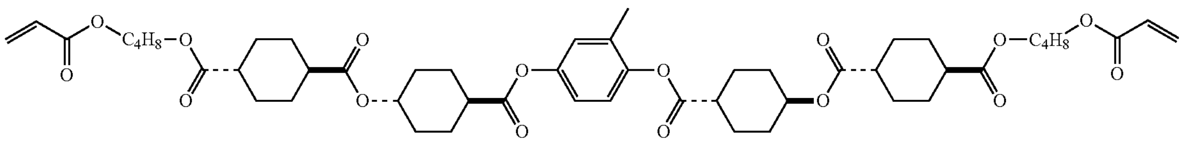
(LC-35)
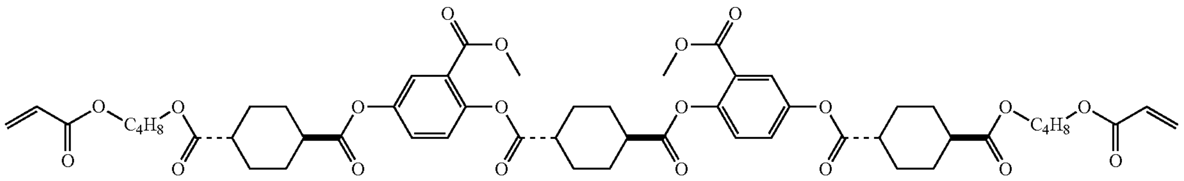
(LC-36)
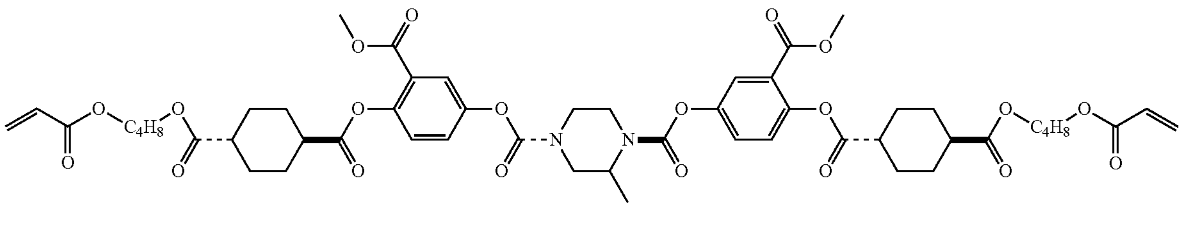

-continued
(LC-37)
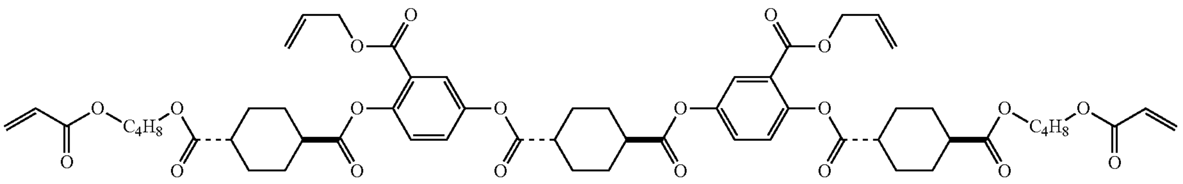
(LC-38)
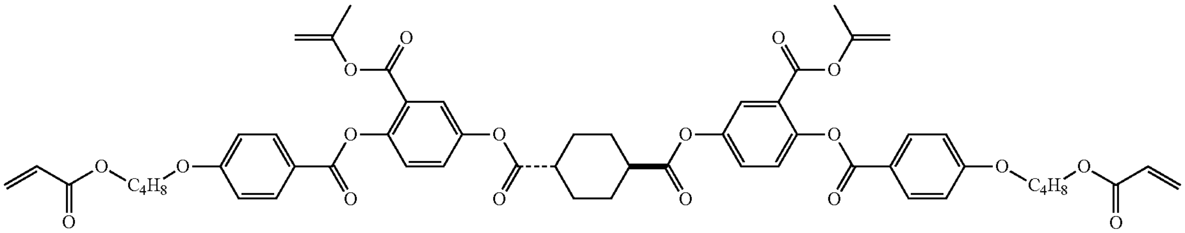
(LC-39)
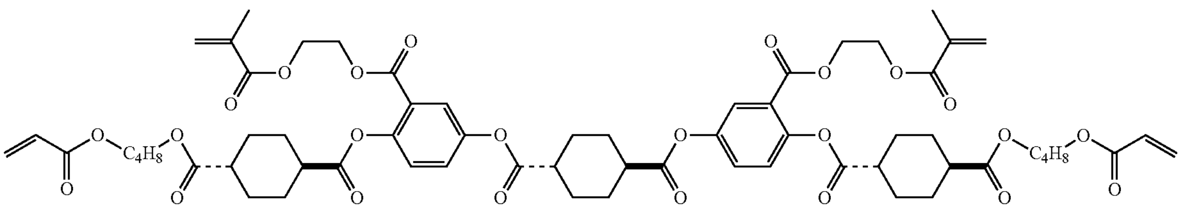
(LC-40)
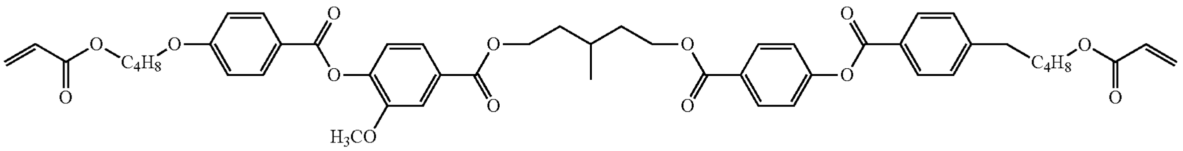
(LC-41)
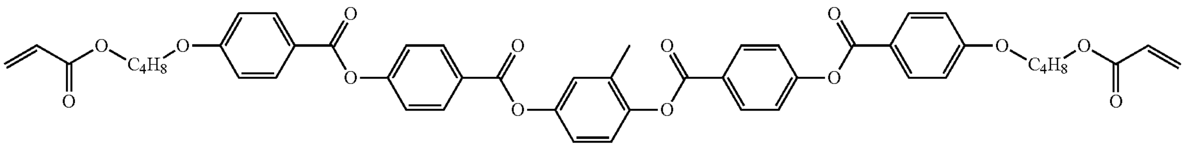
(LC-42)
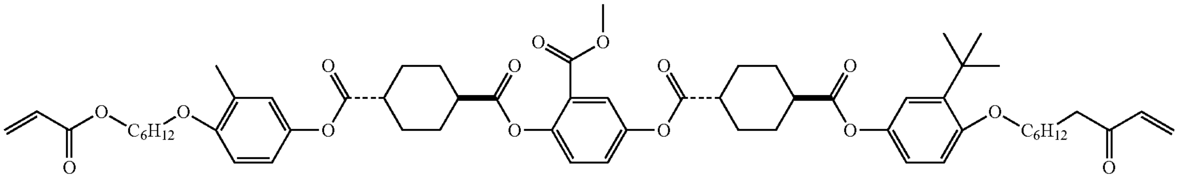
(LC-43)
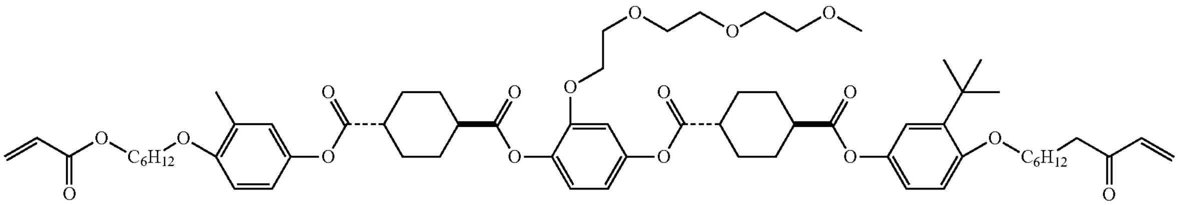

-continued
(LC-44)
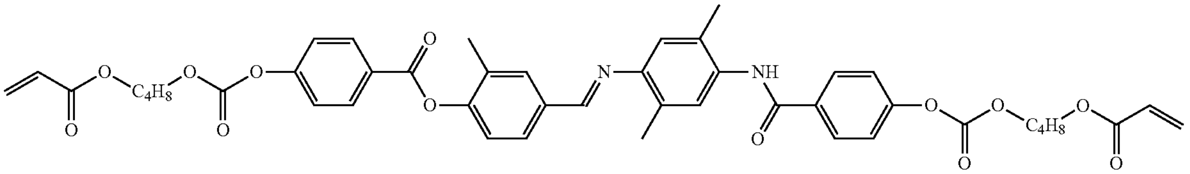
(LC-45)
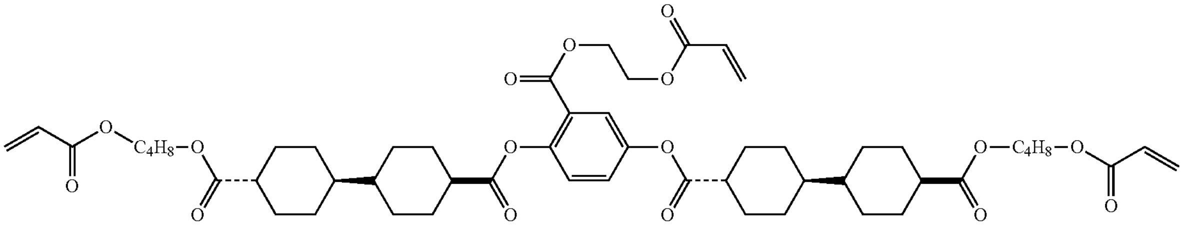
(LC-46)
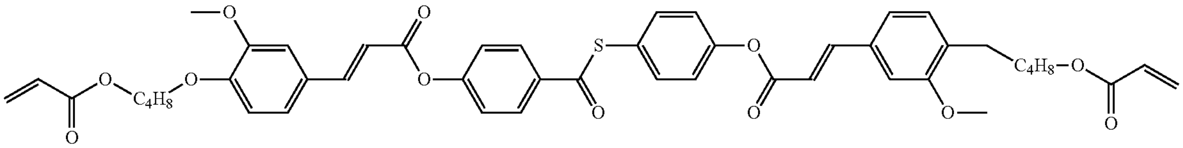
(LC-47)
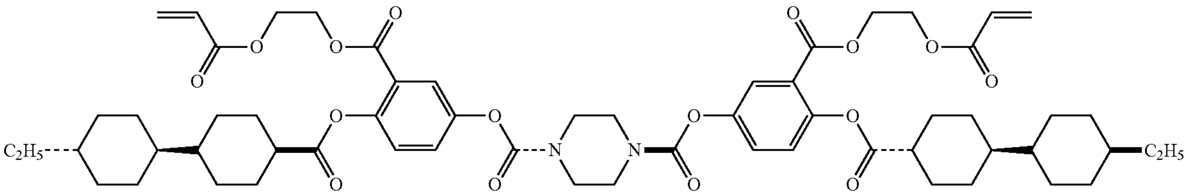
(LC-48)
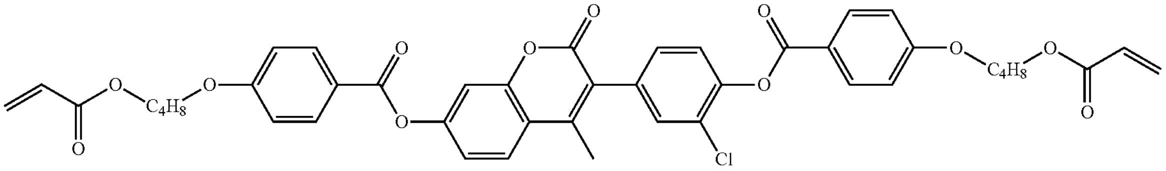
(LC-49)
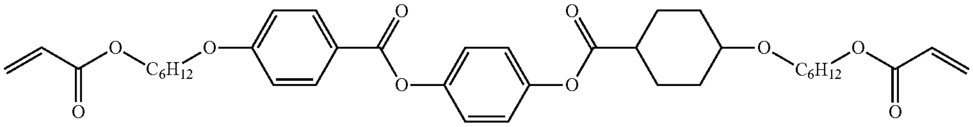
(LC-50)
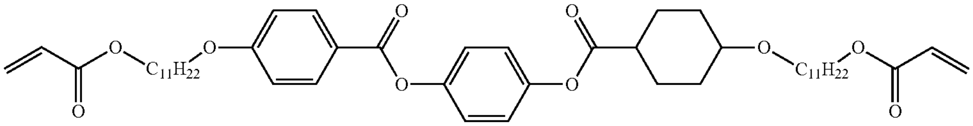
(LC-51)
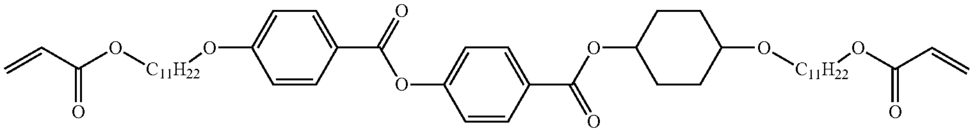
(LC-52)
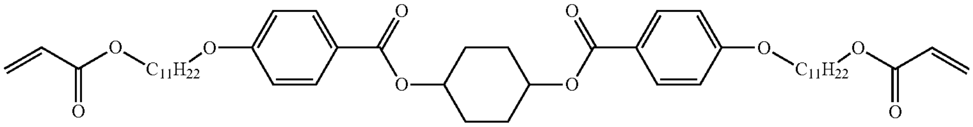

-continued
(LC-53)
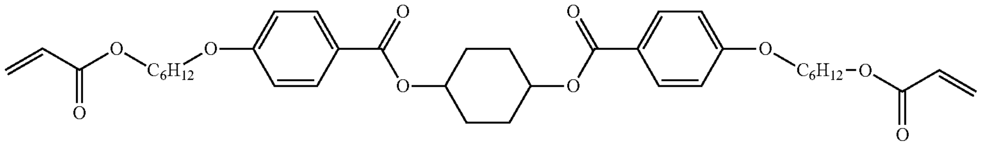
(LC-54)
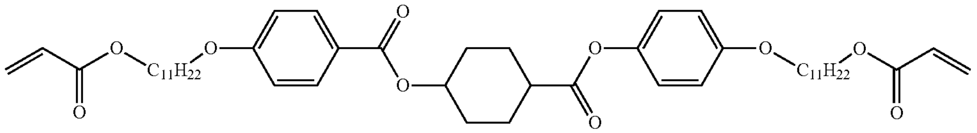
(LC-55)
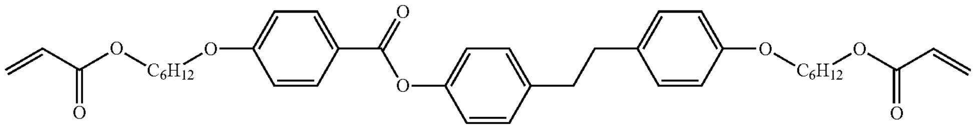
(LC-56)
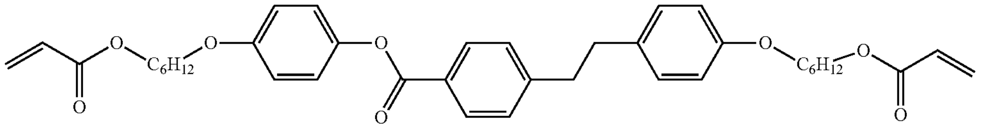
(LC-57)
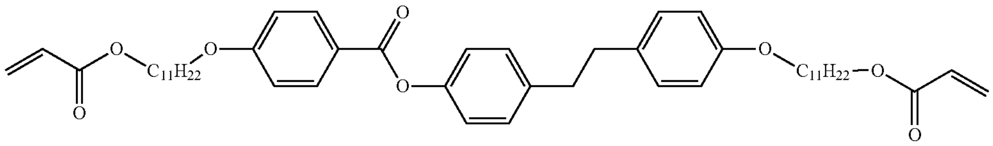
(LC-58)
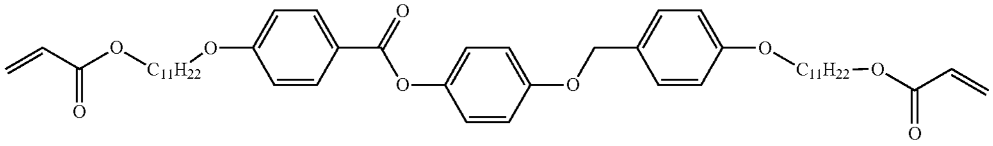
(LC-59)
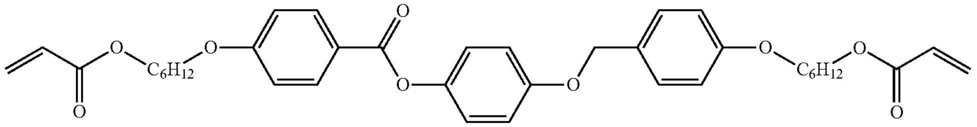
(LC-60)
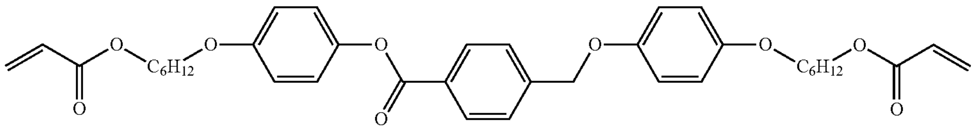
(LC-61)
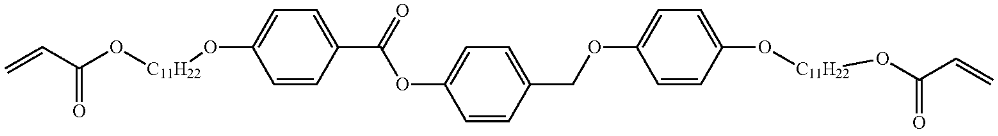
(LC-62)
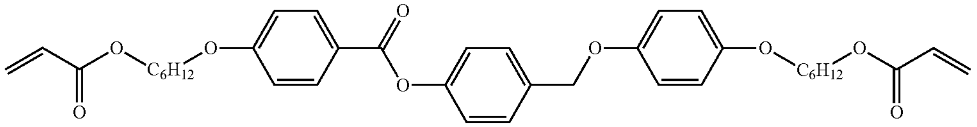
(LC-63)
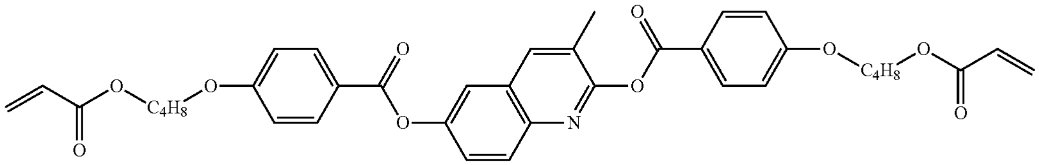

-continued
(LC-64)
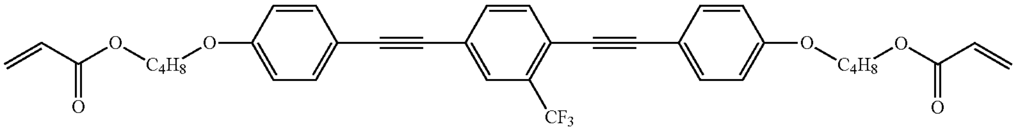
(LC-65)
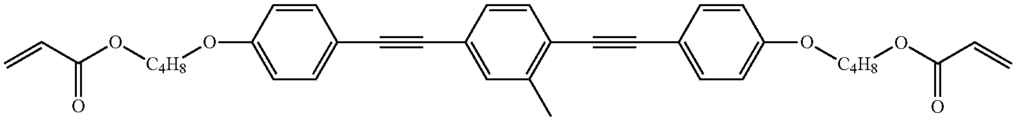
(LC-65)
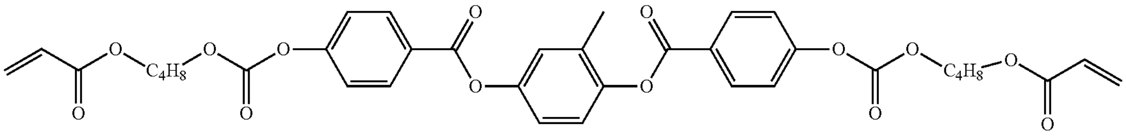
(LC-66)
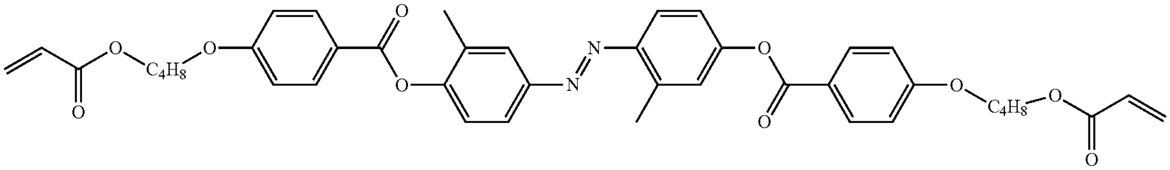
(LC-67)
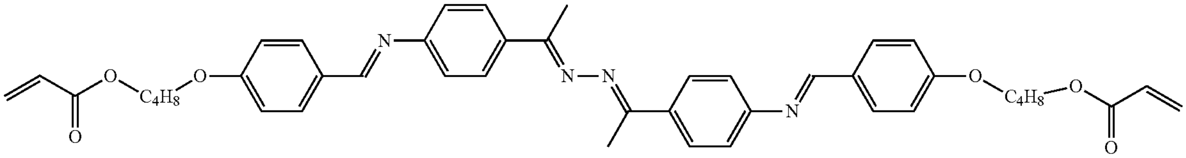
(LC-68)
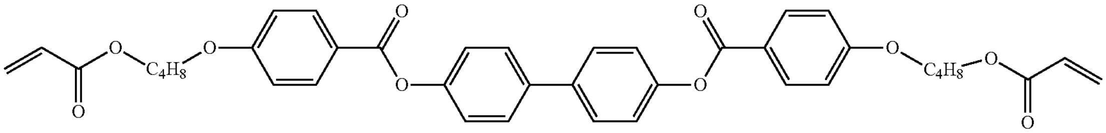
(LC-69)
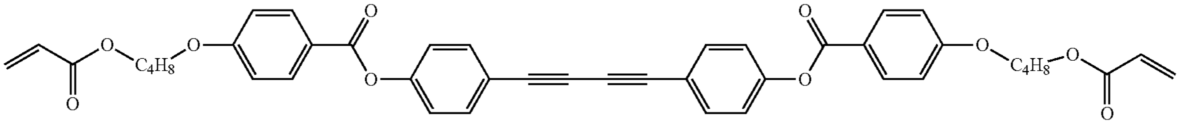
(LC-70)
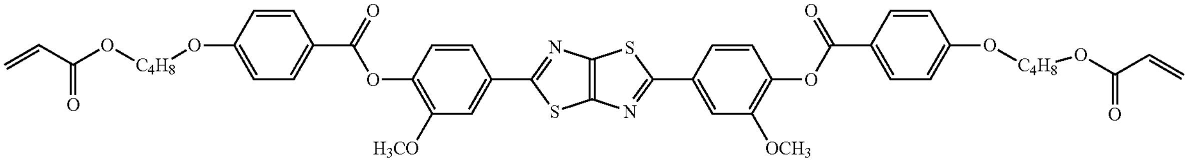
(LC-71)
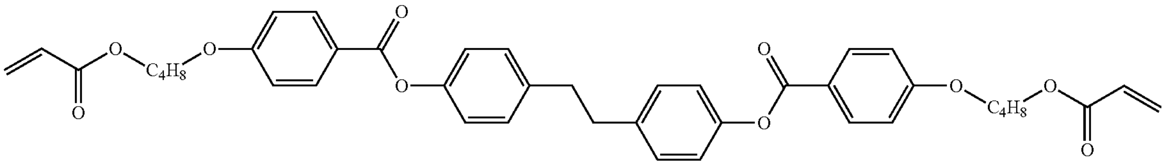

-continued (LC-72)

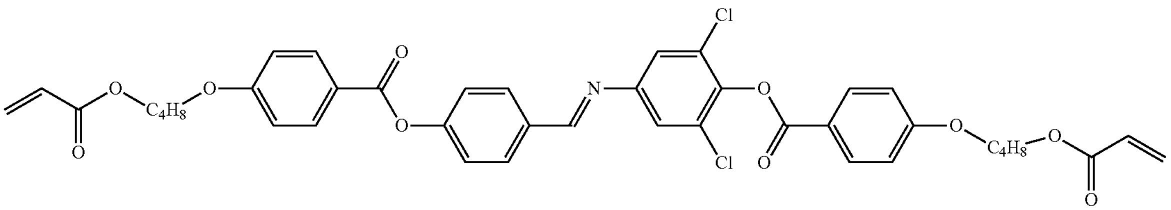

(LC-73)

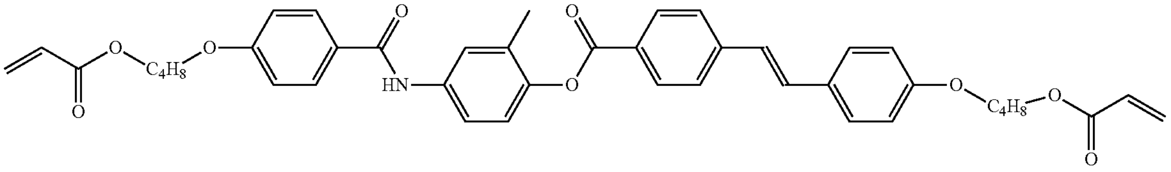

(LC-74)

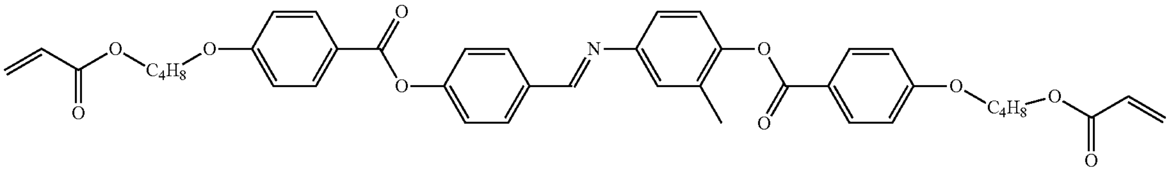

(LC-75)

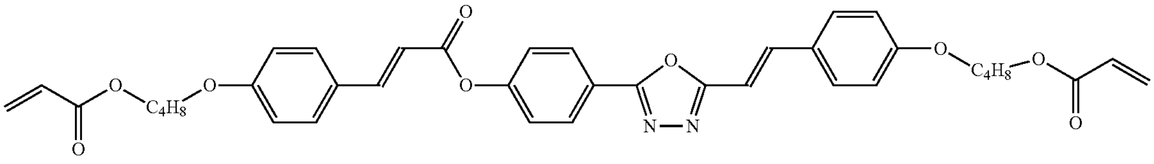

(LC-76)

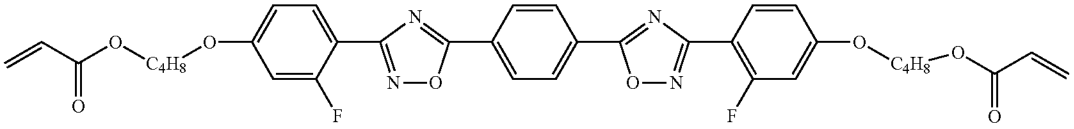

(LC-77)

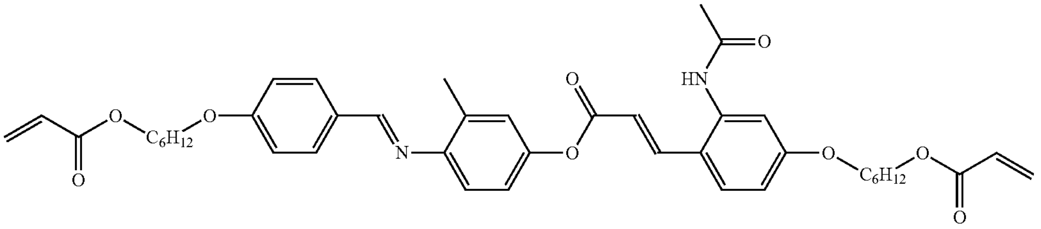

<High-Molecular-Weight Liquid Crystalline Compound>

The high-molecular-weight liquid crystalline compound is preferably a homopolymer or a copolymer, including a repeating unit described below, and may be any of a random polymer, a block polymer, a graft polymer, or a star polymer.

(Repeating Unit (1))

It is preferable that the high-molecular-weight liquid crystalline compound includes a repeating unit represented by Formula (1) (hereinafter, also referred to as "repeating unit (1)").

(1)

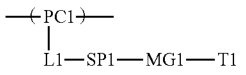

In Formula (1), PC1 represents a main chain of the repeating unit, L1 represents a single bond or a divalent linking group, SP1 represents a spacer group, MG1 represents the mesogen group MG in Formula (LC) described above, and T1 represents a terminal group.

Examples of the main chain of the repeating unit, represented by PC1, include groups represented by Formulae (P1-A) to (P1-D). Among these, from the viewpoint of diversity and handleability of a monomer serving as a raw material, a group represented by Formula (P1-A) is preferable.

(P1-A)

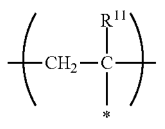

(P1-B)

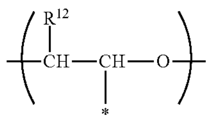

(P1-C)

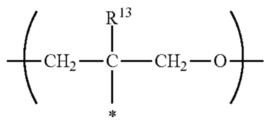

(P1-D)

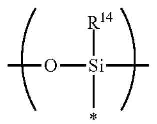

In Formulae (P1-A) to (P1-D), "*" represents a bonding position to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The above-described alkyl group may be a linear or branched alkyl group, or an alkyl group having a cyclic structure (cycloalkyl group). In addition, the number of carbon atoms in the above-described alkyl group is preferably 1 to 5.

It is preferable that the group represented by Formula (P1-A) is one unit of a partial structure of poly(meth)acrylic acid ester, which is obtained by polymerization of (meth) acrylic acid ester.

It is preferable that the group represented by Formula (P1-B) is an ethylene glycol unit formed by ring-opening polymerization of an epoxy group of a compound having the epoxy group.

It is preferable that the group represented by Formula (P1-C) is a propylene glycol unit formed by ring-opening polymerization of an oxetane group of a compound having the oxetane group.

It is preferable that the group represented by Formula (P1-D) is a siloxane unit of a polysiloxane obtained by polycondensation of a compound having at least one of an alkoxysilyl group or a silanol group. Here, examples of the compound having at least one of an alkoxysilyl group or a silanol group include a compound having a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

The divalent linking group represented by L1 is the same divalent linking group as LW in Formula (W1) described above, and examples of preferred aspects thereof include —C(O)O—, —OC(O)—, —O—, —S—, —C(O)$NR^{16}$—, —$NR^{16}$C(O)—, —$S(O)_2$—, and —$NR^{16}R^{17}$—. In the formulae, $R^{16}$ and $R^{17}$ each independently represent a hydrogen atom or an alkyl group having 1 to 6 carbon atoms, which may have a substituent (for example, the substituent W described above). In the specific examples of the divalent linking group, the bonding site on the left side is bonded to PC1 and the bonding site on the right side is bonded to SPL.

In a case where PC1 represents the group represented by Formula (P1-A), it is preferable that L1 is a group represented by —C(O)O— or —C(O)$NR^{16}$—.

In a case where PC1 represents the group represented by any of Formulae (P1-B) to (P1-D), it is preferable that L1 is a single bond.

The spacer group represented by SP1 represents the same groups as S1 and S2 in Formula (LC) described above, and from the viewpoint of the alignment degree, a group having at least one structure selected from the group consisting of an oxyethylene structure, an oxypropylene structure, a polysiloxane structure, and an alkylene fluoride structure, or a linear or branched alkylene group having 2 to 20 carbon atoms is preferable. However, the above-described alkylene group may include —O—, —S—, —O—CO—, —CO—O—, —O—CO—O—, —O—CNR— (R represents an alkyl group having 1 to 10 carbon atoms), or —$S(O)_2$—.

From the reason of easily expressing liquid crystallinity and availability of raw materials, it is more preferable that the spacer group represented by SP1 is a group having at least one structure selected from the group consisting of an oxyethylene structure, an oxypropylene structure, a polysiloxane structure, and an alkylene fluoride structure.

Here, the oxyethylene structure represented by SP1 is preferably a group represented by *—$(CH_2—CH_2O)_{n1}$—* is preferable. In the formula, n1 represents an integer of 1 to 20, and * represents a bonding position to L1 or MG1. From the reason that the effect of the present invention is more excellent, n1 is preferably an integer of 2 to 10, more preferably an integer of 2 to 6, and most preferably 2 to 4.

In addition, the oxypropylene structure represented by SP1 is preferably a group represented by *—$(CH(CH_3)—CH_2O)_{n2}$—*. In the formula, n2 represents an integer of 1 to 3, and * represents a bonding position to L1 or MG1.

In addition, the polysiloxane structure represented by SP1 is preferably a group represented by *—$(Si(CH_3)_2—O)_{n3}$—*. In the formula, n3 represents an integer of 6 to 10, and * represents a bonding position to L1 or MG1.

In addition, the alkylene fluoride structure represented by SP1 is preferably a group represented by *—$(CF_2—CF_2)_{n4}$—*. In the formula, n4 represents an integer of 6 to 10, and * represents a bonding position to L1 or MG1.

Examples of the terminal group represented by T1 include a hydrogen atom, a halogen atom, a cyano group, a nitro group, a hydroxy group, —SH, a carboxyl group, a boronic acid group, —$SO_3H$, —$PO_3H_2$, —$NR^{11}R^{12}$ ($R^{11}$ and $R^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the above-described crosslinkable group-containing group include -L-CL described above. L represents a single bond or a linking group. Specific examples of the linking group are the same as those for LW and SPW described above. CL represents a crosslinkable group, examples thereof include the group represented by Q1 or Q2 described above, and the above-described group represented by any of Formulae (P-1) to (P-30) is preferable. In addition, T1 may be a group obtained by combining two or more of these groups.

From the reason that the effect of the present invention is more excellent, T1 is preferably an alkoxy group having 1 to 10 carbon atoms, more preferably an alkoxy group having 1 to 5 carbon atoms, and still more preferably a methoxy group. These terminal groups may be further substituted with the groups or polymerizable groups described in JP2010-244038A.

From the reason that the effect of the present invention is more excellent, the number of atoms in the main chain of T1 is preferably 1 to 20, more preferably 1 to 15, still more preferably 1 to 10, and particularly preferably 1 to 7. In a case where the number of atoms in the main chain of T1 is 20 or less, the alignment degree of the light-absorbing anisotropic layer is further improved. Here, the "main chain" of T1 means the longest molecular chain bonded to M1, and the number of hydrogen atoms is not included in the number of atoms in the main chain of T1. For example, in a case where T1 is an n-butyl group, the number of atoms in the main chain is 4, and in a case where T1 is an sec-butyl group, the number of atoms in the main chain is 3.

A content of the repeating unit (1) is preferably 40% to 100% by mass and more preferably 50% to 95% by mass with respect to all repeating units (100% by mass) of the high-molecular-weight liquid crystalline compound. In a case where the content of the repeating unit (1) is 40% by mass or more, an excellent light-absorbing anisotropic layer can be obtained due to favorable aligning properties. In addition, in a case where the content of the repeating unit (1) is 100% by mass or less, an excellent light-absorbing anisotropic layer can be obtained due to favorable aligning properties.

The high-molecular-weight liquid crystalline compound may include only one of the repeating unit (1), or two or more kinds of the repeating units (1). In a case where the high-molecular-weight liquid crystalline compound includes two or more kinds of repeating units (1), the above-described content of the repeating unit (1) indicates the total content of the repeating units (1).

(Log P Value)

In Formula (1), a difference ($|\log P_1-\log P_2|$) between a log P value of PC1, L1, and SP1 (hereinafter, also referred to as "log $P_1$") and a log P value of MG1 (hereinafter, also referred to as "log $P_2$") is 4 or more, and from the viewpoint of further improving the alignment degree of the light-absorbing anisotropic layer, it is preferably 4.25 or more and more preferably 4.5 or more.

In addition, from the viewpoint of adjusting the liquid crystal phase transition temperature and the synthetic suitability, the upper limit value of the above-described difference is preferably 15 or less, more preferably 12 or less, and still more preferably 10 or less.

Here, the log P value is an index for expressing properties of hydrophilicity and hydrophobicity of a chemical structure, and is also referred to as a hydrophilic-hydrophobic parameter. The log P value can be calculated using software such as ChemBioDraw Ultra or HSPiP (Ver. 4.1.07). In addition, the log P value can be acquired experimentally by the method of the OECD Guidelines for the Testing of Chemicals, Sections 1, Test No. 117, or the like. In the present invention, a value calculated by inputting the structural formula of a compound to HSPiP (Ver. 4.1.07) is adopted as the log P value unless otherwise specified.

The above-described log $P_1$ indicates the log P value of PC1, L1, and SP1 as described above. The expression "log P value of PC1, L1, and SP1" indicates the log P value of a structure in which PC1, L1, and SP1 are integrated, which is not the sum of the log P values of PC1, L1, and SP1. Specifically, the log $P_1$ is calculated by inputting a series of structural formulae of PC1 to SP1 in Formula (1) into the above-described software.

However, in the calculation of the log $P_1$, with regard to a part of the group represented by PC1 in the series of structural formulae of PC1 to SP1, the structure of the group represented by PC1 itself (for example, Formulae (P1-A) to (P1-D) described above) may be used, or a structure of a group which can be PC1 after polymerization of a monomer used to obtain the repeating unit represented by Formula (1) may be used.

Here, specific examples of the latter (the group which can be PC1) are as follows. In a case where PC1 is obtained by polymerization of (meth)acrylic acid ester, PC1 is a group represented by $CH_2{=}C(R^1)—$ ($R^1$ represents a hydrogen atom or a methyl group). In addition, in a case where PC1 is obtained by polymerization of ethylene glycol, PC1 is ethylene glycol, and in a case where PC1 is obtained by polymerization of propylene glycol, PC1 is propylene glycol. In addition, in a case where PC1 is obtained by condensation polymerization of silanol, PC1 is silanol (a compound represented by Formula $Si(R^2)_3(OH)$; a plurality of $R^2$'s each independently represent a hydrogen atom or an alkyl group, and at least one of the plurality of $R^2$'s represents an alkyl group).

In a case where the above-described difference between log $P_1$ and log $P_2$ is 4 or more, the log $P_1$ may be less than the log $P_2$ or may be more than the log $P_2$.

Here, the log P value of a general mesogen group (the log $P_2$ described above) tends to be in a range of 4 to 6. In a case where the log $P_1$ is less than the log $P_2$, the value of log $P_1$ is preferably 1 or less and more preferably 0 or less. On the other hand, in a case where the log $P_1$ is more than the log $P_2$, the value of log $P_1$ is preferably 8 or more and more preferably 9 or more.

In a case where PC1 in Formula (1) is obtained by polymerization of (meth)acrylic acid ester and the log $P_1$ is less than the log $P_2$, the log P value of SP1 in Formula (1) is preferably 0.7 or less and more preferably 0.5 or less. On the other hand, in a case where PC1 in Formula (1) is obtained by polymerization of (meth)acrylic acid ester and the log $P_1$ is more than the log $P_2$, the log P value of SP1 in Formula (1) is preferably 3.7 or more and more preferably 4.2 or more.

Examples of the structure having a log P value of 1 or less include an oxyethylene structure and an oxypropylene structure. Examples of the structure having a log P value of 6 or more include a polysiloxane structure and an alkylene fluoride structure.

(Repeating Units (21) and (22))

From the viewpoint of improving the alignment degree, it is preferable that the high-molecular-weight liquid crystalline compound has a repeating unit having an electron-donating property and/or an electron-withdrawing property at a terminal. More specifically, it is more preferable that the high-molecular-weight liquid crystalline compound includes a repeating unit (21) having a mesogen group and an electron-withdrawing group which is present at the terminal of the mesogen group and has a σp value of more than 0, and a repeating unit (22) having a mesogen group and a group which is present at the terminal of the mesogen group and has a σp value of 0 or less. As described above, in a case where the high-molecular-weight liquid crystalline compound includes the repeating unit (21) and the repeating unit (22), the alignment degree of the light-absorbing anisotropic layer to be formed using the high-molecular-weight liquid crystalline compound is further improved as compared with a case where the high-molecular-weight liquid crystalline compound has only one of the repeating unit (21) or the repeating unit (22). The details of the reason for this are not clear, but it is presumed as follows.

That is, it is presumed that, since opposite dipole moments generated in the repeating unit (21) and the repeating unit (22) cause intermolecular interactions, an interaction between the mesogen groups in a minor axis direction is strengthened, and an orientation in which the liquid crystals are aligned is more uniform, and as a result, the degree of order of the liquid crystals is considered to be high. Accordingly, it is presumed that the aligning properties of the dichroic substance are enhanced, and thus the alignment degree of the light-absorbing anisotropic layer to be formed increases.

The repeating units (21) and (22) described above may be the repeating unit represented by Formula (1) described above.

The repeating unit (21) has a mesogen group and an electron-withdrawing group which is present at the terminal of the mesogen group and has a σp value of more than 0.

The above-described electron-withdrawing group is a group which is positioned at the terminal of the mesogen group and has a σp value of more than 0. Examples of the electron-withdrawing group (group having a σp value of more than 0) include a group represented by EWG in Formula (LCP-21) described below, and specific examples thereof are also the same as those described below.

The σp value of the above-described electron-withdrawing group is more than 0, and from the viewpoint of further increasing the alignment degree of the light-absorbing anisotropic layer, it is preferably 0.3 or more and more preferably 0.4 or more. From the viewpoint that the uniformity of alignment is excellent, the upper limit of the σp value of the above-described electron-withdrawing group is preferably 1.2 or less and more preferably 1.0 or less.

The σp value is a Hammett's substituent constant σp value (also simply referred to as "σp value") and is a parameter showing the intensity of the electron-withdrawing property and the electron-donating property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para-position of benzoic acid.

As the Hammett's substituent constant σp value of each group in the present specification, a value described in the document "Hansch et al., Chemical Reviews, 1991, Vol, 91, No. 2, pp. 165 to 195" is adopted. With regard to a group in which the Hammett's substituent constant σp value is not described in the document above, the Hammett's substituent constant σp value can be calculated using software "ACD/Chem Sketch (ACD/Labs 8.00 Release Product Version: 8.08)" based on a difference between the pKa of benzoic acid and the pKa of a benzoic acid derivative having a substituent at the para-position.

The repeating unit (21) is not particularly limited as long as it has, at a side chain thereof, the mesogen group and the electron-withdrawing group which is present at the terminal of the mesogen group and has a σp value of more than 0, but from the viewpoint of further increasing the alignment degree of the light-absorbing anisotropic layer, a repeating unit represented by Formula (LCP-21) is preferable.

(LCP-21)

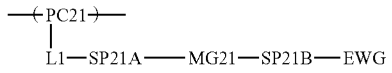

In Formula (LCP-21), PC21 represents a main chain of a repeating unit, and more specifically represents the same structure as that for PC1 in Formula (1) described above; L21 represents a single bond or a divalent linking group, and more specifically represents the same structure as that for L1 in Formula (1) described above; SP21A and SP21B each independently represent a single bond or a spacer group, and more specifically represent the same structure as that for SP1 in Formula (1) described above; MG21 represents a mesogen structure, and more specifically represents the mesogen group MG in Formula (LC) described above; and EWG represents an electron-withdrawing group having a σp value of more than 0.

The spacer group represented by SP21A and SP21B represent the same groups as Formulae S1 and S2 described above, and a group having at least one structure selected from the group consisting of an oxyethylene structure, an oxypropylene structure, a polysiloxane structure, and an alkylene fluoride structure, or a linear or branched alkylene group having 2 to 20 carbon atoms is preferable. However, the above-described alkylene group may include —O—, —O—CO—, —CO—O—, or —O—CO—O—.

From the reason of easily expressing liquid crystallinity and availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that SP21B is a single bond or a linear or branched alkylene group having 2 to 20 carbon atoms. However, the above-described alkylene group may include —O—, —O—CO—, —CO—O—, or —O—CO—O—.

Among these, from the viewpoint of further increasing the alignment degree of the light-absorbing anisotropic layer, the spacer group represented by SP21B is preferably a single bond. In other words, it is preferable that the repeating unit (21) has a structure in which EWG which the electron-withdrawing group in Formula (LCP-21) is directly linked to MG21 which is the mesogen group in Formula (LCP-21). In this manner, it is presumed that, in a case where the electron-withdrawing group is directly linked to the mesogen group, the intermolecular interaction due to an appropriate dipole moment works more effectively in the high-molecular-weight liquid crystalline compound, and the orientation in which the liquid crystals are aligned is more uniform, and as a result, the degree of order of the liquid crystals and the alignment degree are considered to be high.

EWG represents an electron-withdrawing group having a σp value of more than 0. Examples of the electron-withdrawing group having a σp value of more than 0 include an ester group (specifically, a group represented by *—C(O)O—$R^E$), a (meth)acryloyl group, a (meth)acryloyloxy group, a carboxy group, a cyano group, a nitro group, a sulfo group, —S(O)(O)—OR$^E$, —S(O)(O)—R$^E$, —O—S(O)(O)—R$^E$, an acyl group (specifically, a group represented by *—C(O)R$^E$), an acyloxy group (specifically, a group represented by *—OC(O)R$^E$), an isocyanate group (—N=C(O)), *—C(O)N(R$^F$)$_2$, a halogen atom, and an alkyl group substituted with any of these groups (preferably having 1 to 20 carbon atoms). In each of the above-described groups, * represents a bonding position to SP21B. R$^E$ represents an alkyl group having 1 to 20 carbon atoms (preferably 1 to 4 carbon atoms and more preferably 1 or 2 carbon atoms). R$^F$'s each independently represents a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effect of the present invention, it is preferable that EWG is a group represented by *—C(O)O—R$^E$, a (meth)acryloyloxy group, a cyano group, or a nitro group.

From the viewpoint that the high-molecular-weight liquid crystalline compound and the dichroic substance can be uniformly aligned while maintaining a high alignment degree of the light-absorbing anisotropic layer, a content of the repeating unit (21) is preferably 60% by mass or less, more preferably 50% by mass or less, and still more preferably 45% by mass or less with respect to all repeating units (100% by mass) of the high-molecular-weight liquid crystalline compound.

From the viewpoint of further exhibiting the effect of the present invention, the lower limit of the content of the repeating unit (21) is preferably 1% by mass or more and more preferably 3% by mass or more with respect to all repeating units (100% by mass) of the high-molecular-weight liquid crystalline compound.

In the present invention, the content of each repeating unit included in the high-molecular-weight liquid crystalline compound is calculated based on the charged amount (mass) of each monomer used for obtaining each repeating unit.

The high-molecular-weight liquid crystalline compound may include only one of the repeating unit (21), or two or more kinds of the repeating units (21). In a case where the high-molecular-weight liquid crystalline compound includes two or more kinds of repeating units (21), there is an advantage in that solubility of the high-molecular-weight liquid crystalline compound in a solvent is improved and the liquid crystal phase transition temperature is easily adjusted. In the case where the high-molecular-weight liquid crystalline compound includes two or more kinds of repeating units (21), it is preferable that the total amount thereof is within the above-described range.

In the case where the high-molecular-weight liquid crystalline compound includes two or more kinds of repeating units (21), a repeating unit (21) which does not include a crosslinkable group in EWG and a repeating unit (21) which includes a polymerizable group in EWG may be used in combination. In this manner, curing properties of the light-absorbing anisotropic layer are further improved. As the crosslinkable group, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is preferable.

In this case, from the viewpoint of balance between the curing properties and the alignment degree of the light-absorbing anisotropic layer, a content of the repeating unit (21) including a polymerizable group in EWG is preferably 1% to 30% by mass with respect to all repeating units (100% by mass) of the high-molecular-weight liquid crystalline compound.

Hereinafter, examples of the repeating unit (21) are shown below, but the repeating unit (21) is not limited to the following repeating units.

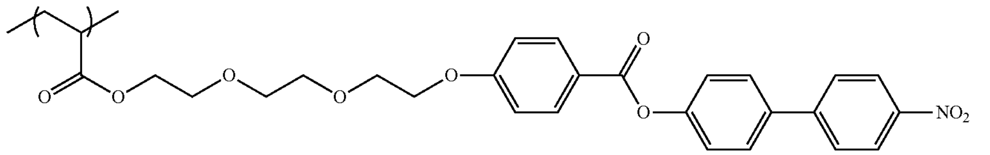

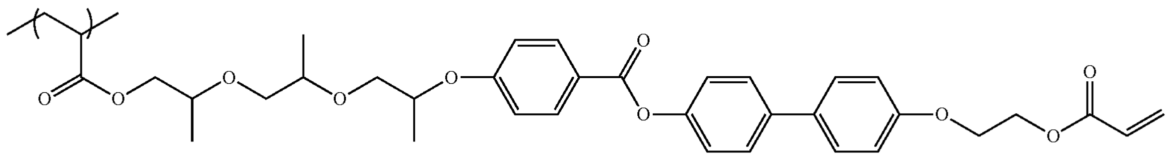

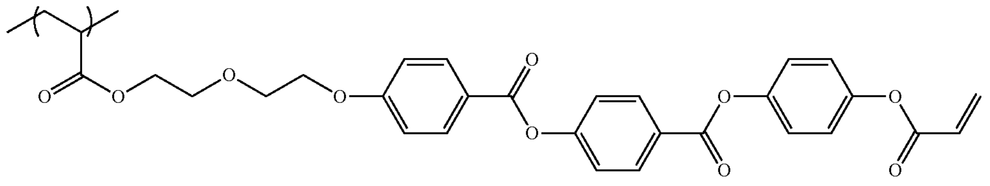

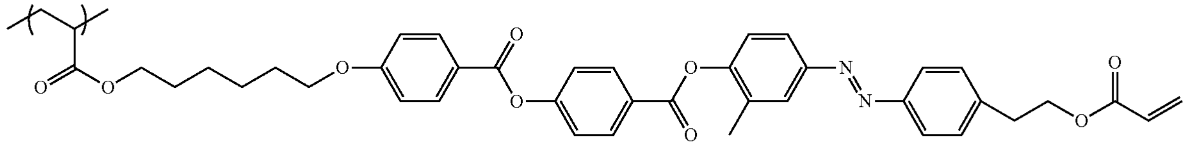

-continued
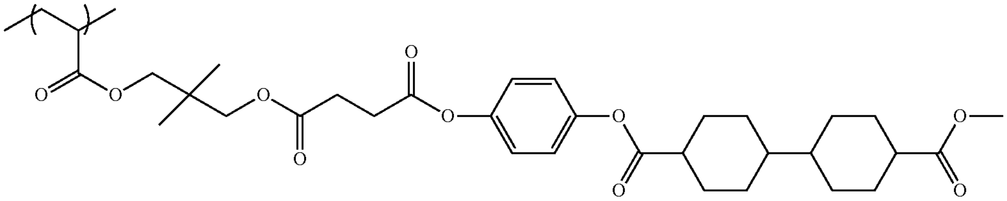
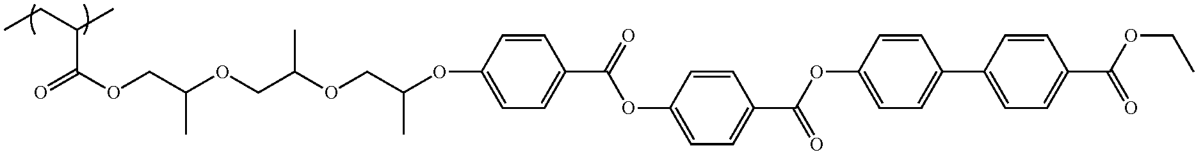
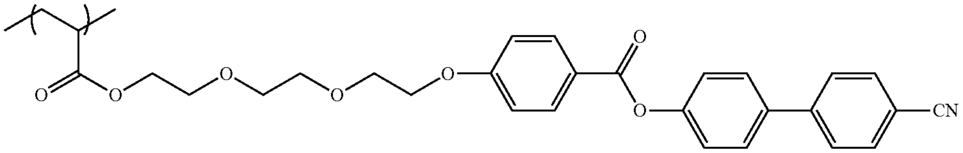
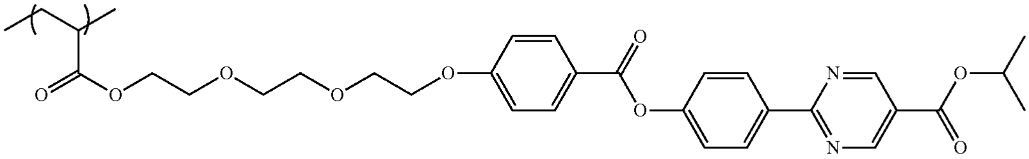
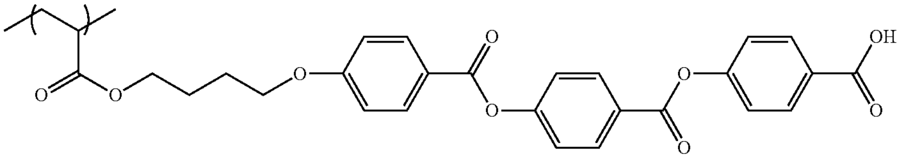
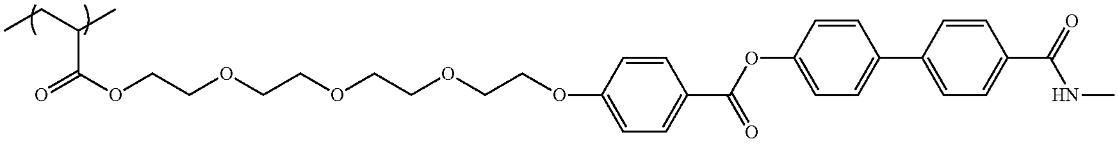
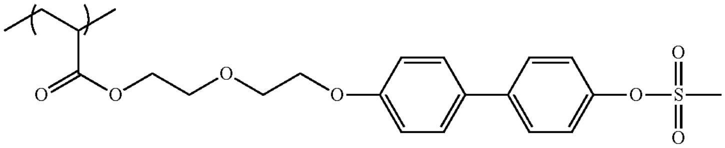
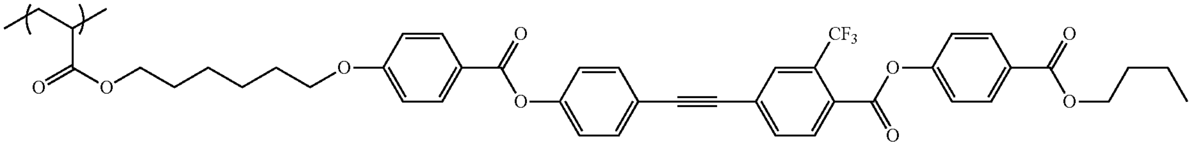
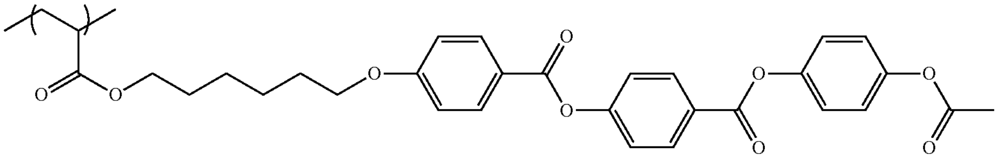
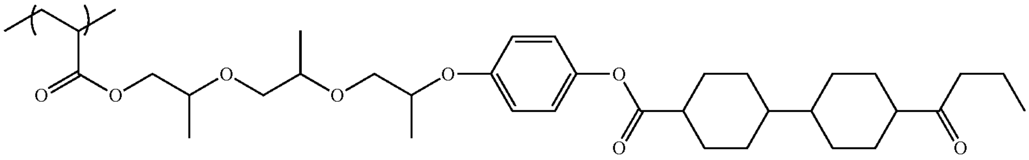

-continued

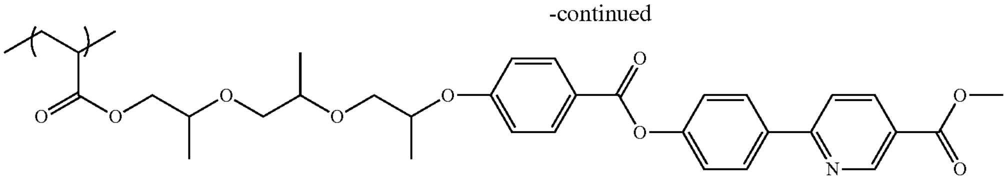

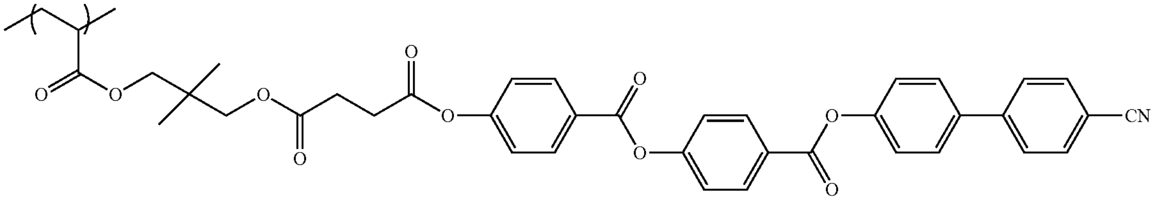

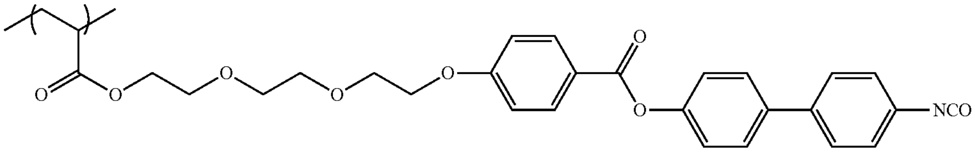

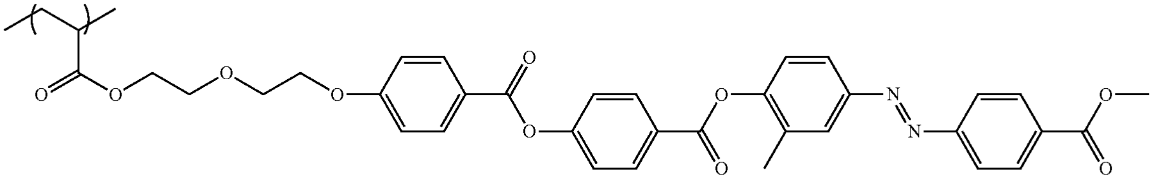

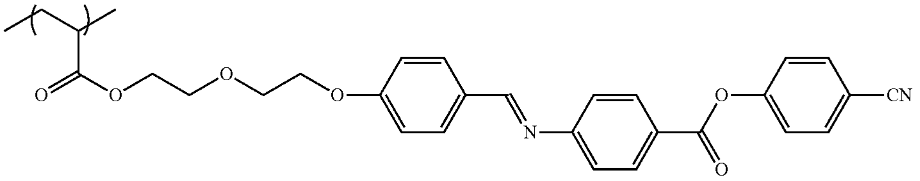

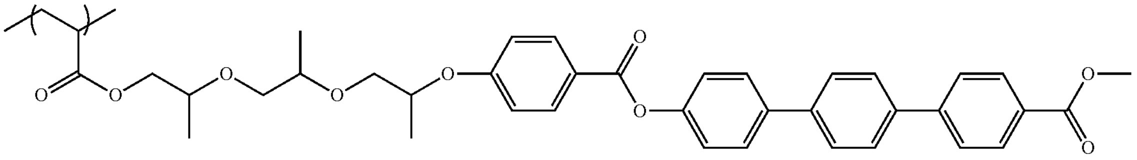

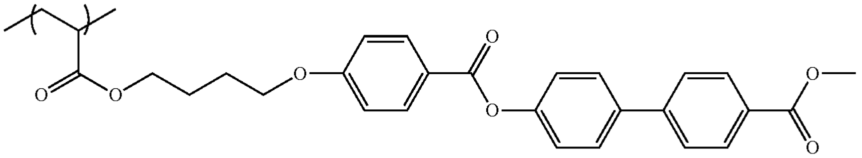

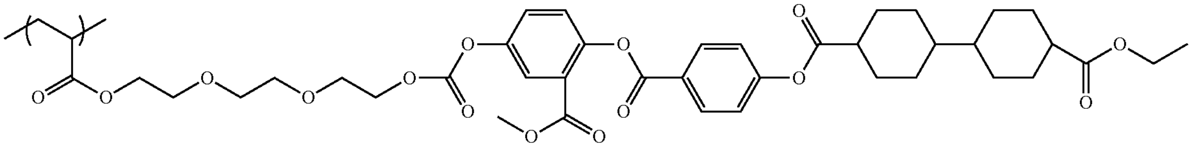

As a result of intensive studies on composition (content ratio) and electron-donating property and electron-withdrawing property of the terminal groups in the repeating unit (21) and the repeating unit (22), the present inventors have found that the alignment degree of the light-absorbing anisotropic layer is further increased by decreasing the content ratio of the repeating unit (21) in a case where the electron-withdrawing property of the electron-withdrawing group of the repeating unit (21) is high (that is, in a case where the σp value is large) and that the alignment degree of the light-absorbing anisotropic layer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is presumed as follows. That is, it is presumed that, since the intermolecular interaction due to an appropriate dipole moment works in the high-molecular-weight liquid crystalline compound, the orientation in which the liquid crystals are aligned is more uniform, and as a result, the degree of order of the liquid crystals and the alignment degree of the light-absorbing anisotropic layer are considered to be high.

Specifically, the product of the σp value of the above-described electron-withdrawing group (EWG in Formula (LCP-21)) in the repeating unit (21) and the content ratio (on a mass basis) of the repeating unit (21) to the high-molecular-weight liquid crystalline compound is preferably 0.020 to 0.150, more preferably 0.050 to 0.130, and particularly preferably 0.055 to 0.125. In a case where the above-described product is within the above-described range, the alignment degree of the light-absorbing anisotropic layer is further increased.

The repeating unit (22) has a mesogen group and a group which is present at the terminal of the mesogen group and has a σp value of 0 or less. In a case where the high-molecular-weight liquid crystalline compound has the repeating unit (22), the high-molecular-weight liquid crystalline compound and the dichroic substance can be uniformly aligned.

The mesogen group is a group representing a main skeleton of a liquid crystal molecule which contributes to liquid crystal formation, the details thereof are as described in MG of Formula (LCP-22) described below, and specific examples thereof are also the same as described below.

The above-described group is positioned at the terminal of the mesogen group and has a σp value of 0 or less. Examples of the above-described group (a group having a σp value of 0 or less) include a hydrogen atom having a σp value of 0, and a group (electron-donating group) which has a σp value of less than 0 and is represented by T22 in Formula (LCP-22) described below. Among the above-described groups, specific examples of the group (electron-donating group) having a σp value of less than 0 are the same as those for T22 in Formula (LCP-22) described below.

The σp value of the above-described group is 0 or less, and from the viewpoint that the uniformity of alignment is more excellent, it is preferably less than 0, more preferably −0.1 or less, and particularly preferably −0.2 or less. The lower limit value of the σp value of the above-described group is preferably −0.9 or more and more preferably −0.7 or more.

The repeating unit (22) is not particularly limited as long as it has, at a side chain thereof, the mesogen group and the group which is present at the terminal of the mesogen group and has a σp value of 0 or less, and from the viewpoint of further increasing the uniformity of alignment of liquid crystal, a repeating unit represented by Formula (PCP-22), which does not correspond to the above-described repeating unit represented by Formula (LCP-21), is preferable.

(LCP-22)

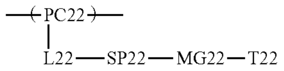

In Formula (LCP-22), PC22 represents a main chain of the repeating unit, and more specifically represents the same structure as that for PC1 in Formula (1) described above; L22 represents a single bond or a divalent linking group, and more specifically represents the same structure as that for L1 in Formula (1) described above; SP22 represents a spacer group, and more specifically represents the same structure as that for SP1 in Formula (1) described above; MG22 represents a mesogen structure, and more specifically represents the same structure as the mesogen group MG in Formula (LC) described above; and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the alignment degree of the light-absorbing anisotropic layer is further improved. Here, the "main chain" of T22 means the longest molecular chain bonded to MG22, and the number of hydrogen atoms is not included in the number of atoms in the main chain of T22. For example, in a case where T22 is an n-butyl group, the number of atoms in the main chain is 4, and in a case where T22 is an sec-butyl group, the number of atoms in the main chain is 3.

Hereinafter, examples of the repeating unit (22) are shown below, but the repeating unit (22) is not limited to the following repeating units.

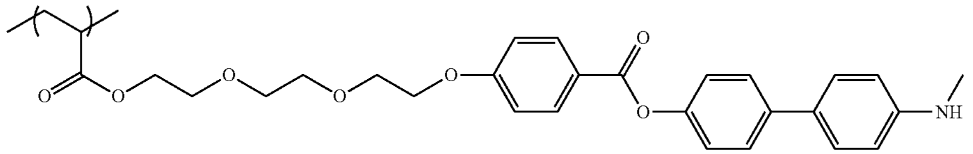

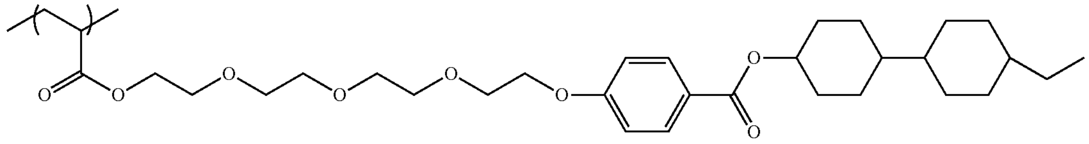

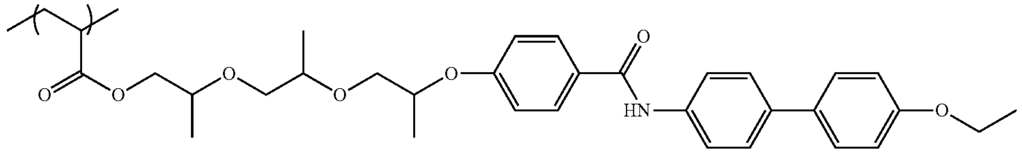

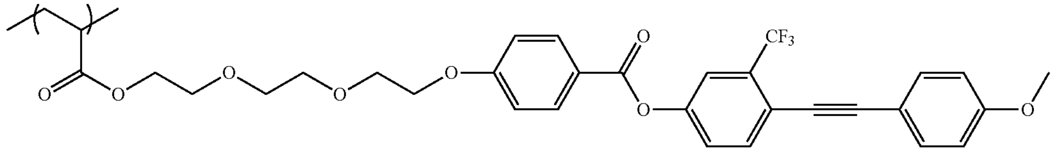

-continued
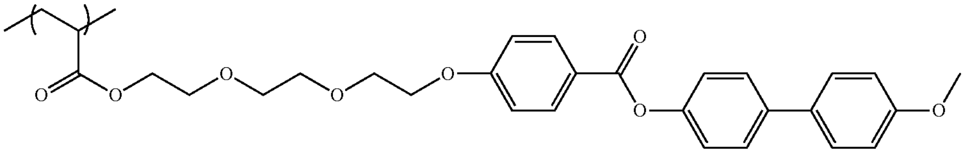
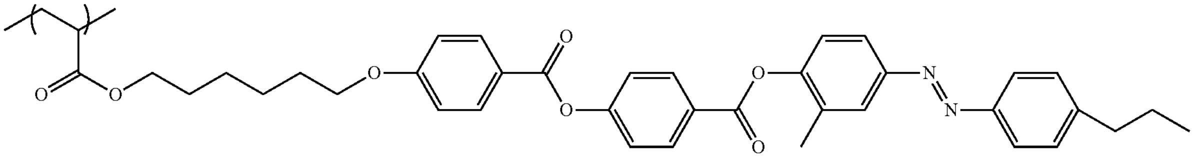
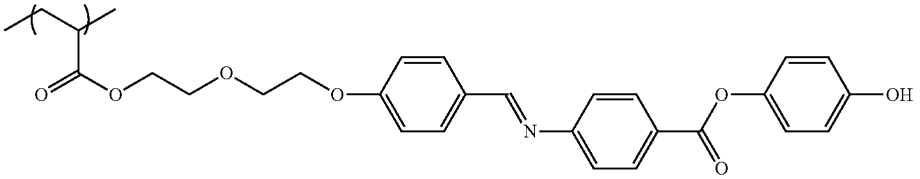
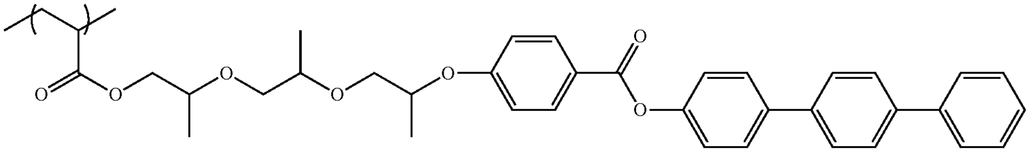
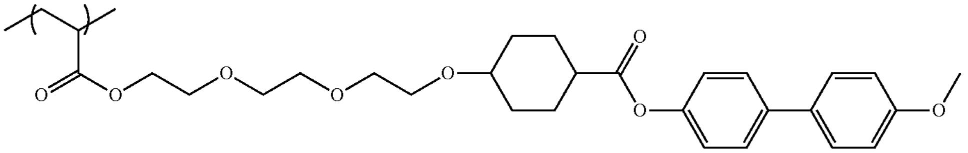
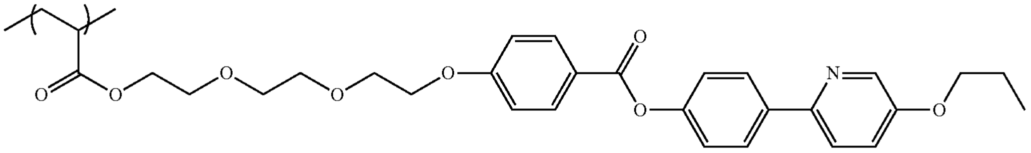
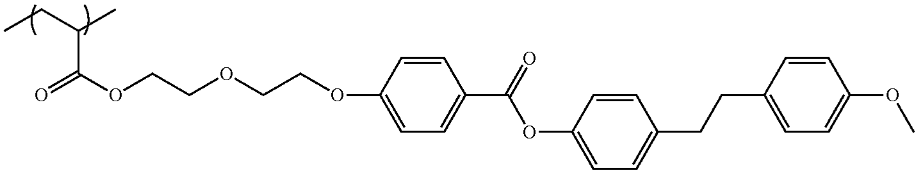
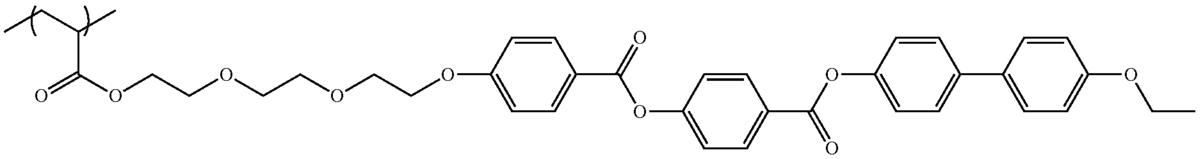
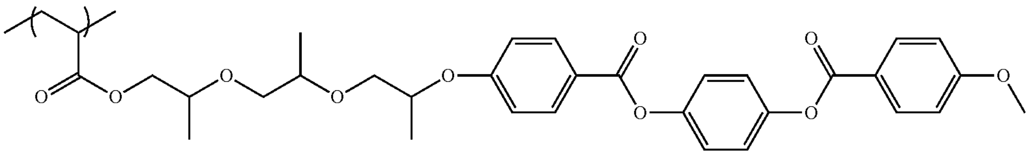
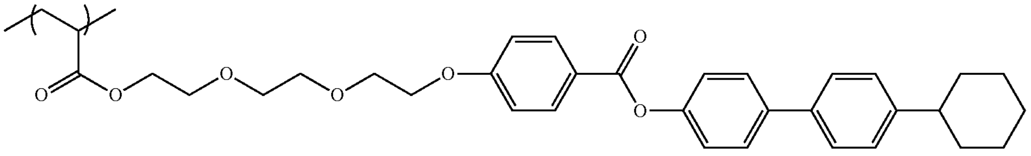

-continued

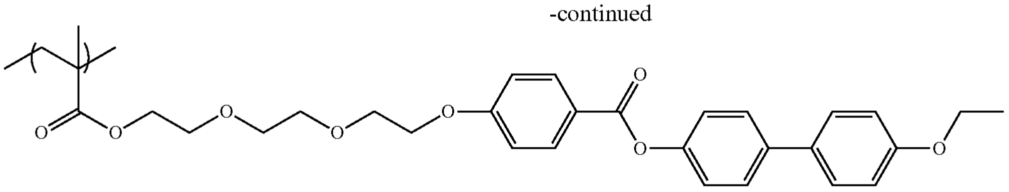

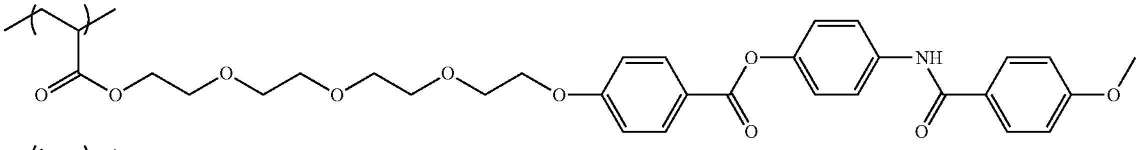

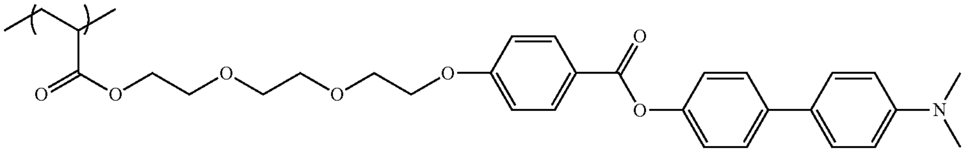

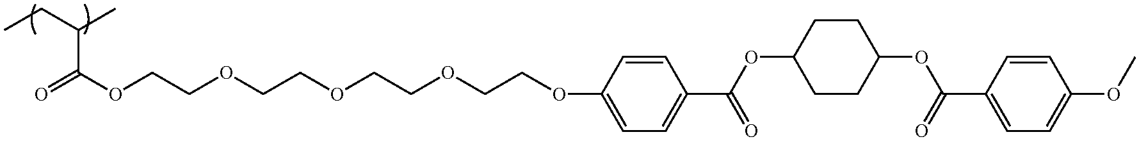

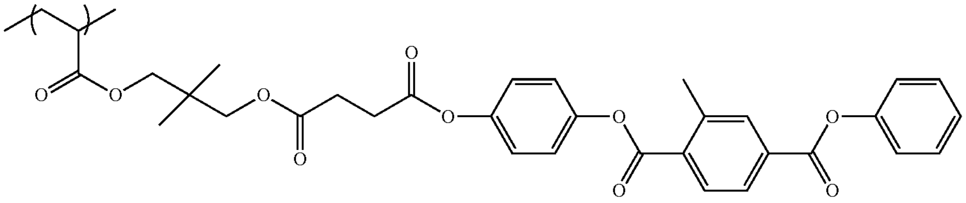

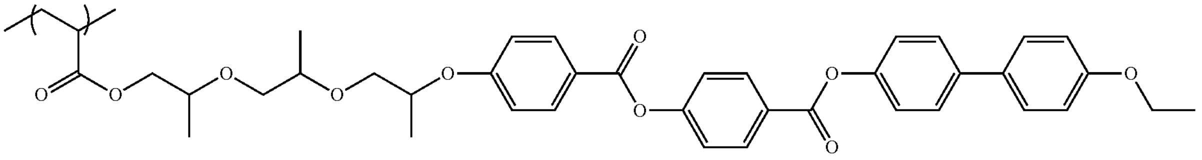

It is preferable that the structures of the repeating unit (21) and the repeating unit (22) have a part in common. It is presumed that the liquid crystals are uniformly aligned as the structures of repeating units are more similar to each other. In this manner, the alignment degree of the light-absorbing anisotropic layer is further improved.

Specifically, from the viewpoint of further increasing the alignment degree of the light-absorbing anisotropic layer, it is preferable to satisfy at least one of a condition that SP21A of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22); more preferable to satisfy two or more of the conditions; and particularly preferable to satisfy all the conditions.

From the viewpoint that the uniformity of alignment is excellent, a content of the repeating unit (22) is preferably 50% by mass or more, more preferably 55% or more, and particularly preferably 60% or more with respect to all repeating units (100% by mass) of the high-molecular-weight liquid crystalline compound.

From the viewpoint of improving the alignment degree, the upper limit value of the content of the repeating unit (22) is preferably 99% by mass or less and more preferably 97% by mass or less with respect to all repeating units (100% by mass) of the high-molecular-weight liquid crystalline compound.

The high-molecular-weight liquid crystalline compound may include only one of the repeating unit (22), or two or more kinds of the repeating units (22). In a case where the high-molecular-weight liquid crystalline compound includes two or more kinds of repeating units (22), there is an advantage in that solubility of the high-molecular-weight liquid crystalline compound in a solvent is improved and the liquid crystal phase transition temperature is easily adjusted. In the case where the high-molecular-weight liquid crystalline compound includes two or more kinds of repeating units (22), it is preferable that the total amount thereof is within the above-described range.

(Repeating Unit (3))

From the viewpoint of improving solubility in a general-purpose solvent, the high-molecular-weight liquid crystalline compound can include a repeating unit (3) not containing a mesogen. Particularly, in order to improve the solubility while suppressing a decrease in alignment degree, it is preferable that the repeating unit (3) not containing a mesogen is a repeating unit having a molecular weight of 280 or less. As described above, the reason why the solubility is improved while a decrease in alignment degree is suppressed by including the repeating unit having a molecular weight of 280 or less, which does not contain a mesogen, is presumed as follows.

That is, it is considered that, in a case where the high-molecular-weight liquid crystalline compound includes the repeating unit (3) not containing a mesogen in a molecular chain thereof, since a solvent is likely to enter the high-molecular-weight liquid crystalline compound, the solubility is improved, but the alignment degree is decreased due to the non-mesogenic repeating unit (3). However, it is presumed that, since the molecular weight of the above-described repeating unit is small, the alignment of the repeating unit (1), the repeating unit (21), or the repeating unit (22) described above, which contains the mesogen group, is unlikely to be disturbed, and thus the decrease in the alignment degree is suppressed.

It is preferable that the above-described repeating unit (3) is a repeating unit having a molecular weight of 280 or less.

The molecular weight of the repeating unit (3) does not indicate a molecular weight of a monomer used to obtain the repeating unit (3), but indicates the molecular weight of the repeating unit (3) in a state of being incorporated into the high-molecular-weight liquid crystalline compound by polymerization of the monomer.

The molecular weight of the repeating unit (3) is 280 or less, preferably 180 or less and more preferably 100 or less. The lower limit value of the molecular weight of the repeating unit (3) is commonly 40 or more, and preferably 50 or more. In a case where the molecular weight of the repeating unit (3) is 280 or less, a light-absorbing anisotropic layer having excellent solubility of the high-molecular-weight liquid crystalline compound and having a high alignment degree can be obtained.

On the other hand, in a case where the molecular weight of the repeating unit (3) is more than 280, the alignment of the liquid crystals in the portion of the repeating unit (1), the repeating unit (21), or the repeating unit (22) is disturbed, and thus the alignment degree is decreased. In addition, since the solvent is unlikely to enter the high-molecular-weight liquid crystalline compound, the solubility of the high-molecular-weight liquid crystalline compound is decreased.

Specific examples of the repeating unit (3) include a repeating unit which does not include a crosslinkable group (for example, an ethylenically unsaturated group) (hereinafter, also referred to as "repeating unit (3-1)"), and a repeating unit which includes the crosslinkable group (hereinafter, also referred to as "repeating unit (3-2)").

Repeating Unit (3-1)

Specific examples of a monomer used for polymerization of the repeating unit (3-1) include acrylic acid [72.1], α-alkylacrylic acids (such as methacrylic acid [86.1] and itaconic acid [130.1]), esters and amides derived from these acids (such as N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxyethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194.3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.2]), maleic acid [116.1], fumaric acid [116.1], p-styrenesulfonic acid [184.1], acrylonitrile [53.1], methacrylonitrile [67.1], dienes (such as butadiene [54.1], cyclopentadiene [66.1], and isoprene [68.1]), aromatic vinyl compounds (such as styrene [104.2], p-chlorostyrene [138.6], t-butylstyrene [160.3], and α-methylstyrene [118.2]), N-vinylpyrrolidone [111.1], N-vinyloxazolidone [113.1], N-vinyl succinimide [125.1], N-vinylformamide [71.1], N-vinyl-N-methylformamide [85.1], N-vinylacetamide [85.1], N-vinyl-N-methylacetamide [99.1], 1-vinylimidazole [94.1], 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1]. The numerical value in [ ] indicates the molecular weight of the monomer.

The above-described monomer may be used alone, or in combination of two or more kinds thereof.

Among the above-described monomers, acrylic acid, α-alkylacrylic acids, esters and amides derived from these acids, acrylonitrile, methacrylonitrile, or aromatic vinyl compounds are preferable.

As monomers other than the above-described monomers, compounds described in Research Disclosure No. 1955 (July, 1980) can be used.

Hereinafter, specific examples of the repeating unit (3-1) and molecular weights thereof are shown below, but the present invention is not limited to these specific examples.

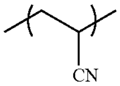

Mw: 53

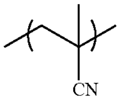

Mw: 67

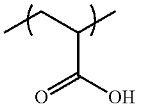

Mw: 72

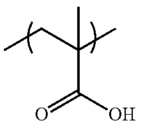

Mw: 86

-continued

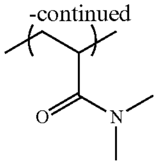

Mw: 93

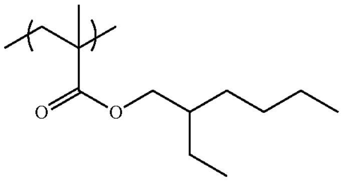

Mw: 184

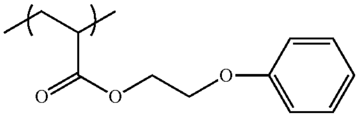

Mw: 192

Repeating Unit (3-2)

Specific examples of the crosslinkable group in the repeating unit (3-2) include the groups represented by P-1 to P-30 described above. Among these, a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is more preferable.

From the viewpoint of easily carrying out the polymerization, it is preferable that the repeating unit (3-2) is a repeating unit represented by Formula (3).

(3)

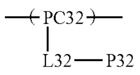

In Formula (3), PC32 represents a main chain of a repeating unit, and more specifically represents the same structure as that for PC1 in Formula (1) described above; L32 represents a single bond or a divalent linking group, and more specifically represents the same structure as that for L1 in Formula (1) described above; and P32 represents a crosslinkable group represented by any of Formulae (P-1) to (P-30) described above.

Hereinafter, specific examples of the repeating unit (3-2) and weight-average molecular weights (Mw) thereof are shown below, but the present invention is not limited to these specific examples.

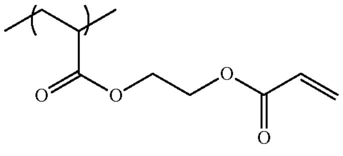

Mw: 170.16

-continued

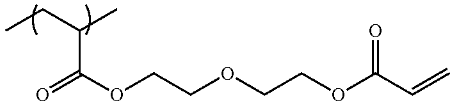

Mw: 214.22

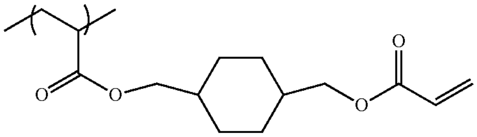

Mw: 252.31

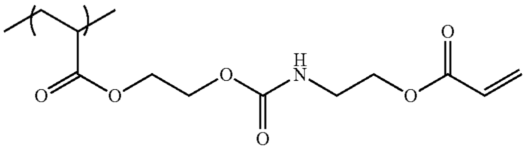

Mw: 257.24

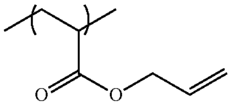

Mw: 112.13

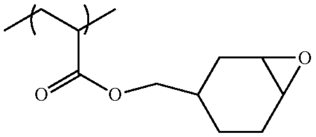

Mw: 182.22

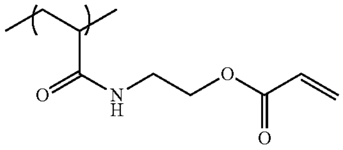

Mw: 169.18

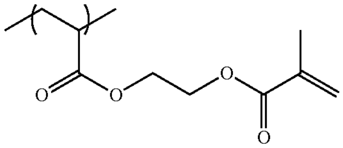

Mw: 184.19

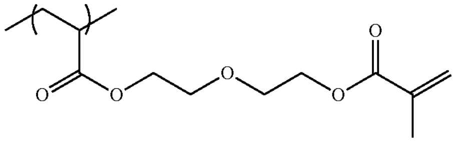

Mw: 228.24

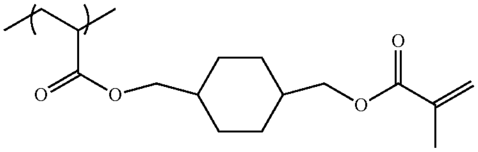

Mw: 226.34

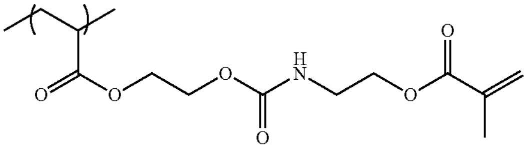

Mw: 271.27

-continued

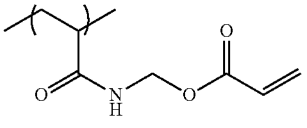

Mw: 151.15

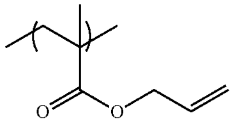

Mw: 126.16

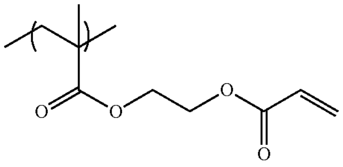

Mw: 184.19

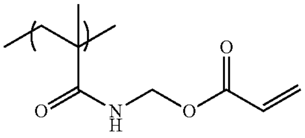

Mw: 169.18

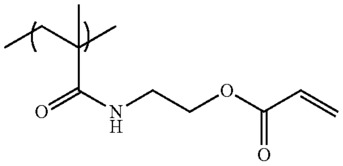

Mw: 183.21

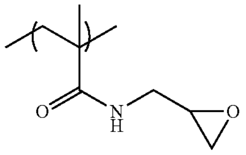

Mw: 142.15

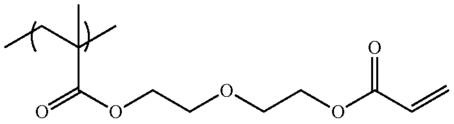

Mw: 228.24

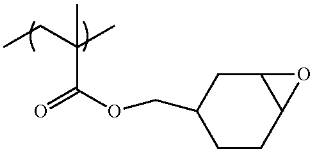

Mw: 196.25

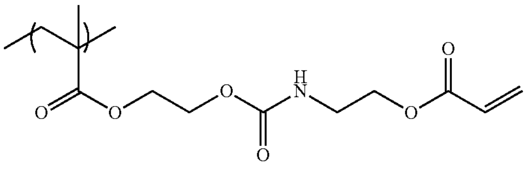

Mw: 271.27

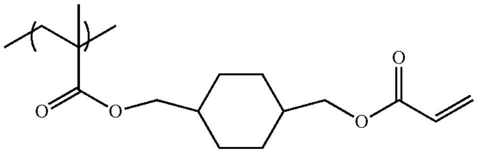

Mw: 266.34

A content of the repeating unit (3) is less than 14% by mass, preferably 7% by mass or less and more preferably 5% by mass or less with respect to all repeating units (100% by mass) of the high-molecular-weight liquid crystalline compound. The lower limit value of the content of the repeating unit (3) is preferably 2% by mass or more and more preferably 3% by mass or more with respect to all repeating units (100% by mass) of the high-molecular-weight liquid crystalline compound. In a case where the content of the repeating unit (3) is less than 14% by mass, the alignment degree of the light-absorbing anisotropic layer is further improved. In a case where the content of the repeating unit (3) is 2% by mass or more, the solubility of the high-molecular-weight liquid crystalline compound is further improved.

The high-molecular-weight liquid crystalline compound may include only one of the repeating unit (3), or two or more kinds of the repeating units (3). In the case where the high-molecular-weight liquid crystalline compound includes two or more kinds of repeating units (3), it is preferable that the total amount thereof is within the above-described range.

(Repeating Unit (4))

From the viewpoint of improving adhesiveness and planar uniformity, the high-molecular-weight liquid crystalline compound may include a repeating unit (4) having a flexible structure with a long molecular chain (SP4 in Formula (4) described below). The reason for this is presumed as follows.

That is, in a case where the high-molecular-weight liquid crystalline compound has such a flexible structure with a long molecular chain, entanglement of the molecular chains constituting the high-molecular-weight liquid crystalline compound is likely to occur, and aggregation destruction of the light-absorbing anisotropic layer (specifically, destruction of the light-absorbing anisotropic layer itself) is suppressed. As a result, it is presumed that adhesiveness between the light-absorbing anisotropic layer and an underlayer (for example, a base material or an alignment film) is improved. In addition, it is considered that a decrease in planar uniformity occurs due to low compatibility between the dichroic substance and the high-molecular-weight liquid crystalline compound. That is, it is considered that, in a case where the compatibility between the dichroic substance and the high-molecular-weight liquid crystalline compound is not sufficient, a planar defect (alignment defect) having the dichroic substance to be precipitated as a nucleus occurs. On the other hand, it is presumed that, in the case where the high-molecular-weight liquid crystalline compound has such a flexible structure with a long molecular chain, a light-absorbing anisotropic layer in which precipitation of the dichroic substance is suppressed and the planar uniformity is excellent is obtained. Here, the expression "planar uniformity is excellent" denotes that the alignment defect occurring in a case where the liquid crystal composition containing the high-molecular-weight liquid crystalline compound is repelled on the underlayer (for example, the base material or the alignment film) is less likely to occur.

The above-described repeating unit (4) is a repeating unit represented by Formula (4).

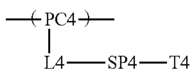

(4)

In Formula (4), PC4 represents a main chain of a repeating unit, and more specifically represents the same structure as that for PC1 in Formula (1) described above; L4 represents a single bond or a divalent linking group, and more specifically represents the same structure as that for L1 in Formula (1) described above (preferably a single bond); SP4 represents an alkylene group having 10 or more atoms in the main chain; and T4 represents a terminal group, and more specifically represents the same structure as that for T1 in Formula (1) described above.

Specific examples and suitable aspects of PC4 are the same as those for PC1 in Formula (1), and thus the description thereof will not be repeated.

From the viewpoint of further exhibiting the effect of the present invention, L4 is preferably a single bond.

In Formula (4), SP4 represents an alkylene group having 10 or more atoms in the main chain. Here, one or more of $—CH_2$-'s constituting the alkylene group represented by SP4 may be replaced with "SP—C" described above, and particularly preferably replaced with at least one group selected from the group consisting of —O—, —S—, $—N(R^{21})—$, —C(═O)—, —C(═S)—, $—C(R^{22})═C(R^{23})—$, an alkynylene group, $—Si(R^{24})(R^{25})—$, —N═N—, $—C(R^{26})═N—N═C(R^{27})—$, $—C(R^{28})═N—$, and $S(═O)_2—$. In addition, $R^{21}$ to $R^{28}$ each independently represent a hydrogen atom, a halogen atom, a cyano group, a nitro group, or a linear or branched alkyl group having 1 to 10 carbon atoms. In addition, the hydrogen atoms included in one or more of $—CH_2—$'s constituting the alkylene group represented by SP4 may be replaced with "SP—H" described above.

The number of atoms in the main chain of SP4 is 10 or more, and from the viewpoint of obtaining a light-absorbing anisotropic layer in which at least one of the adhesiveness or the planar uniformity is more excellent, the number of atoms thereof is preferably 15 or more and more preferably 19 or more. In addition, from the viewpoint of obtaining a light-absorbing anisotropic layer with a more excellent alignment degree, the upper limit of the number of atoms in the main chain of SP2 is preferably 70 or less, more preferably 60 or less, and particularly preferably 50 or less.

Here, the "main chain" of SP4 means a partial structure required for directly linking L4 and T4 to each other, and the "number of atoms in the main chain" means the number of atoms constituting the partial structure. In other words, the "main chain" of SP4 is a partial structure in which the number of atoms linking L4 and T4 to each other is the smallest. For example, in a case where SP4 is a 3,7-dimethyldecanyl group, the number of atoms in the main chain is 10, and in a case where SP4 is a 4,6-dimethyldodecanyl group, the number of atoms in the main chain is 12. In addition, in Formula (4-1), the inside of the frame shown by the dotted quadrangle corresponds to SP4, and the number of atoms in the main chain of SP4 (corresponding to the total number of atoms circled by the dotted line) is 11.

(4-1)

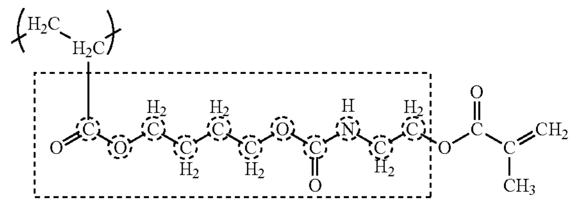

The alkylene group represented by SP4 may be linear or branched.

From the viewpoint of obtaining a light-absorbing anisotropic layer with a more excellent alignment degree, the number of carbon atoms in the alkylene group represented by SP4 is preferably 8 to 80, preferably 15 to 80, more preferably 25 to 70, and particularly preferably 25 to 60.

From the viewpoint of obtaining a light-absorbing anisotropic layer with more excellent adhesiveness and planar uniformity, it is preferable that one or more of $—CH_2—$'s constituting the alkylene group represented by SP4 are replaced with "SP—C" described above.

In addition, in a case of a plurality of $—CH_2—$'s constituting the alkylene group represented by SP4, from the viewpoint of obtaining a light-absorbing anisotropic layer with more excellent adhesiveness and planar uniformity, it is more preferable that only some of the plurality of $—CH_2—$'s are replaced with "SP—C" described above.

Among "SP—C", at least one group selected from the group consisting of —O—, —S—, $—N(R^{21})—$, —C(═O)—, —C(═S)—, $—C(R^{22})═C(R^{23})—$, an alkynylene group, $—Si(R^{24})(R^{25})—$, —N═N—, $—C(R^{26})═N—N═C(R^{27})—$, $—C(R^{28})═N—$, and $S(═O)_2—$ is preferable; and from the viewpoint of obtaining a light-absorbing anisotropic layer with more excellent adhesiveness and planar uniformity, at least one group selected from the group consisting of —O—, $—N(R^{21})—$, —C(═O)—, and $S(═O)_2—$ is more preferable, and at least one group selected from the group consisting of —O—, $—N(R^{21})—$, and C(═O)— is particularly preferable.

Particularly, it is preferable that SP4 is a group having at least one selected from the group consisting of an oxyalkylene structure in which one or more of $—CH_2—$'s constituting an alkylene group are replaced with —O—, an ester structure in which one or more of $—CH_2—CH_2—$'s constituting an alkylene group are replaced with —O— or C(═O)—, and a urethane bond in which one or more of $—CH_2—CH_2—CH_2—$'s constituting an alkylene group are replaced with —O—, —C(═O)—, or NH—.

The hydrogen atoms included in one or more of $—CH_2—$'s constituting the alkylene group represented by SP4 may be replaced with "SP—H" described above. In this case, one or more hydrogen atoms included in $—CH_2—$ may be replaced with "SP—H". That is, only one hydrogen atom included in $—CH_2—$ may be replaced with "SP—H", or all (two) hydrogen atoms included in $—CH_2—$ may be replaced with "SP—H".

Among "SP—H", at least one group selected from the group consisting of a halogen atom, a cyano group, a nitro group, a hydroxy group, a linear alkyl group having 1 to 10 carbon atoms, a branched alkyl group having 1 to 10 carbon atoms, and a halogenated alkyl group having 1 to 10 carbon atoms is preferable; and at least one group selected from the group consisting of a hydroxy group, a linear alkyl group having 1 to 10 carbon atoms, and a branched alkyl group having 1 to 10 carbon atoms is still more preferable.

As described above, T4 represents the same terminal group as that for T1, and is preferably a hydrogen atom, a methyl group, a hydroxy group, a carboxy group, a sulfonic acid group, a phosphoric acid group, a boronic acid group, an amino group, a cyano group, a nitro group, a phenyl group which may have a substituent, or -L-CL (L represents a single bond or a divalent linking group, and specific examples of the divalent linking group are the same as those for LW and SPW described above; CL represents a crosslinkable group, examples thereof include the group represented by Q1 or Q2 described above, and a crosslinkable group represented by any of Formulae (P-1) to (P-30) is preferable), in which CL is preferably a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group.

The epoxy group may be an epoxycycloalkyl group, and from the viewpoint that the effect of the present invention is more excellent, the number of carbon atoms in a cycloalkyl group moiety of the epoxycycloalkyl group is preferably 3 to 15, more preferably 5 to 12, and particularly preferably 6 (that is, it is still more preferable that the epoxycycloalkyl group is an epoxycyclohexyl group).

Examples of a substituent of the oxetanyl group include an alkyl group having 1 to 10 carbon atoms, and from the viewpoint that the effect of the present invention is more excellent, an alkyl group having 1 to 5 carbon atoms is preferable. The alkyl group as the substituent of the oxetanyl group may be linear or branched, but is preferably linear from the viewpoint that the effect of the present invention is more excellent.

Examples of a substituent of the phenyl group include a boronic acid group, a sulfonic acid group, a vinyl group, and an amino group, and from the viewpoint that the effect of the present invention is more excellent, a boronic acid group is preferable.

Specific examples of the repeating unit (4) include the following structures, but the present invention is not limited thereto. In the following specific examples, n1 represents an integer of 2 or more, and n2 represents an integer of 1 or more.

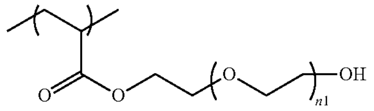

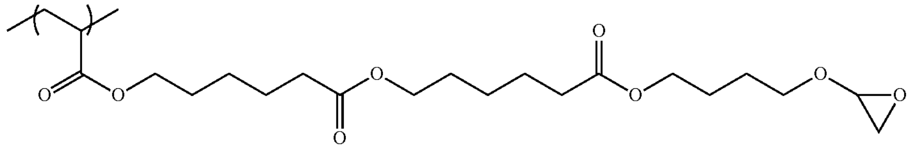

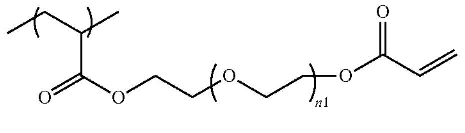

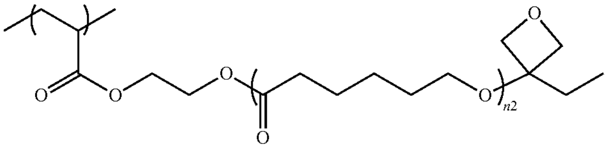

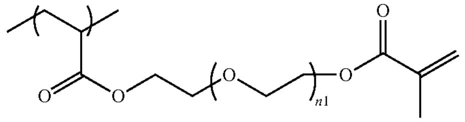

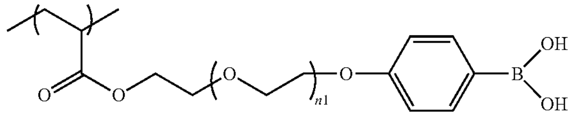

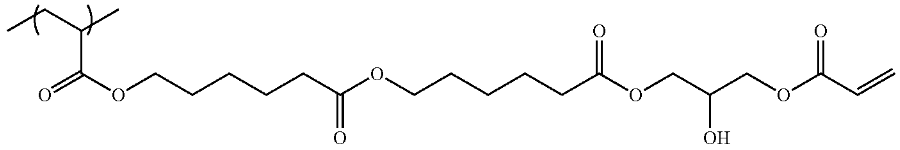

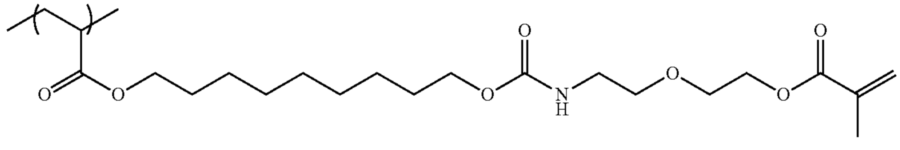

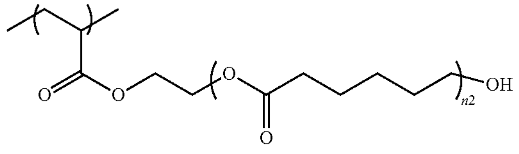

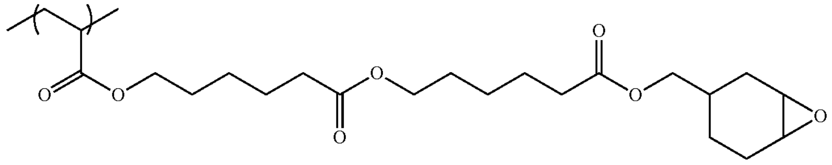

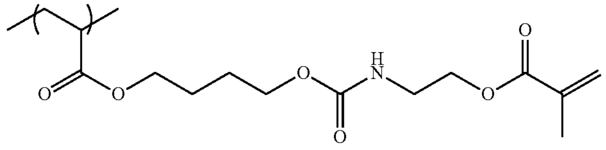

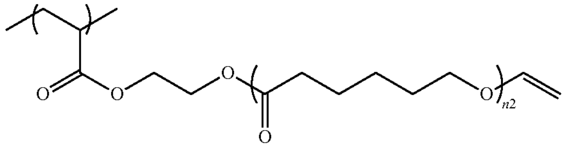

-continued

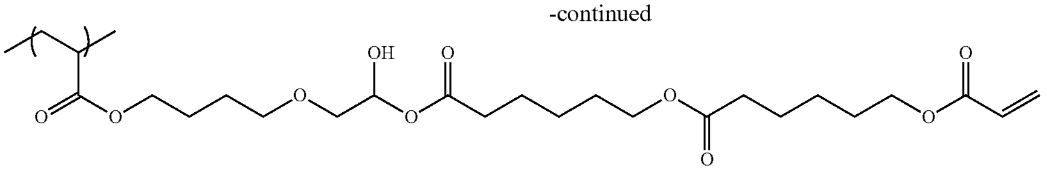

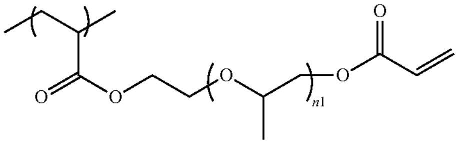

A content of the repeating unit (4) is preferably 2% to 20% by mass and more preferably 3% to 18% by mass with respect to all repeating units (100% by mass) of the high-molecular-weight liquid crystalline compound. In a case where the content of the repeating unit (4) is 2% by mass or more, a light-absorbing anisotropic layer having more excellent adhesiveness is obtained. In addition, in a case where the content of the repeating unit (4) is 20% by mass or less, a light-absorbing anisotropic layer having more excellent planar uniformity is obtained.

The high-molecular-weight liquid crystalline compound may include only one of the repeating unit (4), or two or more kinds of the repeating units (4). In a case where the high-molecular-weight liquid crystalline compound includes two or more kinds of repeating units (4), the above-described content of the repeating unit (4) indicates the total content of the repeating units (4).

(Repeating Unit (5))

From the viewpoint of the planar uniformity, the high-molecular-weight liquid crystalline compound can include a repeating unit (5) to be introduced by polymerizing a polyfunctional monomer. Particularly, in order to improve the planar uniformity while suppressing a decrease in alignment degree, it is preferable that the high-molecular-weight liquid crystalline compound includes 10% by mass or less of the repeating unit (5) to be introduced by polymerizing a polyfunctional monomer. As described above, the reason why the planar uniformity can be improved while a decrease in alignment degree is suppressed by including 10% by mass or less of the repeating unit (5) is presumed as follows.

The repeating unit (5) is a unit to be introduced to the high-molecular-weight liquid crystalline compound by polymerizing a polyfunctional monomer. Therefore, it is considered that the high-molecular-weight liquid crystalline compound includes a high-molecular-weight body in which a three-dimensional crosslinking structure is formed by the repeating unit (5). Here, since the content of the repeating unit (5) is small, the content of the high-molecular-weight body including the repeating unit (5) is considered to be very small.

It is presumed that a light-absorbing anisotropic layer in which cissing of the liquid crystal composition is suppressed and the planar uniformity is excellent is obtained due to the presence of a very small amount of the high-molecular-weight body with the three-dimensional crosslinking structure formed as described above.

In addition, it is presumed that the effect of suppressing a decrease in alignment degree can be maintained because the content of the high-molecular-weight body is very small.

It is preferable that the above-described repeating unit (5) to be introduced by polymerizing a polyfunctional monomer is a repeating unit represented by Formula (5).

(5)

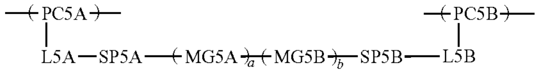

In Formula (5), PC5A and PC5B represent the main chain of the repeating unit, and more specifically represent the same structure as that for PC1 in Formula (1) described above; L5A and L5B represent a single bond or a divalent linking group, and more specifically represents the same structure as that for L1 in Formula (1) described above; SP5A and SP5B represent a spacer group, and more specifically represents the same structure as that for SP1 in Formula (1) described above; MG5A and MG5B represent a mesogen structure, and more specifically represent the same structure as that for the mesogen group MG in Formula (LC) described above; and a and b represent an integer of 0 or 1.

PC5A and PC5B may be the same group or groups different from each other, but from the viewpoint of further improving the alignment degree of the light-absorbing anisotropic layer, it is preferable that PC5A and PC5B are the same group.

Both L5A and L5B may be a single bond, the same group, or groups different from each other, but from the viewpoint of further improving the alignment degree of the light-absorbing anisotropic layer, both L5A and L5B are preferably a single bond or the same group, and more preferably the same group.

Both SP5A and SP5B may be a single bond, the same group, or groups different from each other, but from the viewpoint of further improving the alignment degree of the light-absorbing anisotropic layer, both SP5A and SP5B are preferably a single bond or the same group, and more preferably the same group.

Here, the same group in Formula (5) means that the chemical structures thereof are the same regardless of the orientation in which each group is bonded. For example, even in a case where SP5A is *—$CH_2$—$CH_2$—O—** (* represents a bonding position to L5A, and ** represents a bonding position to MG5A) and SP5B is *—O—$CH_2$—$CH_2$—** (* represents a bonding position to MG5B, and ** represents a bonding position to L5B), SP5A and SP5B are the same group.

a and b are each independently an integer of 0 or 1, and preferably 1 from the viewpoint of further improving the alignment degree of the light-absorbing anisotropic layer.

a and b may be the same or different from each other, but from the viewpoint of further improving the alignment degree of the light-absorbing anisotropic layer, it is preferable that both a and b are 1.

From the viewpoint of further improving the alignment degree of the light-absorbing anisotropic layer, the sum of a and b is preferably 1 or 2 (that is, the repeating unit represented by Formula (5) has a mesogen group), and more preferably 2.

From the viewpoint of further improving the alignment degree of the light-absorbing anisotropic layer, it is preferable that the partial structure represented by -$(MG5A)_a$-$(MG5B)_b$- has a cyclic structure. In this case, from the viewpoint of further improving the alignment degree of the light-absorbing anisotropic layer, the number of cyclic structures in the partial structure represented by -$(MG5A2)_a$-$(MG5B)_b$— is preferably 2 or more, more preferably 2 to 8, still more preferably 2 to 6, and particularly preferably 2 to 4.

From the viewpoint of further improving the alignment degree of the light-absorbing anisotropic layer, the mesogen groups represented by MG5A and MG5B each independently preferably include one or more cyclic structures, more preferably include 2 to 4 cyclic structures, still more preferably include 2 or 3 cyclic structures, and particularly preferably include 2 cyclic structures.

Specific examples of the cyclic structure include an aromatic hydrocarbon group, a heterocyclic group, and an alicyclic group, and among these, an aromatic hydrocarbon group or an alicyclic group is preferable.

MG5A and MG5B may be the same group or groups different from each other, but from the viewpoint of further improving the alignment degree of the light-absorbing anisotropic layer, it is preferable that MG5A and MG5B are the same group.

As the mesogen group represented by MG5A and MG5B, from the viewpoint of expressing the liquid crystallinity, adjusting a liquid crystal phase transition temperature, availability of raw materials, and synthetic suitability, and from the viewpoint that the effect of the present invention is more excellent, the mesogen group MG in Formula (LC) described above is preferable.

Particularly, in the repeating unit (5), it is preferable that PC5A and PC5B are the same group, both L5A and L5B are a single bond or the same group, both SP5A and SP5B are a single bond or the same group, and MG5A and MG5B are the same group. In this manner, the alignment degree of the light-absorbing anisotropic layer is further improved.

A content of the repeating unit (5) is preferably 10% by mass or less, more preferably 0.001% to 5% by mass, and still more preferably 0.05% to 3% by mass with respect to the content (100% by mass) of all repeating units of the high-molecular-weight liquid crystalline compound.

The high-molecular-weight liquid crystalline compound may include only one of the repeating unit (5), or two or more kinds of the repeating units (5). In the case where the high-molecular-weight liquid crystalline compound includes two or more kinds of repeating units (5), it is preferable that the total amount thereof is within the above-described range.

(Star-Shaped Polymer)

The high-molecular-weight liquid crystalline compound may be a star-shaped polymer. The star-shaped polymer in the present invention means a polymer having three or more polymer chains extending from the nucleus, and is specifically represented by Formula (6).

The star-shaped polymer represented by Formula (6) as the high-molecular-weight liquid crystalline compound can form a light-absorbing anisotropic layer having a high alignment degree while having high solubility (excellent solubility in a solvent).

$$A\text{—}(PI)_{n_A} \quad (6)$$

In Formula (6), $n_A$ represents an integer of 3 or more, and preferably an integer of 4 or more. The upper limit value of $n_A$ is not limited thereto, but is commonly 12 or less and preferably 6 or less.

A plurality of PI's each independently represent a polymer chain having any of the repeating units represented by Formulae (1), (21), (22), (3), (4), and (5) described above. However, at least one of the plurality of PI's represents a polymer chain having the repeating unit represented by Formula (1) described above.

A represents an atomic group which is the nucleus of the star-shaped polymer. Specific examples of A include structures obtained by removing hydrogen atoms from thiol groups of a polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups in the above-described polyfunctional thiol compound from which A is derived is preferably 3 or more and more preferably 4 or more. The upper limit value of the number of thiol groups in the polyfunctional thiol compound is commonly 12 or less and preferably 6 or less.

Specific examples of the polyfunctional thiol compound are shown below.

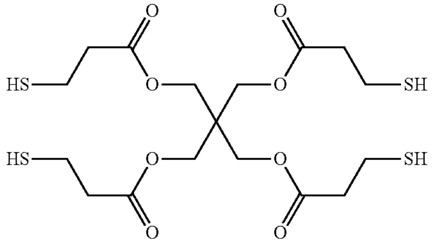

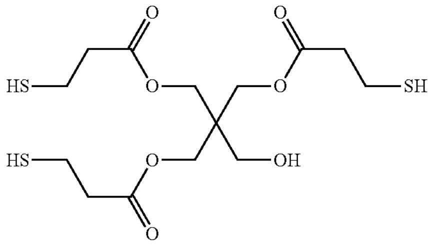

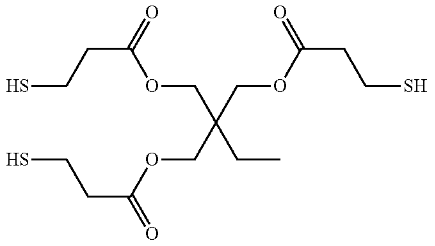

-continued
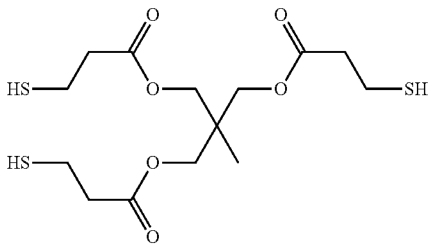
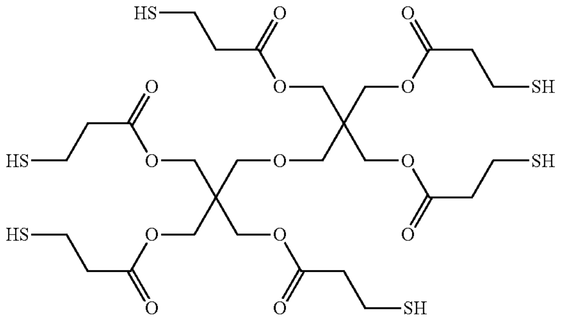
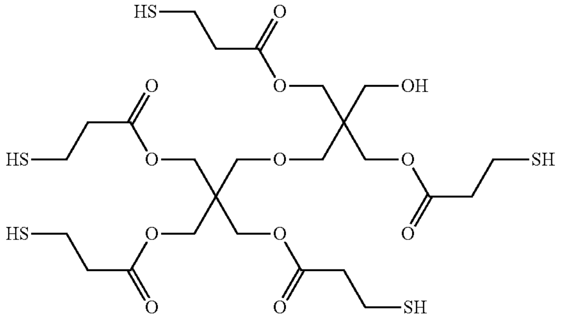
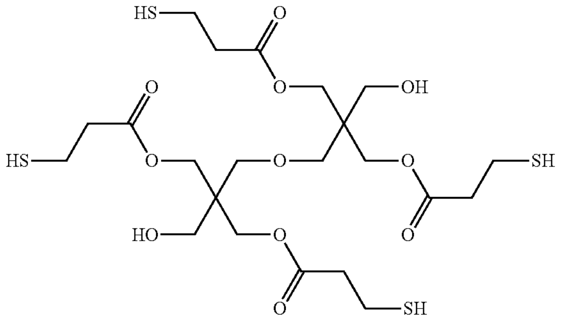
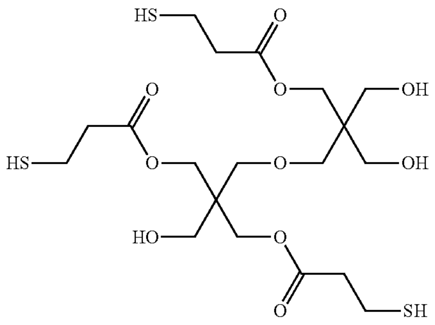
-continued
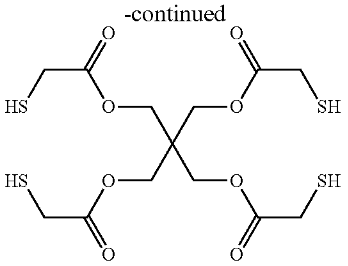
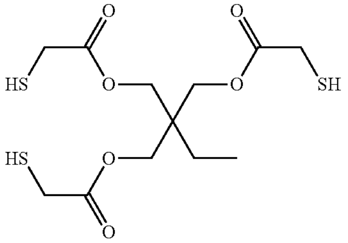
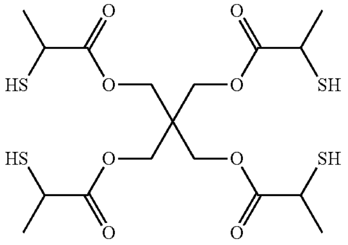
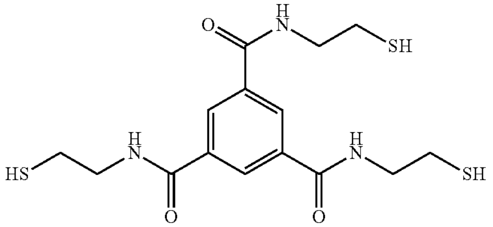
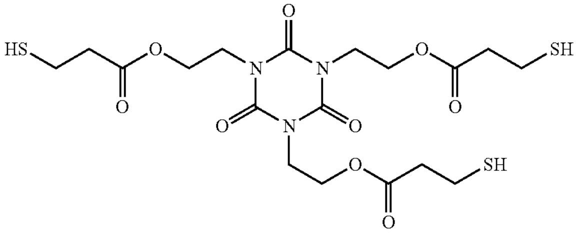
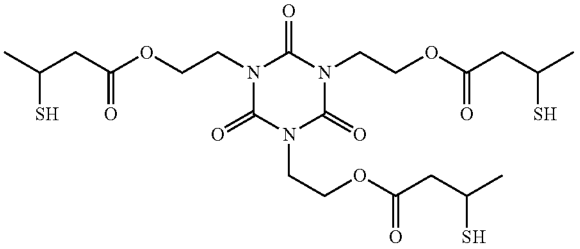
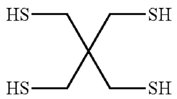
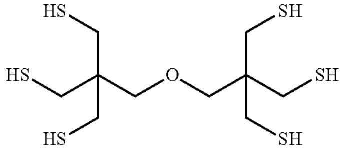
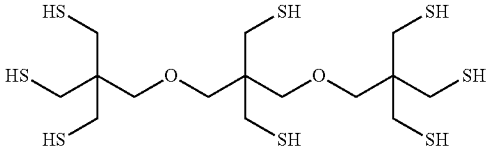

-continued

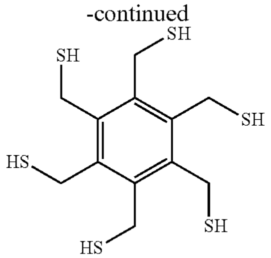

From the viewpoint of improving the alignment degree, the high-molecular-weight liquid crystalline compound may be a thermotropic liquid crystal and a crystalline polymer.

(Thermotropic Liquid Crystal)

A thermotropic liquid crystal is a liquid crystal which shows transition to a liquid crystal phase due to a change in temperature.

The specific compound is the thermotropic liquid crystal, and the thermotropic liquid crystal may exhibit any of a nematic phase or a smectic phase, but from the reason that the alignment degree of the light-absorbing anisotropic layer is further increased and haze is unlikely to be observed (haze is better), it is preferable that the thermotropic liquid crystal exhibits at least a nematic phase. A temperature range showing the nematic phase is preferably room temperature (23° C.) to 450° C. from the viewpoint that the alignment degree of the light-absorbing anisotropic layer is further increased and the haze is unlikely to be observed, and more preferably 40° C. to 400° C. from the viewpoint of handle-ability and manufacturing suitability.

(Crystalline Polymer)

The crystalline polymer is a polymer showing a transition to a crystal layer due to a change in temperature. The crystalline polymer may show a glass transition other than the transition to the crystal layer.

From the viewpoint that the alignment degree of the light-absorbing anisotropic layer is further increased and the haze is unlikely to be observed, it is preferable that the crystalline polymer is a high-molecular-weight liquid crystalline compound which has a transition from a crystal phase to a liquid crystal phase in a case of being heated (glass transition may be present in the middle of the transition), or a high-molecular-weight liquid crystalline compound which has a transition to a crystal phase in a case where the temperature is lowered after entering a liquid crystal state by being heated (glass transition may be present in the middle of the transition).

The presence or absence of crystallinity of the high-molecular-weight liquid crystalline compound is evaluated as follows.

Two light-absorbing anisotropic layers of an optical microscope (ECLIPSE E600 POL, manufactured by Nikon Corporation) are arranged to be orthogonal to each other, and a sample table is set between the two light-absorbing anisotropic layers. A small amount of the high-molecular-weight liquid crystalline compound is placed on slide glass, and the slide glass is set on a hot stage placed on the sample table. While the state of the sample is observed, the temperature of the hot stage is increased to a temperature at which the high-molecular-weight liquid crystalline compound exhibits liquid crystallinity, and the high-molecular-weight liquid crystalline compound is allowed to enter a liquid crystal state. After the high-molecular-weight liquid crystalline compound enters the liquid crystal state, the behavior of the liquid crystal phase transition is observed while the temperature of the hot stage is gradually lowered, and the temperature of the liquid crystal phase transition is recorded. In a case where the high-molecular-weight liquid crystalline compound exhibits a plurality of liquid crystal phases (for example, a nematic phase and a smectic phase), all the transition temperatures are also recorded.

Next, approximately 5 mg of a sample of the high-molecular-weight liquid crystalline compound is put into an aluminum pan, and the pan is covered and set on a differential scanning calorimeter (DSC) (an empty aluminum pan is used as a reference). The high-molecular-weight liquid crystalline compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the high-molecular-weight liquid crystalline compound has crystallinity.

On the other hand, in a case where an exothermic peak is not observed at a temperature other than the liquid crystal phase transition temperature, it can be said that the high-molecular-weight liquid crystalline compound does not have crystallinity.

A method of obtaining the crystalline polymer is not particularly limited, but as a specific example, a method of using a high-molecular-weight liquid crystalline compound including the above-described repeating unit (1) is preferable, and a method of using a suitable aspect among high-molecular-weight liquid crystalline compounds having the described above repeating unit (1) is more preferable.

Crystallization Temperature

From the viewpoint that the alignment degree of the light-absorbing anisotropic layer is further increased and the haze is unlikely to be observed, the crystallization temperature of the high-molecular-weight liquid crystalline compound is preferably −50° C. or higher and lower than 150° C., more preferably 120° C. or lower, still more preferably −20° C. or higher and lower than 120° C., and particularly preferably 95° C. or lower. From the viewpoint of reducing haze, the above-described crystallization temperature of the high-molecular-weight liquid crystalline compound is preferably lower than 150° C.

The crystallization temperature is a temperature of an exothermic peak due to crystallization in the above-described DSC.

(Molecular Weight)

From the viewpoint that the effect of the present invention is more excellent, a weight-average molecular weight (Mw) of the high-molecular-weight liquid crystalline compound is preferably 1000 to 500,000 and more preferably 2,000 to 300,000. In a case where the Mw of the high-molecular-weight liquid crystalline compound is within the above-described range, the high-molecular-weight liquid crystalline compound is easily handled.

In particular, from the viewpoint of suppressing cracking during coating, the weight-average molecular weight (Mw) of the high-molecular-weight liquid crystalline compound is preferably 10,000 or more and more preferably 10,000 to 300,000.

In addition, from the viewpoint of temperature latitude of the alignment degree, the weight-average molecular weight (Mw) of the high-molecular-weight liquid crystalline compound is preferably less than 10,000 and preferably 2,000 or more and less than 10,000.

Here, the weight-average molecular weight and the number-average molecular weight in the present invention are values measured by a gel permeation chromatography (GPC) method.

Solvent (eluent): N-methylpyrrolidone

Device name: TOSOH HLC-8220GPC

Column: using three columns of TOSOH TSKgel Super AWM-H (6 mm×15 cm) connected

Column temperature: 25° C.

Sample concentration: 0.1% by mass

Flow rate: 0.35 mL/min

Calibration curve: TSK standard polystyrene (manufactured by TOSOH Corporation), calibration curves of 7 samples with Mw of 2,800,000 to 1,050 (Mw/Mn=1.03 to 1.06) are used The high-molecular-weight liquid crystalline compound may exhibit nematic or smectic liquid crystallinity, but it is preferable that the high-molecular-weight liquid crystalline compound exhibits at least the nematic liquid crystallinity.

The temperature range at which the nematic phase is exhibited is preferably 0° C. to 450° C., and from the viewpoint of handleability and manufacturing suitability, preferably 30° C. to 400° C.

<Content>

From the viewpoint that the effect of the present invention is more excellent, a content of the liquid crystalline compound is preferably 10% to 97% by mass, more preferably 40% to 95% by mass, and still more preferably 60% to 95% by mass with respect to the total solid content (100% by mass) of the liquid crystal composition.

In a case where the liquid crystalline compound includes a high-molecular-weight liquid crystalline compound, a content of the high-molecular-weight liquid crystalline compound is preferably 10% to 99% by mass, more preferably 30% to 95% by mass, and still more preferably 40% to 90% by mass with respect to the total mass (100 parts by mass) of the liquid crystalline compound.

In a case where the liquid crystalline compound includes a low-molecular-weight liquid crystalline compound, a content of the low-molecular-weight liquid crystalline compound is preferably 1% to 90% by mass, more preferably 5% to 70% by mass, and still more preferably 10% to 60% by mass with respect to the total mass (100 parts by mass) of the liquid crystalline compound.

In a case where the liquid crystalline compound includes both the high-molecular-weight liquid crystalline compound and the low-molecular-weight liquid crystalline compound, from the viewpoint that the effect of the present invention is more excellent, a mass ratio (low-molecular-weight liquid crystalline compound/high-molecular-weight liquid crystalline compound) of the content of the low-molecular-weight liquid crystalline compound to the content of the high-molecular-weight liquid crystalline compound is preferably 5/95 to 70/30 and more preferably 10/90 to 50/50.

Here, the "solid content in the liquid crystal composition" denotes a component excluding a solvent, and specific examples of the solid content include the above-described liquid crystalline compound, and a dichroic substance, a polymerization initiator, an interface improver described later.

<Dichroic Substance>

The liquid crystal composition further contains a dichroic substance.

In the present invention, the dichroic substance means a coloring agent having different absorbances depending on directions. The dichroic substance may or may not exhibit liquid crystallinity.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). In addition, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-$H_{11}$-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

In the present invention, it is preferable to use a dichroic organic coloring agent as the dichroic substance.

The dichroic organic coloring agent is not particularly limited, but a dichroic azo coloring agent compound is preferable, and a dichroic azo coloring agent compound used for a so-called coating-type polarizer is suitably used.

The dichroic azo coloring agent compound is not particularly limited, and known dichroic azo coloring agents in the related art can be used.

Here, the dichroic azo coloring agent compound means a coloring agent having different absorbances depending on directions.

The dichroic azo coloring agent compound may or may not exhibit liquid crystallinity.

In a case where the dichroic azo coloring agent compound exhibits liquid crystallinity, any of nematic properties or smectic properties may be exhibited. The temperature range at which the liquid crystal phase is exhibited is preferably room temperature (approximately 20° C. to 28° C.) to 300° C., and from the viewpoint of handleability and manufacturing suitability, more preferably 50° C. to 200° C.

In the present invention, two or more kinds of dichroic substances may be used in combination. For example, from the viewpoint of making the color of the light-absorbing anisotropic layer to be formed closer to black, it is preferable that at least one dichroic substance having a maximal absorption wavelength in a wavelength range of 370 to 550 nm and at least one dichroic substance having a maximal absorption wavelength in a wavelength range of 500 to 700 nm are used in combination.

A content of the dichroic substance is not particularly limited, but from the reason that the alignment degree of the formed light-absorbing anisotropic layer is further increased, it is preferably 5% by mass or more, more preferably 8% by mass or more, still more preferably 10% by mass or more, and particularly preferably 10% to 30% by mass with respect to the total solid content mass of the liquid crystal composition. In a case where a plurality of dichroic substances are used in combination, it is preferable that the total amount of the plurality of dichroic substances is within the above-described range.

<Alignment Agent>

It is preferable that the liquid crystal composition further contains an alignment agent. Examples of the alignment agent include those described in paragraphs [0042] to [0076] of JP2013-543526A, paragraphs [0089] to [0097] of JP2016-523997A, paragraphs [0153] to [0170] of JP2020-076920A, and the like, and these may be used alone or in combination of two or more.

In the present invention, from the reason that the alignment degree of the formed light-absorbing anisotropic layer is increased, it is preferable that the above-described alignment agent is an onium compound represented by Formula (B1).

(B1)

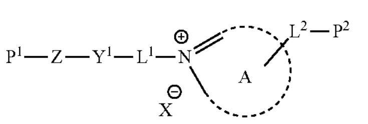

In Formula (B1), a ring A represents a quaternary ammonium ion consisting of a nitrogen-containing heterocyclic ring.

In addition, X represents an anion.

In addition, $L^1$ represents a divalent linking group.

In addition, $L^2$ represents a single bond or a divalent linking group.

In addition, $Y^1$ represents a divalent linking group having a 5-membered ring or a 6-membered ring as a partial structure.

In addition, Z represents a divalent linking group having an alkylene group having 2 to 20 carbon atoms as a partial structure.

In addition, $P^1$ and $P^2$ each independently represent a monovalent substituent having a polymerizable ethylenically unsaturated bond.

The ring A represents a quaternary ammonium ion consisting of a nitrogen-containing heterocyclic ring. Examples of the ring A include a pyridine ring, a picoline ring, a 2,2'-bipyridyl ring, a 4,4'-bipyridyl ring, a 1,10-phenanthroline ring, a quinoline ring, an oxazole ring, a thiazole ring, an imidazole ring, a pyrazine ring, a triazole ring, and a tetrazole ring, and the ring A is preferably a quaternary imidazolium ion or a quaternary pyridinium ion.

X represents an anion. Examples of X include a halogen anion (for example, a fluorine ion, a chlorine ion, a bromine ion, an iodine ion, and the like), a sulfonate ion (for example, a methanesulfonate ion, a trifluoromethanesulfonate ion, a methylsulfate ion, a vinylsulfonate ion, an allylsulfonate ion, a p-toluenesulfonate ion, a p-chlorobenzenesulfonate ion, a p-vinylbenzenesulfonate ion, a 1,3-benzenedisulfonate ion, a 1,5-naphthalenedisulfonate ion, a 2,6-naphthalenedisulfonate ion, and the like), a sulfate ion, a carbonate ion, a nitrate ion, a thiocyanate ion, a perchlorate ion, a tetrafluoroborate ion, a picrate ion, an acetate ion, a benzoate ion, a p-vinyl benzoate ion, a formate ion, a trifluoroacetate ion, a phosphate ion (for example, hexafluorophosphate ion), and a hydroxide ion. X is preferably a halogen anion, a sulfonate ion, or a hydroxide ion. In addition, a chlorine ion, a bromine ion, an iodine ion, a methanesulfonate ion, a vinylsulfonate ion, a p-toluenesulfonate ion, or a p-vinylbenzenesulfonate ion is particularly preferable.

$L^1$ represents a divalent linking group. Examples of $L^1$ include a divalent linking group having 1 to 20 carbon atoms, consisting of a combination of an alkylene group, —O—, —S—, —CO—, —$SO_2$—, —NRa- (here, Ra is an alkyl group having 1 to 5 carbon atoms or a hydrogen atom), an alkenylene group, an alkynylene group, and an arylene group. $L^1$ is preferably -AL-, —O-AL-, —CO—O-AL-, or —O—CO-AL-, each of which has 1 to 10 carbon atoms, more preferably -AL- or —O-AL-, each of which has 1 to 10 carbon atoms, and most preferably -AL- or —O-AL-, each of which has 1 to 5 carbon atoms. AL represents an alkylene group.

$L^2$ represents a single bond or a divalent linking group. Examples of $L^2$ include a divalent linking group having 1 to 10 carbon atoms, consisting of a combination of an alkylene group, —O—, —S—, —CO—, —$SO_2$—, —NRa- (here, Ra is an alkyl group having 1 to 5 carbon atoms or a hydrogen atom), an alkenylene group, an alkynylene group, and an arylene group; a single bond, —O—, —O—CO—, —CO—O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, and —O—CO-AL-CO—O—. AL represents an alkylene group. $L^2$ is preferably a single bond, -AL-, —O-AL-, or —NRa-AL-O—, each of which has 1 to 10 carbon atoms, more preferably a single bond, -AL-, —O-AL-, or —NRa-AL-O—, each of which has 1 to 5 carbon atoms, and most preferably a single bond, —O-AL-, or —NRa-AL-O—, each of which has 1 to 5 carbon atoms.

$Y^1$ represents a divalent linking group having a 5- or 6-membered ring as a partial structure. Examples of $Y^1$ include a cyclohexyl ring, an aromatic ring, or a heterocyclic ring. Examples of the aromatic ring include a benzene ring, an indene ring, a naphthalene ring, a fluorene ring, a phenanthrene ring, an anthracene ring, a biphenyl ring, and a pyrene ring, and a benzene ring, a biphenyl ring, or a naphthalene ring is particularly preferable. As a heteroatom constituting the heterocyclic ring, a nitrogen atom, an oxygen atom, or a sulfur atom is preferable, and examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a dioxane ring, a dithiane ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The heterocyclic ring is preferably a 6-membered ring. The divalent linking group represented by $Y^1$, having a 5- or 6-membered ring as a partial structure, may further have a substituent (for example, the above-described substituent W).

The divalent linking group represented by $Y^1$ is preferably a divalent linking group having two or more 5- or 6-membered rings, and more preferably has a structure in which two or more rings are linked to each other through a linking group. Examples of the linking group include the examples of the linking group represented by $L^1$ and $L^2$, —C≡C—, —CH═CH—, —CH═N—, —N═CH—, and —N═N—.

Z represents a divalent linking group which has an alkylene group having 2 to 20 carbon atoms as a partial structure and consists of a combination of —O—, —S—, —CO—, and —SO2-, in which the alkylene group may have a substituent. Examples of the above-described divalent linking group include an alkyleneoxy group and a polyalkyleneoxy group. The number of carbon atoms in the alkylene group represented by Z is more preferably 2 to 16, still more preferably 2 to 12, and particularly preferably 2 to 8.

$P^1$ and $P^2$ each independently represent a monovalent substituent having a polymerizable ethylenically unsaturated group. Examples of the above-described monovalent substituent having a polymerizable ethylenically unsaturated group include Formulae (M-1) to (M-8). That is, the monovalent substituent having a polymerizable ethylenically unsaturated group may be a substituent consisting of only an ethenyl group as in Formula (M-8).

(M-1)

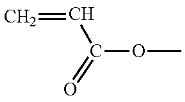

(M-2)

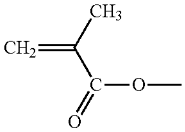

(M-3)

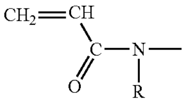

(M-4)

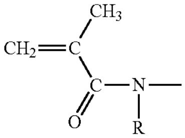

(M-5)

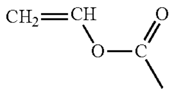

(M-6)

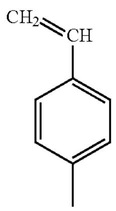

(M-7)

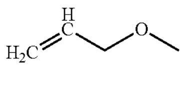

-continued (M-8)

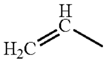

In Formulae (M-3) and (M-4), R represents a hydrogen atom or an alkyl group, and a hydrogen atom or a methyl group is preferable. Among Formulae (M-1) to (M-8), (M-1), (M-2), or (M-8) is preferable, and (M-1) or (M-8) is more preferable. In particular, $P^1$ is preferably (M-1). In addition, $P^2$ is preferably (M-1) or (M-8), and in a compound in which the ring A is quaternary imidazolium ion, $P^2$ is preferably (M-8) or (M-1), and in a compound in which the ring A is a quaternary pyridinium ion, $P^2$ is preferably (M-1).

Examples of the onium compound represented by Formula (B1) include onium salts described in paragraphs 0052 to 0058 of JP2012-208397A, onium salts described in paragraphs 0024 to 0055 of JP2008-026730A, and onium salts described in JP2002-37777A.

In the present invention, from the reason that the alignment degree of the formed light-absorbing anisotropic layer is increased, it is preferable that the above-described alignment agent is a boronic acid compound represented by Formula (B2).

(B2)

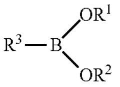

In (B2), $R^1$ and $R^2$ each independently represent a hydrogen atom, an aliphatic hydrocarbon group which may have a substituent, an aryl group which may have a substituent, or a heterocyclic group which may have a substituent.

In addition, $R^3$ represents a substituent.

Examples of the aliphatic hydrocarbon group represented by one aspect of $R^1$ and $R^2$ include a linear or branched alkyl group having 1 to 20 carbon atoms, which may be substituted or unsubstituted, (for example, a methyl group, an ethyl group, an iso-propyl group, and the like), a substituted or unsubstituted cyclic alkyl group having 3 to 20 carbon atoms (for example, a cyclohexyl group and the like), and an alkenyl group having 2 to 20 carbon atoms (for example, a vinyl group and the like).

In addition, examples of the aryl group represented by one aspect of $R^1$ and $R^2$ include a substituted or unsubstituted phenyl group having 6 to 20 carbon atoms (for example, a phenyl group, a tolyl group, and the like), and a substituted or unsubstituted naphthyl group having 10 to 20 carbon atoms.

In addition, examples of the heterocyclic group represented by one aspect of $R^1$ and $R^2$ include a substituted or unsubstituted 5-membered or 6-membered ring group including at least one heteroatom (for example, a nitrogen atom, an oxygen atom, a sulfur atom, and the like), and specific examples thereof include a pyridyl group, an imidazolyl group, a furyl group, a piperidyl group, and a morpholino group.

$R^1$ and $R^2$ may be linked to each other to form a ring. For example, isopropyl groups of $R^1$ and $R^2$ may be linked to each other to form a 4,4,5,5-tetramethyl-1,3,2-dioxaborolane ring.

As $R^1$ and $R^2$, a hydrogen atom, a linear or branched alkyl group having 1 to 3 carbon atoms, or an aspect in which these groups are linked to each other to form a ring is preferable, and a hydrogen atom is more preferable.

As the substituent represented by $R^3$, a substituent including a functional group which can be bonded to a (meth) acrylic group is preferable.

Here, examples of the functional group which can be bonded to a (meth)acrylic group include a vinyl group, an acrylate group, a methacrylate group, an acrylamide group, a styryl group, a vinyl ketone group, a butadiene group, a vinyl ether group, an oxiranyl group, an aziridinyl group, and an oxetane group. Among these, a vinyl group, an acrylate group, a methacrylate group, a styryl group, an oxiranyl group, or an oxetane group is preferable, and a vinyl group, an acrylate group, an acrylamide group, or a styryl group is more preferable.

$R^3$ is preferably a substituted or unsubstituted aliphatic hydrocarbon group, aryl group, or heterocyclic group having the functional group which can be bonded to a (meth)acrylic group.

Examples of the aliphatic hydrocarbon group include a substituted or unsubstituted linear or branched alkyl group having 1 to 30 carbon atoms (for example, a methyl group, an ethyl group, an iso-propyl group, an n-propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an sec-butyl group, a tert-butyl group, an isopentyl group, a neopentyl group, a 1-methylbutyl group, an isohexyl group, a 2-methylhexyl group, and the like), a substituted or unsubstituted cyclic alkyl group having 3 to 20 carbon atoms (for example, a cyclopentyl group, a cyclohexyl group, a 1-adamantyl group, a 2-norbornyl group, and the like), and an alkenyl group having 2 to 20 carbon atoms (for example, a vinyl group, a 1-propenyl group, a 1-butenyl group, a 1-methyl-1-propenyl group, and the like).

Examples of the aryl group include a substituted or unsubstituted phenyl group having 6 to 50 carbon atoms (for example, a phenyl group, a tolyl group, a styryl group, a 4-benzoyloxyphenyl group, a 4-phenoxycarbonylphenyl group, a 4-biphenyl group, a 4-(4-octyloxybenzoyloxy)phenoxycarbonylphenyl group, and the like), and a substituted or unsubstituted naphthyl group having 10 to 50 carbon atoms (for example, an unsubstituted naphthyl group and the like).

The heterocyclic group is, for example, a substituted or unsubstituted 5-membered or 6-membered ring group including at least one heteroatom (for example, a nitrogen atom, an oxygen atom, a sulfur atom, and the like), and examples thereof include groups of pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, morpholine, piperidine, and the like.

Examples of the boronic acid compound represented by Formula (B2) include a boronic acid compound represented by General Formula (I) described in paragraphs 0023 to 0032 of JP2008-225281A.

As the compound represented by Formula (B2), compounds exemplified below are also preferable.

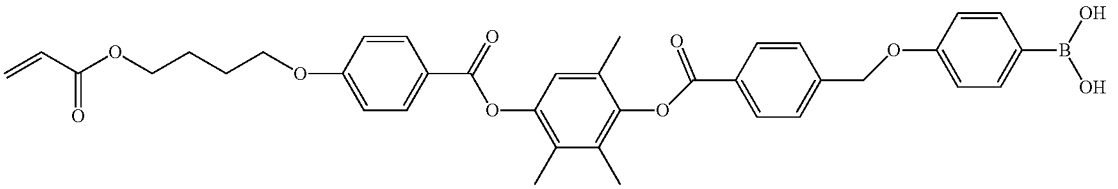

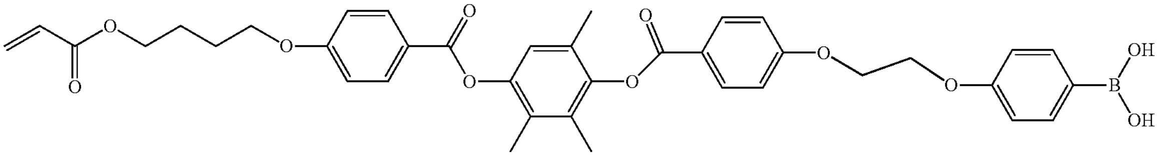

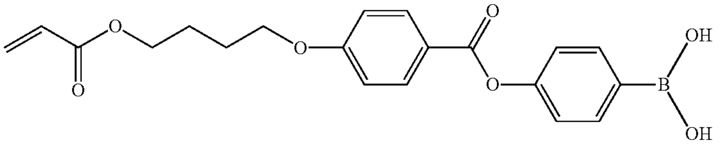

In a case where the liquid crystal composition contains an alignment agent, a content of the alignment agent is preferably 0.2 to 20 parts by mass and more preferably 1 to 10 parts by mass with respect to the total of 100 parts by mass of the liquid crystalline compound and the dichroic substance contained in the liquid crystal composition.

<Solvent>

From the viewpoint of workability and the like, it is preferable that the liquid crystal composition contains a solvent.

Examples of the solvent include organic solvents such as ketones (such as acetone, 2-butanone, methyl isobutyl ketone, cyclopentanone, cyclohexanone, and acetylacetone), ethers (such as dioxane, tetrahydrofuran, tetrahydropyran, dioxolane, tetrahydrofurfuryl alcohol, cyclopentyl methyl ether, and dibutyl ether), aliphatic hydrocarbons (such as hexane), alicyclic hydrocarbons (such as cyclohexane), aromatic hydrocarbons (such as benzene, toluene, xylene, tetralin, and trimethylbenzene), halogenated carbons (such as dichloromethane, trichloromethane (chloroform), dichloroethane, dichlorobenzene, 1,1,2,2-tetrachloroethane, and chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, and isoamyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, and diethylene glycol monobutyl ether), phenols (such as phenol and cresol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine and 2,6-lutidine); and water.

These solvents may be used alone or in combination of two or more kinds thereof.

In a case where the liquid crystal composition contains a solvent, a content of the solvent is preferably 60% to 99.5% by mass, more preferably 70% to 99% by mass, and particularly preferably 75% to 98% by mass with respect to the total mass (100% by mass) of the liquid crystal composition.

<Polymerization Initiator>

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds ([0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SE.

In a case where the liquid crystal composition contains a polymerization initiator, a content of the polymerization initiator is preferably 0.01% to 30% by mass and more preferably 0.1% to 15% by mass with respect to the total solid content mass of the liquid crystal composition.

<Polymerizable Compound>

The liquid crystal composition may contain a polymerizable compound.

Examples of the polymerizable compound include a compound including an acrylate (such as a (meth)acrylate monomer).

In a case where the liquid crystal composition contains a polymerizable compound, a content of the polymerizable compound is preferably 0.5% to 50% by mass and more preferably 1.0% to 40% by mass with respect to the total solid content mass of the liquid crystal composition.

<Interface Improver>

The liquid crystal composition may contain an interface improver.

The interface improver is not particularly limited, and a polymer-based interface improver or a low-molecular-weight interface improver can be used, and compounds described in paragraphs [0253] to [0293] of JP2011-237513A can also be used.

In addition, fluorine (meth)acrylate-based polymers described in paragraphs [0018] to [0043] of JP2007-272185A can also be used as the interface improver.

In addition, examples of the interface improver include compound described in paragraphs [0079] to [0102] of JP2007-069471A, polymerizable liquid crystalline compounds represented by Formula (4) described in JP2013-047204A (particularly, compounds described in paragraphs [0020] to [0032]), polymerizable liquid crystalline compounds represented by Formula (4) described in JP2012-211306A (particularly, compounds described in paragraphs [0022] to [0029]), liquid crystal alignment promoters represented by Formula (4) described in JP2002-129162A (particularly, compounds described in paragraphs [0076] to [0078] and paragraphs [0082] to [0084]), compounds represented by Formulae (4), (II), and (III) described in JP2005-099248A (particularly, compounds described in paragraphs [0092] to [0096]), compounds described in paragraphs [0013] to [0059] of JP4385997B, compounds described in paragraphs [0018] to [0044] of JP5034200B, and compounds described in paragraphs [0019] to [0038] of JP4895088B.

The interface improvers may be used alone or in combination of two or more kinds thereof.

In a case where the liquid crystal composition contains an interface improver, a content of the interface improver is preferably 0.005% to 15% by mass, more preferably 0.01% to 5% by mass, and still more preferably 0.015% to 3% by mass with respect to the total solid content mass of the liquid crystal composition. In a case where a plurality of interface improvers are used in combination, it is preferable that the total amount of the plurality of interface improvers is within the above-described range.

A thickness of the light-absorbing anisotropic layer is not particularly limited, but from the viewpoint of reducing the size and the weight, it is preferably 100 to 8000 nm and more preferably 300 to 5000 nm.

<Method of Forming Light-Absorbing Anisotropic Layer>

A method of forming the light-absorbing anisotropic layer is not particularly limited, and examples thereof include a method including, in the following order, a step of applying the above-described liquid crystal composition (hereinafter, also referred to as "composition for forming a light-absorbing anisotropic layer") to form a coating film (hereinafter, also referred to as "coating film forming step") and a step of aligning liquid crystalline components contained in the coating film (hereinafter, also referred to as "alignment step").

In a case where the above-described dichroic substance has liquid crystallinity, the liquid crystalline component is a component which also includes the dichroic substance having liquid crystallinity in addition to the above-described liquid crystalline compound.

In addition, in a case where the light-absorbing anisotropic layer is not a layer fixed in a liquid crystal state of a smectic phase (that is, in a case where a liquid crystalline compound which exhibits smectic properties is not used as the liquid crystalline compound contained in the liquid crystal composition), or in a case of not containing fine particles, from the viewpoint of adjusting the haze value, it is preferable that the light-absorbing anisotropic layer is formed by a manufacturing method of a light-absorbing anisotropic layer according to the embodiment of the present invention, which will be described later.

(Coating Film Forming Step)

The coating film forming step is a step of applying the composition for forming a light-absorbing anisotropic layer to form a coating film.

The composition for forming a light-absorbing anisotropic layer can be easily applied by using a composition for forming a light-absorbing anisotropic layer, which contains the above-described solvent, or using a liquid such as a melt obtained by heating the composition for forming a light-absorbing anisotropic layer.

Specific examples of a method of applying the composition for forming a light-absorbing anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

(Alignment Step)

The alignment step is a step of aligning a liquid crystalline component contained in the coating film. In this manner, even in a case where the above-described dichroic substance does not have liquid crystallinity, a light-absorbing anisotropic layer in which the dichroic substance is aligned along the alignment of the liquid crystalline compound is obtained.

The alignment step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystalline component contained in the composition for forming a light-absorbing anisotropic layer may be aligned by the coating film forming step or the drying treatment described above. For example, in an aspect in which the composition for forming a light-absorbing anisotropic layer is prepared as a coating liquid containing a solvent, a coating film having light absorption anisotropy (that is, a light-absorbing anisotropic layer) is obtained by drying the coating film and removing the solvent from the coating film.

In a case where the drying treatment is performed at a temperature higher than or equal to a transition temperature of the liquid crystalline component contained in the coating film to the liquid crystal phase, a heat treatment described below may not be performed.

From the viewpoint of manufacturing suitability or the like, the transition temperature of the liquid crystalline component contained in the coating film to the liquid crystal phase is preferably 10° C. to 250° C. and more preferably 25° C. to 190° C. In a case where the above-described transition temperature is 10° C. or higher, a cooling treatment or the like for lowering the temperature to a temperature range in which the liquid crystal phase is exhibited is not necessary, which is preferable. In addition, in a case where the above-described transition temperature is 250° C. or lower, a high temperature is not required even in a case of setting an isotropic liquid state at a temperature higher than the temperature range in which the liquid crystal phase is temporarily exhibited, and waste of thermal energy and deformation and deterioration of a substrate can be reduced, which is preferable.

It is preferable that the alignment step includes a heat treatment. In this manner, since the liquid crystalline component contained in the coating film can be aligned, the coating film after being subjected to the heat treatment can be suitably used as the light-absorbing anisotropic layer.

From the viewpoint of the manufacturing suitability or the like, the heat treatment is performed at a temperature of preferably 10° C. to 250° C. and more preferably 25° C. to 190° C. In addition, the heating time is preferably 1 to 300 seconds and more preferably 1 to 60 seconds.

The alignment step may include a cooling treatment performed after the heat treatment. The cooling treatment is a treatment of cooling the heated coating film to room temperature (20° C. to 25° C.). In this manner, the alignment of the liquid crystalline component contained in the coating film can be fixed. A cooling unit is not particularly limited, and the cooling treatment can be performed according to a known method.

The light-absorbing anisotropic layer can be obtained by performing the above-described steps.

In the present embodiment, examples of a method of aligning the liquid crystalline component contained in the coating film include the drying treatment and the heat treatment, but the present invention is not limited thereto, and the liquid crystalline component can be aligned by a known alignment treatment.

(Other Steps)

The method of forming the light-absorbing anisotropic layer may include a step of curing the light-absorbing anisotropic layer after the alignment step (hereinafter, also referred to as "curing step").

The curing step is performed by heating the light-absorbing anisotropic layer and/or irradiating the light-absorbing anisotropic layer with light (exposing the light-absorbing anisotropic layer to light), for example, in a case where the light-absorbing anisotropic layer has a crosslinkable group (polymerizable group). Among these, it is preferable that the curing step is performed by irradiating the light-absorbing anisotropic layer with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In a case where the exposure is performed while the layer is heated, the heating temperature during the exposure depends on the transition temperature of the liquid crystalline component contained in the liquid crystal film to the liquid crystal phase, but it is preferably 25° C. to 140° C.

In addition, the exposure may be performed under a nitrogen atmosphere. In a case where the curing of the liquid crystal film proceeds by radical polymerization, since inhibition of polymerization by oxygen is reduced, it is preferable that the exposure is performed in a nitrogen atmosphere.

[Pressure-Sensitive Adhesive Layer]

In the circularly polarizing plate according to the embodiment of the present invention, in order to suppress deformation of other layers due to shrinkage force of one layer, it is preferable that all of the retardation layer, the first light-absorbing anisotropic layer, and the second light-absorbing anisotropic layer described above are laminated through pressure-sensitive adhesive layers.

Here, it is preferable that the pressure-sensitive adhesive layer is a transparent and optically isotropic adhesive similar to that used in a typical image display device, and a pressure sensitive type adhesive is typically used.

The pressure-sensitive adhesive layer may be blended with appropriate additives such as a crosslinking agent (such as an isocyanate-based crosslinking agent or an epoxy-based crosslinking agent), a viscosity imparting agent (such as a rosin derivative resin, a polyterpene resin, a petroleum resin, and an oil-soluble phenol resin), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

A thickness of one layer of the pressure-sensitive adhesive layers is usually approximately 1 to 500 μm, but in order to prevent a recess during handling of the circularly polarizing plate, it is preferably 2 to 50 μm and more preferably 3 to 30 μm.

Here, the thickness of each layer such as the pressure-sensitive adhesive layer can be measured by the following film thickness measuring method.

<Film Thickness Measuring Method>

The film thickness of each layer and the total thickness can be obtained by producing a cross-sectional sample piece with a microtome and observing an SEM image with a scanning electron microscope (SEM). In Examples described later, thicknesses of all layers on a temporary support PANA-PEEL NP-75-C, including the pressure-sensitive adhesive layer, were regarded as the total thickness of the circularly polarizing plate, and a thickness of the temporary support PANA-PEEL NP-75-C was not included.

In the present invention, in order to suppress deformation of the circularly polarizing plate and display device due to the shrinkage force of each layer and support, a storage elastic modulus of the pressure-sensitive adhesive layer is preferably 0.1 to 20 MPa and more preferably 0.2 to 10 MPa.

Here, the storage elastic modulus of the pressure-sensitive adhesive layer refers to a storage elastic modulus G measured by a dynamic viscoelasticity measurement device, and specifically refers to a storage elastic modulus measured by the following measuring method.

<Measuring Method of Storage Elastic Modulus>

Using a dynamic viscoelasticity measurement device (DVA-200 manufactured by IT Measurement & Control Co., Ltd.), E' (storage elastic modulus) is measured under the following conditions for a film sample which has been subjected to humidity conditioning in advance for 2 hours or more under an atmosphere of a temperature of 25° C. and a relative humidity (RH) of 60%.

Device: DVA-200, manufactured by IT Measurement & Control Co., Ltd.

Sample: 5 mm, length of 50 mm (gap of 20 mm)

Measurement conditions: tension mode

Measured temperature and humidity: 25° C., 60% RH

Frequency: 1 Hz

[Alignment Film]

In a case where the retardation layer, the first light-absorbing anisotropic layer, and the second light-absorbing anisotropic layer described above correspond to a liquid crystal cured layer, the circularly polarizing plate according to the embodiment of the present invention preferably includes an alignment film as a layer adjacent thereto.

Specific examples of the alignment film include a layer formed of polyvinyl alcohol, polyimide, or the like, which has been or has not been subjected to a rubbing treatment; and a photo-alignment film formed of polyvinyl cinnamate, an azo-based dye, or the like, which has been or has not been subjected to a polarized light exposure treatment.

A thickness of the alignment film is preferably 0.01 to 10 μm and more preferably 0.01 to 1 μm.

[Protective Layer]

From the viewpoint of improving durability of the light-absorbing anisotropic layer, the circularly polarizing plate according to the embodiment of the present invention preferably includes a protective layer as a layer adjacent to the retardation layer, the first light-absorbing anisotropic layer, and the second light-absorbing anisotropic layer described above.

The protective layer may be a layer formed of a known material, and preferred examples thereof include a resin film. Examples of the resin film include a polyvinyl alcohol-based resin film, an acrylic resin film, a cellulose ester resin film, a polyethylene terephthalate resin film, and a polycarbonate resin film.

[Barrier Layer (Oxygen-Shielding Layer)]

The circularly polarizing plate according to the embodiment of the present invention preferably includes a barrier layer.

Here, the barrier layer is also referred to as a gas-shielding layer (oxygen-shielding layer), and has a function of protecting from a gas such as oxygen in the air, moisture, a compound contained in an adjacent layer, or the like.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A.

[Self-Luminous Display Device]

The self-luminous display device according to the embodiment of the present invention is a self-luminous display device in which the above-described circularly polarizing plate according to the embodiment of the present invention is bonded to a panel on a viewing side through a pressure-sensitive adhesive layer, and is preferably a self-luminous display device used for in-vehicle applications.

Here, a self-luminous display device (10) shown in FIG. 1 is a schematic cross-sectional view of a self-luminous display device produced in Example 1, and a circularly polarizing plate (11) in which a first retardation layer Q (1), a first light-absorbing anisotropic layer H (2), and a second light-absorbing anisotropic layer V (3) are laminated through pressure-sensitive adhesive layers (5) and an organic electroluminescent (hereinafter, abbreviated as "EL") display panel (4) are laminated through a pressure-sensitive adhesive layer (5).

Figure 2:
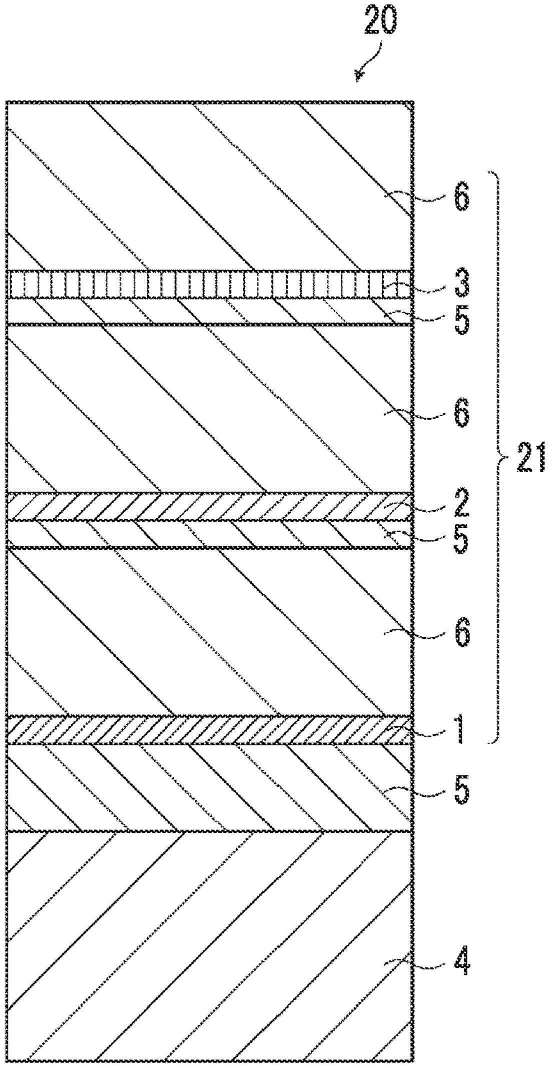
FIG. 2 is a schematic cross-sectional view of a self-luminous display device to which a circularly polarizing plate produced in Comparative Example 1 is applied.

On the other hand, a self-luminous display device (20) shown in FIG. 2 is a schematic cross-sectional view of a self-luminous display device produced in Comparative Example 1, and the self-luminous display device (20) has the same layer configuration as in FIG. 1, except that a support (6) is provided as a layer adjacent to the first retardation layer Q (1), the first light-absorbing anisotropic layer H (2), and the second light-absorbing anisotropic layer V (3).

In the self-luminous display device according to the embodiment of the present invention, the panel on the viewing side and the above-described circularly polarizing plate according to the embodiment of the present invention can be laminated through a pressure-sensitive adhesive layer or an adhesive layer described below.

[Pressure-Sensitive Adhesive Layer]

Examples of the pressure-sensitive adhesive layer include the same layers as those described in the circularly polarizing plate according to the embodiment of the present invention above.

[Adhesive Layer]

The adhesive exhibits adhesiveness due to drying or a reaction after bonding.

A polyvinyl alcohol-based adhesive (PVA-based adhesive) exhibits adhesiveness due to drying, and is capable of bonding materials to each other.

Specific examples of the curable adhesive which exhibits adhesiveness due to reaction include an active energy ray-curable adhesive such as a (meth)acrylate-based adhesive and a cationic polymerization curable adhesive. The (meth) acrylate denotes acrylate and/or methacrylate. Examples of the curable component in the (meth)acrylate-based adhesive include a compound having a (meth)acryloyl group and a compound having a vinyl group. In addition, as the cationic polymerization curable adhesive, a compound having an epoxy group or an oxetanyl group can also be used. The compound having an epoxy group is not particularly limited as long as the compound has at least two epoxy groups in a molecule, and various generally known curable epoxy compounds can be used. Preferred examples of the epoxy compound include a compound (aromatic epoxy compound) having at least two epoxy groups and at least one aromatic ring in the molecule and a compound (alicyclic epoxy compound) having at least two epoxy groups in the molecule, in which at least one of the epoxy groups is formed between two adjacent carbon atoms constituting an alicyclic ring.

Among these, from the viewpoint of heat deformation resistance, an ultraviolet curable adhesive which is cured by irradiation with ultraviolet rays is preferably used.

Each of the adhesive layer and the pressure-sensitive adhesive layer may be obtained by imparting ultraviolet absorbing ability to the layer using a method of performing a treatment with an ultraviolet absorbing agent such as a salicylic acid ester-based compound, a benzophenol-based compound, a benzotriazole-based compound, a cyanoacrylate-based compound, or a nickel complex salt-based compound.

The pressure-sensitive adhesive layer and the adhesive layer can be attached by an appropriate method. For example, the pressure-sensitive adhesive layer or the adhesive layer may be attached to the film by a method of preparing 10% to 40% by mass of a pressure sensitive adhesive solution obtained by dissolving or dispersing a base polymer or a composition thereof in a solvent consisting of a single substance or a mixture of an appropriate solvent such as toluene or ethyl acetate and directly attaching the solution on the film using an appropriate development method such as a casting method or a coating method; or a method of forming a pressure sensitive adhesive layer on a separator in conformity with the above-described method and transporting the layer.

The pressure-sensitive adhesive layer and the adhesive layer may be provided on one or both surfaces of the film as a layer obtained by superimposing different kinds of layers with different compositions. In addition, in a case where the layers are provided on both surfaces of the film, different kinds of pressure-sensitive adhesive layers with different compositions and different thicknesses can be provided on the front and rear surfaces of the film.

[Panel]

The panel included in the self-luminous display device according to the embodiment of the present invention is not particularly limited, and examples thereof include an organic EL display panel.

Some self-luminous display devices are thin, and can be formed into a curved surface. Since the circularly polarizing plate according to the embodiment of the present invention is thin and can be easily bent, the circularly polarizing plate can be suitably applied to the self-luminous display device having a curved display surface.

[Organic EL Display Device]

Suitable examples of an organic EL display device which is an example of the self-luminous display device according to the embodiment of the present invention include an aspect including, from the viewing side, the above-described circularly polarizing plate according to the embodiment of the present invention and an organic EL display panel.

In addition, the organic EL display panel is a display panel formed of an organic EL element obtained by sandwiching an organic light emitting layer (organic electroluminescence layer) between electrodes (between a cathode and an anode). The configuration of the organic EL display panel is not particularly limited, and a known configuration is employed.

Examples

Hereinafter, the present invention will be described in more detail with reference to Examples. Materials, used amounts, ratios, treatment contents, treatment procedures, and the like described in Examples can be appropriately changed without departing from the spirit of the present invention. Therefore, the scope of the present invention should not be construed as being limited to Examples.

[Production of Laminate Q Including First Retardation Layer Q]

A coating liquid E1 for forming a photo-alignment film, having the following formulation, was continuously applied onto a cellulose acetate film "Z-TAC" (film thickness: 40 μm) manufactured by FUJIFILM Corporation [hereinafter, simply referred to as "Z-TAC (film thickness: 40 μm)"] using a wire bar. The support on which the coating film had been formed was dried with hot air at 140° C. for 120 seconds, and subsequently, the coating film was irradiated with polarized ultraviolet rays (10 mJ/$cm^2$, using an ultra-high-pressure mercury lamp) to form an alignment film E1 having a thickness of 0.2 μm, whereby a triacetyl cellulose (TAC) film with a photo-alignment film was obtained.

| Coating liquid E1 for forming photo-alignment film | |
|---|---|
| Polymer PA-2 shown below | 100.00 parts by mass |
| Acid generator PAG-1 shown below | 5.00 parts by mass |
| Acid generator CPI-110TF shown below | 0.005 parts by mass |
| Isopropyl alcohol | 16.50 parts by mass |
| Butyl acetate | 1072.00 parts by mass |
| Methyl ethyl ketone | 268.00 parts by mass |

Polymer PA-2

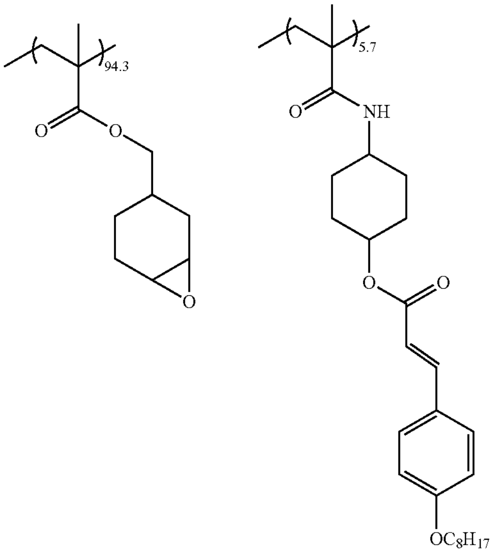

Acid Generator PAG-1

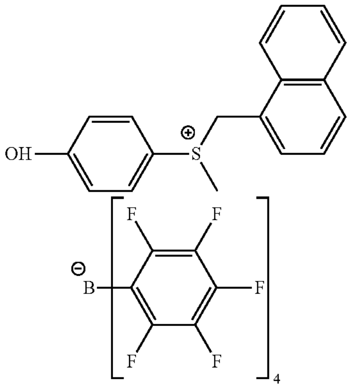

Acid Generator CPT-110TF

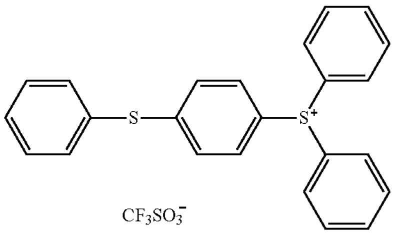

The above-described photo-alignment film E1 was coated with a composition F1 having the following formulation using a bar coater. The coating film formed on the photo-alignment film E1 was heated to 120° C. with hot air, cooled to 60° C., irradiated with ultraviolet rays having a wavelength of 365 nm with an illuminance of 100 $mJ/cm^2$ using a high-pressure mercury lamp in a nitrogen atmosphere, and continuously irradiated with ultraviolet rays with an illuminance of 500 $mJ/cm^2$ while being heated at 120° C., so that the alignment of the liquid crystalline compound was immobilized, thereby producing a laminate Q including a first retardation layer Q corresponding to a positive A-plate.

A thickness of the first retardation layer Q was 2.5 μm, and Re(550) was 144 nm. In addition, the positive A-plate satisfied a relationship of "Re(450)≤Re(550)≤Re(650)". Re(450)/Re(550) was 0.82.

| Composition F1 | |
|---|---|
| Polymerizable liquid crystalline compound LA-1 shown below | 43.50 parts by mass |
| Polymerizable liquid crystalline compound LA-2 shown below | 43.50 parts by mass |
| Polymerizable liquid crystalline compound LA-3 shown below | 8.00 parts by mass |
| Polymerizable liquid crystalline compound LA-4 shown below | 5.00 parts by mass |
| Polymerization initiator PI-1 shown below | 0.55 parts by mass |
| Leveling agent T-1 shown below | 0.20 parts by mass |
| Cyclopentanone | 235.00 parts by mass |

Polymerizable Liquid Crystalline Compound LA-1 (tBu Represents a Tertiary Butyl Group)

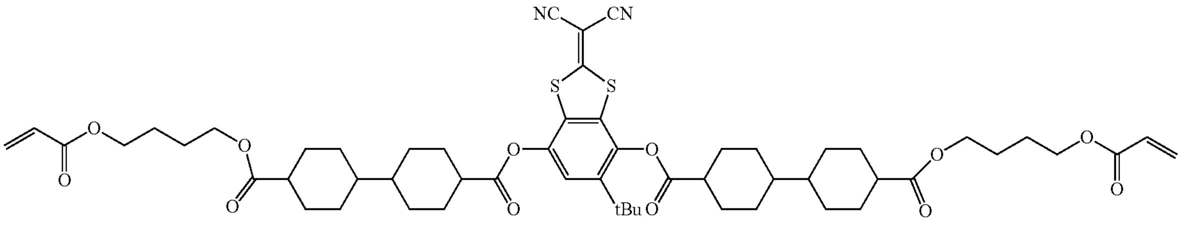 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Polymerizable Liquid Crystalline Compound LA-2

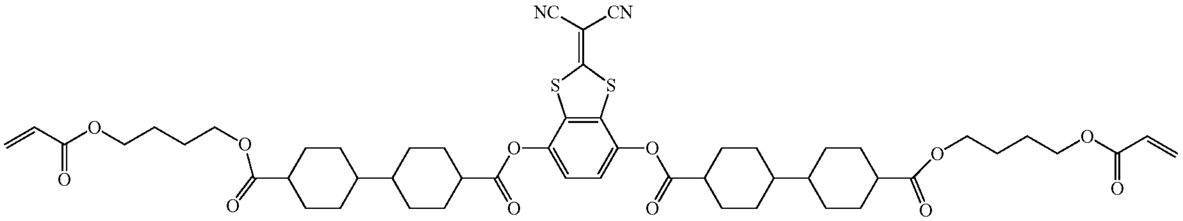 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

Polymerizable Liquid Crystalline Compound LA-3

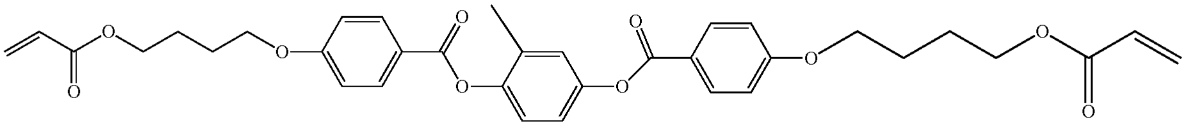 [SMILES: C=CC(=O)OCCCCOc1ccc(C(=O)Oc2ccc(OC(=O)c3ccc(OCCCCOC(=O)C=C)cc3)c(C)c2)cc1]

Polymerizable Liquid Crystalline Compound LA-4 (Me Represents a Methyl Group)

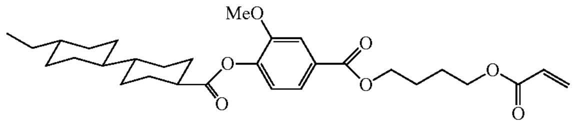

Polymerization Initiator PI-1

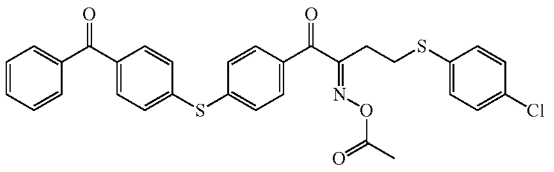 [SMILES: CC(=O)O/N=C(\CCSc1ccc(Cl)cc1)C(=O)c1ccc(Sc2ccc(C(=O)c3ccccc3)cc2)cc1]

Leveling Agent T-1

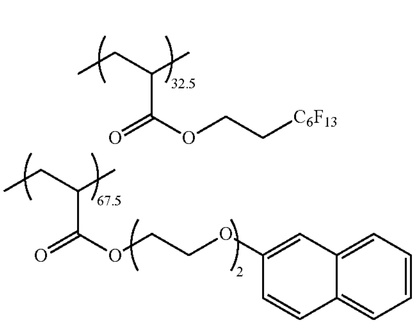

[Production of Laminate H Including First Light-Absorbing Anisotropic Layer H]

[Formation of Photo-Alignment Film B1]

A composition for forming a photo-alignment film, which will be described later, was continuously applied onto Z-TAC (film thickness: 40 μm) using a wire bar. The support on which the coating film had been formed was dried with hot air at 140° C. for 120 seconds, and the coating film was irradiated with polarized ultraviolet rays (10 mJ/cm$^2$, using an ultra-high pressure mercury lamp) to form a photo-alignment film B1, thereby obtaining a TAC film with the photo-alignment film. A film thickness of the photo-alignment film B1 was 0.25 μm.

| Composition for forming photo-alignment film | |
|---|---|
| Polymer PA-1 shown below | 100.00 parts by mass |
| Acid generator PAG-1 described above | 8.25 parts by mass |
| Stabilizer DIPEA shown below | 0.6 parts by mass |
| Xylene | 1126.60 parts by mass |
| Methyl isobutyl ketone | 125.18 parts by mass |

Polymer PA-1 (in the Formulae, the Numerical Value Described in Each Repeating Unit Denotes the Content (% by Mass) of Each Repeating Unit with Respect to all Repeating Units)

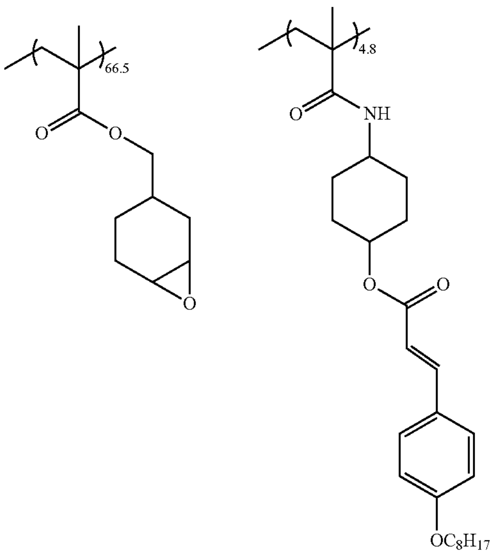

-continued

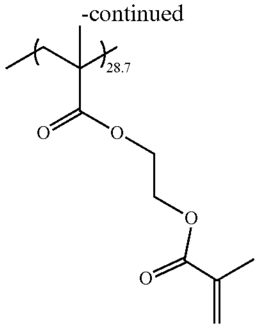

Stabilizer DIPEA

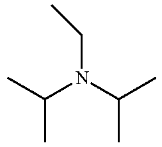

[Production of First Light-Absorbing Anisotropic Layer H]

A composition for forming a light-absorbing anisotropic layer, having the following formulation, was continuously applied onto the obtained photo-alignment film B1 using a wire bar to form a coating film.

Next, the coating film was heated at 140° C. for 15 seconds, subjected to a heat treatment at 80° C. for 5 seconds, and cooled to room temperature (23° C.). Next, the coating film was heated at 75° C. for 60 seconds, and cooled to room temperature again.

Thereafter, the coating film was irradiated with light for 2 seconds under an irradiation condition of illuminance of 200 mW/$cm^2$ using a light emitting diode (LED) lamp (central wavelength: 365 nm), thereby producing a first light-absorbing anisotropic layer H (polarizer) (thickness: 1.8 μm) on the photo-alignment film B1.

Using an automatic polarizing film measuring device (trade name, VAP-7070, manufactured by Jasco Corporation), a single plate transmittance and a polarization degree of the first light-absorbing anisotropic layer H in a wavelength range of 280 to 780 nm were measured. An average transmittance of visible light corrected by luminosity factor was 42%. In addition, an average polarization degree of visible light corrected by luminosity factor was 99.68%.

An absorption axis of the first light-absorbing anisotropic layer H was in a plane of the first light-absorbing anisotropic layer H, and was perpendicular to a widthwise direction of the cellulose acylate film A1.

| Formulation of composition for forming a light-absorbing anisotropic layer | |
|---|---|
| First dichroic substance Dye-C1 shown below | 0.65 parts by mass |
| Second dichroic substance Dye-M1 shown below | 0.15 parts by mass |
| Third dichroic substance Dye-Y1 shown below | 0.52 parts by mass |
| Liquid crystalline compound L-1 shown below | 2.69 parts by mass |
| Liquid crystalline compound L-2 shown below | 1.15 parts by mass |
| Adhesion improver A-1 shown below | 0.17 parts by mass |
| Polymerization initiator | 0.17 parts by mass |
| IRGACURE OXE-02 (manufactured by BASF SE) | |
| Surfactant F-1 shown below | 0.013 parts by mass |
| Cyclopentanone | 92.14 parts by mass |
| Benzyl alcohol | 2.36 parts by mass |

Dichroic Substance Dye-C1

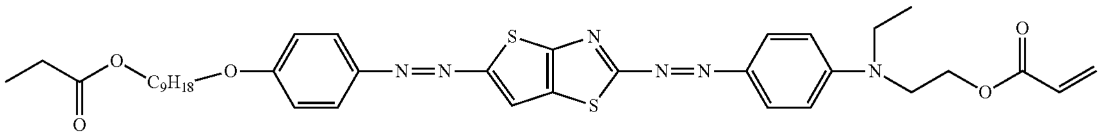

Dichroic Substance Dye-M1

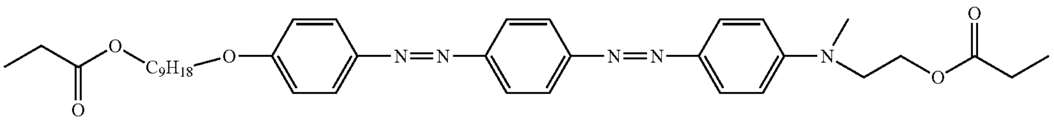

Dichroic Substance Dye-Y1

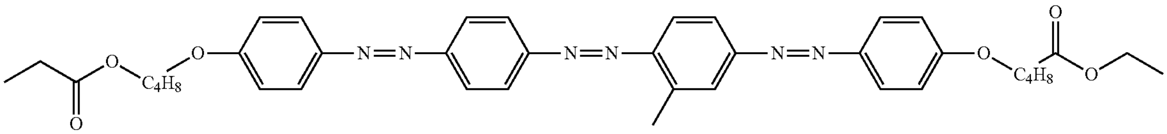

Liquid crystalline compound L-1 (in the formulae, the numerical value ("59", "15", or "26") described in each repeating unit denotes the content (% by mass) of each repeating unit with respect to all repeating units)

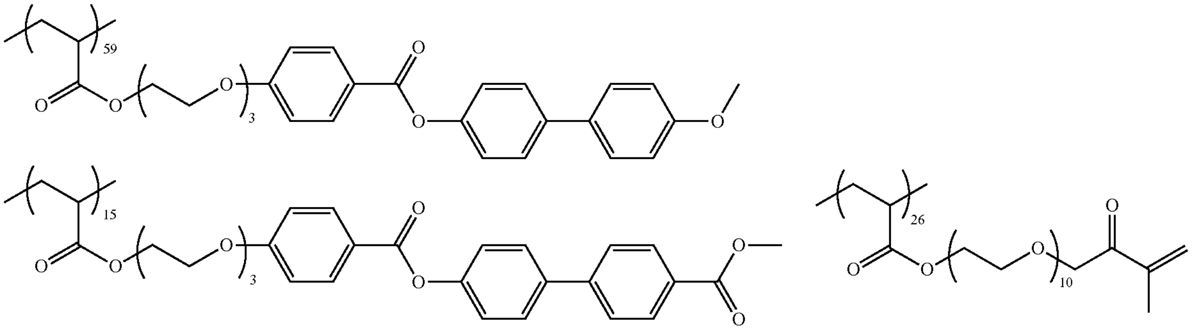

Liquid Crystalline Compound L-2 [Mixture of the Following Liquid Crystal Compounds (RA), (RB), and (RC) at a Mass Ratio of 84:14:2]

(RA)

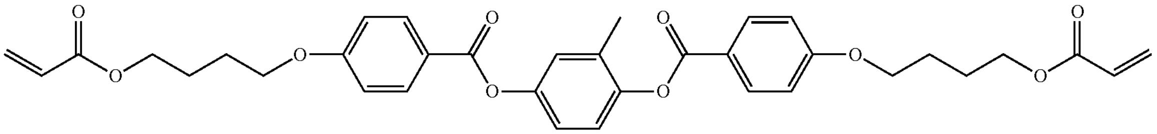

(RB)

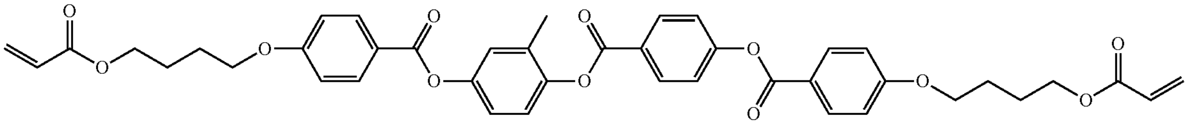

(RC)

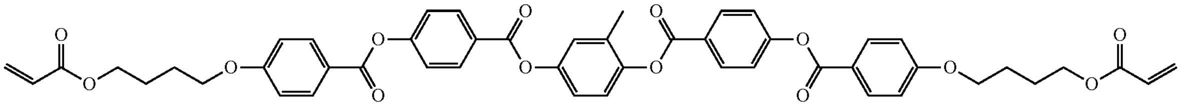

Adhesion Improver A-1

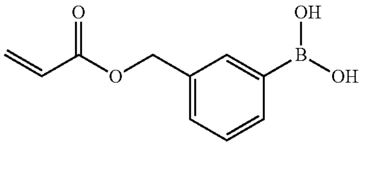

Surfactant F-1 (in the Formulae, the Numerical Value Described in Each Repeating Unit Denotes the Content (% by Mass) of Each Repeating Unit with Respect to all Repeating Units; Ac Represents —C(O)$CH_3$)

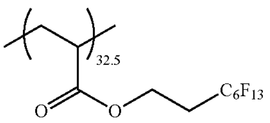

-continued

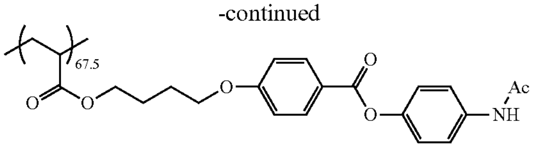

[Formation of Oxygen-Shielding Layer D1]

A coating liquid D1 having the following formulation was continuously applied onto the first light-absorbing anisotropic layer H using a wire bar. Thereafter, the film was dried with hot air at 80° C. for 5 minutes, thereby obtaining a laminate on which an oxygen-shielding layer D1 consisting of polyvinyl alcohol (PVA) and having a thickness of 1.0 μm was formed, that is, obtaining a laminate H in which the cellulose acylate film A1 (transparent support), the photo-alignment film B1, the first light-absorbing anisotropic layer H, and the oxygen-shielding layer D1 were provided adjacent to each other in this order.

| Composition of coating liquid D1 for forming oxygen-shielding layer | |
|---|---|
| Modified polyvinyl alcohol shown below | 3.80 parts by mass |
| Initiator Irg2959 | 0.20 parts by mass |
| Water | 70 parts by mass |
| Methanol | 30 parts by mass |

Modified Polyvinyl Alcohol

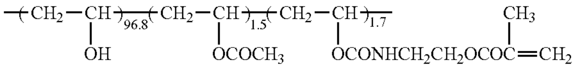

[Production of Laminate V Including Second Light-Absorbing Anisotropic Layer V]

[Formation of Alignment Film]

A surface of Z-TAC (film thickness: 40 μm) was saponified with an alkaline solution, and the following composition 1 for forming an alignment film was applied thereon using a wire bar. The support on which the coating film was formed was dried with hot air at 60° C. for 60 seconds, and further dried with hot air at 100° C. for 120 seconds to form an alignment film AL1, thereby obtaining a TAC film 1 with an alignment film. A film thickness of the alignment film AL1 was 1 μm.

| (Composition 1 for forming alignment film) | |
|---|---|
| Modified polyvinyl alcohol PVA-1 shown below | 3.80 parts by mass |
| IRGACURE 2959 | 0.20 parts by mass |
| Water | 70 parts by mass |
| Methanol | 30 parts by mass |

Modified Polyvinyl Alcohol PVA-1

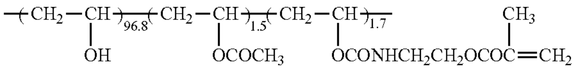

[Formation of Second Light-Absorbing Anisotropic Layer V]

The obtained TAC film 1 with an alignment film was continuously coated with the following composition P1 for forming a light-absorbing anisotropic layer using a wire bar, heated at 120° C. for 60 seconds, and cooled to room temperature (23° C.).

Next, the coating layer was heated at 120° C. for 60 seconds, and cooled to room temperature again.

Thereafter, the coating layer was irradiated from a normal direction to the film with light for 2 seconds under an irradiation condition of illuminance of 200 $mW/cm^2$ using a LED lamp (central wavelength: 365 nm) to produce a second light-absorbing anisotropic layer V on the alignment film AL1.

A film thickness of the second light-absorbing anisotropic layer V was 3.5 μm.

| (Composition P1 for forming light-absorbing anisotropic layer) | |
|---|---|
| Dichroic substance D-1 shown below | 0.63 parts by mass |
| Dichroic substance D-2 shown below | 0.17 parts by mass |
| Dichroic substance D-3 shown below | 1.13 parts by mass |
| High-molecular-weight liquid crystalline compound P-1 shown below | 8.18 parts by mass |
| IRGACURE OXE-02 (manufactured by BASF SE) | 0.16 parts by mass |
| Alignment agent E-1 shown below | 0.13 parts by mass |
| Alignment agent E-2 shown below | 0.13 parts by mass |
| Surfactant F-1 shown below | 0.004 parts by mass |
| Cyclopentanone | 85.01 parts by mass |
| Benzyl alcohol | 4.47 parts by mass |

Dichroic Substance D-1

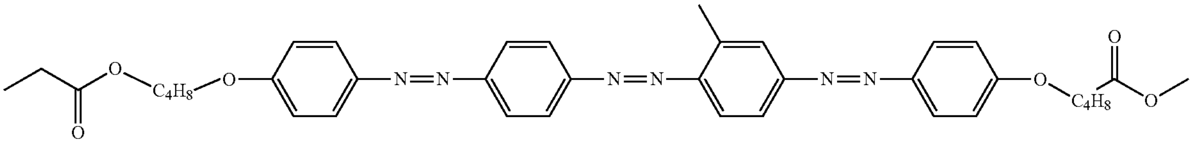

Dichroic Substance D-2

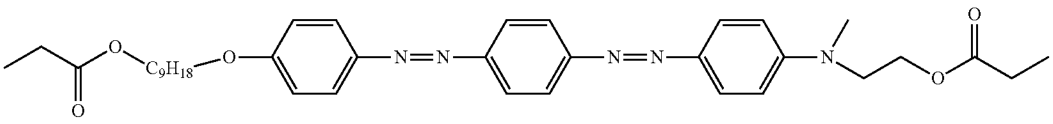

Dichroic Substance D-3

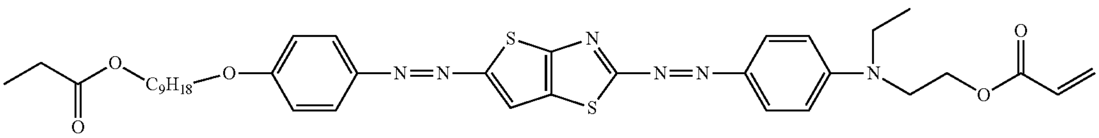

High-Molecular-Weight Liquid Crystalline Compound P-1

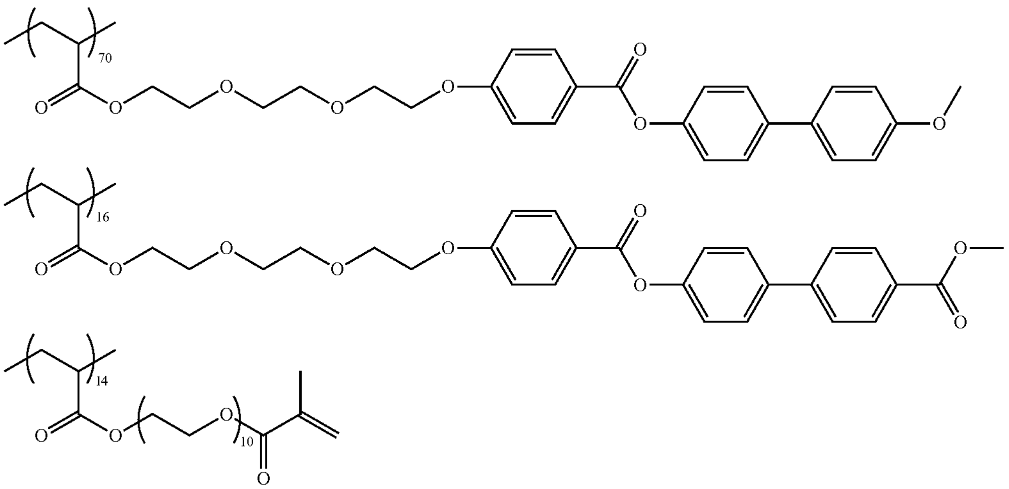

Alignment Agent E-1

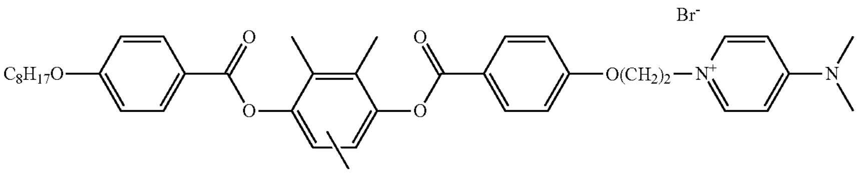

Alignment Agent E-2

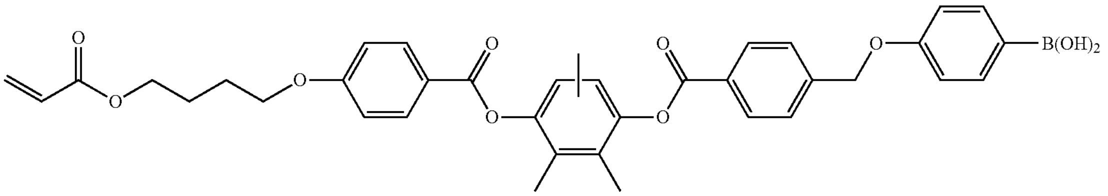

Surfactant F-1

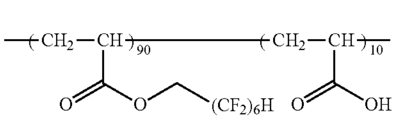

[Formation of Protective Layer B1]

A coating film was formed by continuously coating the obtained second light-absorbing anisotropic layer V with the following composition B1 for forming a protective layer using a wire bar.

Next, the support on which the coating film had been formed was dried with hot air at 60° C. for 60 seconds, and further dried with hot air at 100° C. for 120 seconds to form a protective layer B1, thereby obtaining a laminate V. A film thickness of the protective layer was 0.5 μm.

In a case where a transmittance central axis angle θ was measured by the above-described method using the produced laminate V, the transmittance central axis angle θ was 0°. Since none of the layer configurations of the laminate V other than the second light-absorbing anisotropic layer V had absorption anisotropy, the transmittance central axis angle θ calculated above could be read as the value of the second light-absorbing anisotropic layer V in the laminate V.

In addition, using AxoScan OPMF-1 (manufactured by Opto Science, Inc.), a transmittance of the laminate at a wavelength of 550 nm was measured. The transmittance of the laminate in the normal direction was 78%, and the transmittance in a direction inclined by 30 degrees from the normal direction of the laminate was 17%.

| (Composition B1 for forming protective layer) | |
|---|---|
| Modified polyvinyl alcohol PVA-1 shown above | 3.88 parts by mass |
| IRGACURE 2959 | 0.20 parts by mass |
| Water | 70 parts by mass |
| Methanol | 30 parts by mass |

[Production of Laminate pC1 Including Second Retardation Layer pC1]

[Formation of Photo-Alignment Film G1]

Z-TAC (film thickness: 40 μm) was used as a temporary support.

After passing the Z-TAC (film thickness: 40 μm) through a dielectric heating roll at a temperature of 60° C. to raise the film surface temperature to 40° C., an alkaline solution having the composition shown below was applied onto one surface of the film using a bar coater at a coating amount of 14 ml/$m^2$, followed by heating to 110° C., and transportation of the film under a steam type far-infrared heater manufactured by Noritake Company Limited for 10 seconds.

Next, the film was coated with pure water such that the coating amount reached 3 ml/$m^2$ using the same bar coater. Next, the film was washed with water by a fountain coater and drained by an air knife three times, and then transported to a drying zone at 70° C. for 10 seconds and dried to produce a Z-TAC (film thickness: 40 μm) subjected to an alkali saponification treatment.

| (Alkali solution) | |
|---|---|
| Potassium hydroxide | 4.7 parts by mass |
| Water | 15.8 parts by mass |
| Isopropanol | 63.7 parts by mass |
| Fluorine-containing surfactant SF-1 ($C_{14}H_{29}O(CH_2CH_2O)_{20}H$) | 1.0 part by mass |
| Propylene glycol | 14.8 parts by mass |

The cellulose acylate film A1 which had been subjected to the alkali saponification treatment was continuously coated with a coating liquid G1 for forming a photo-alignment film, having the following composition, using a #8 wire bar. The obtained film was dried with hot air at 60° C. for 60 seconds, and further dried with hot air at 100° C. for 120 seconds to form a photo-alignment film G1. A film thickness of the photo-alignment film G1 was 0.3 μm.

| Coating liquid G1 for forming photo-alignment film | |
|---|---|
| Polyvinyl alcohol (PVA103 manufactured by Kuraray Co., Ltd.) | 2.4 parts by mass |
| Isopropyl alcohol | 1.6 parts by mass |
| Methanol | 36 parts by mass |
| Water | 60 parts by mass |

[Formation of Second Retardation Layer pC1]

The photo-alignment film G1 was coated with a coating liquid H1 for forming a positive C-plate, having the following composition, the obtained coating film was aged at 60° C. for 60 seconds and irradiated with ultraviolet rays at an illuminance of 1000 mJ/$cm^2$ in the air using an air-cooled metal halide lamp at an illuminance of 70 mW/$cm^2$ (manufactured by Eye Graphics Co., Ltd.), and the alignment state thereof was fixed to vertically align the liquid crystalline compound, thereby producing a laminate pC1 including a second retardation layer pC1 corresponding to a positive C-plate, the laminate pC1 having a thickness of 0.5 μm. Rth(550) of the obtained positive C-plate was −60 nm.

| Coating liquid H1 for forming positive C-plate | |
|---|---|
| Liquid crystalline compound LC-1 shown below | 80 parts by mass |
| Liquid crystalline compound LC-2 shown below | 20 parts by mass |
| Vertically aligned liquid crystalline compound alignment agent S01 shown below | 1 part by mass |
| Ethylene oxide-modified trimethylolpropane triacrylate (V#360, manufactured by Osaka Organic Chemical Industry Ltd.) | 8 parts by mass |
| IRGACURE 907 (manufactured by BASF SE) | 3 parts by mass |
| KAYACURE DETX (manufactured by Nippon Kayaku Co., Ltd.) | 1 part by mass |
| Compound B03 shown below | 0.4 parts by mass |
| Methyl ethyl ketone | 170 parts by mass |
| Cyclohexanone | 30 parts by mass |

Liquid Crystalline Compound LC-1

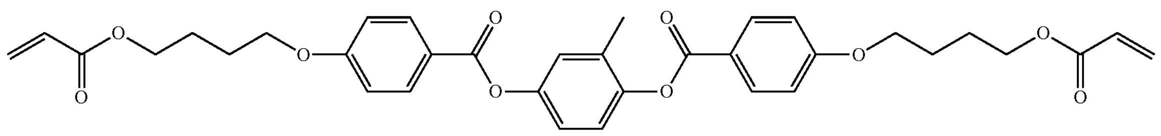 [SMILES: C=CC(=O)OCCCCOc1ccc(C(=O)Oc2ccc(OC(=O)c3ccc(OCCCCOC(=O)C=C)cc3)c(C)c2)cc1]

Liquid Crystalline Compound LC-2

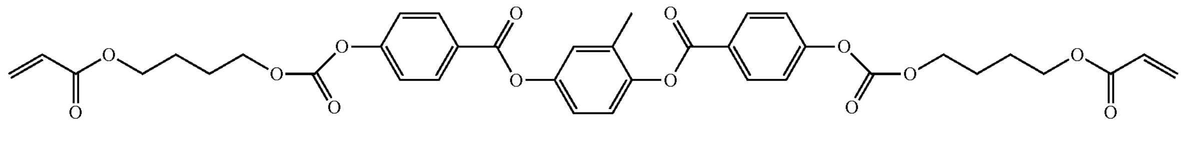 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Vertically Aligned Liquid Crystalline Compound Alignment Agent S01

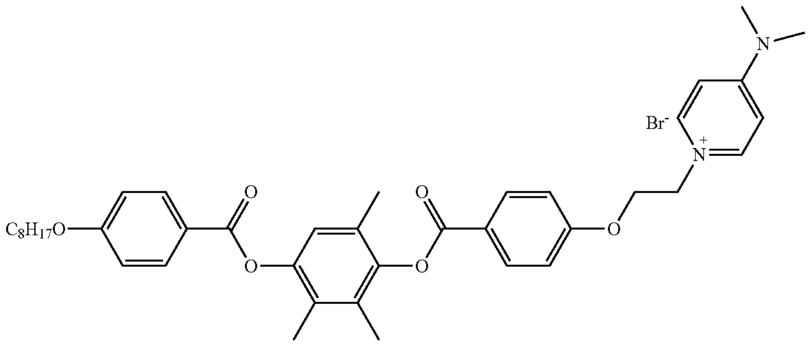

Compound B03

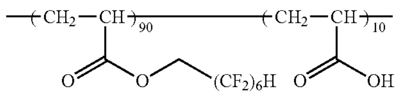

[Production of Laminate pA Including Third Retardation Layer pA]

[Production of Photo-Alignment Film]

A coating liquid 1 for forming a photo-alignment film was prepared with reference to the description of Example 3 in JP2012-155308A.

The coating liquid 1 for a photo-alignment film, prepared in advance, was applied to one surface of Z-TAC (film thickness: 40 μm) using a bar coater. After the application, the coating film was dried on a hot plate at 120° C. for 2 minutes to remove the solvent, thereby forming a coating film. The obtained coating film was irradiated with polarized ultraviolet rays (10 mJ/$cm^2$, using an ultra-high-pressure mercury lamp) to form a photo-alignment film 1. A film thickness of the photo-alignment film 1 was 0.04 μm.

[Formation of Third Retardation Layer pA]

A composition 1 for forming a liquid crystal layer, having the following formulation, was prepared.

The composition 1 for forming a liquid crystal layer was applied onto the photo-alignment film 1 using a bar coater to form a composition layer. The formed composition layer was heated to 110° C. on a hot plate, and the temperature was lowered to 60° C. to stabilize the alignment. Thereafter, the temperature was maintained at 60° C., and the alignment was fixed by irradiation with ultraviolet rays (500 mJ/$cm^2$, using an ultra-high-pressure mercury lamp) in a nitrogen atmosphere (oxygen concentration: 100 ppm) to form a retardation layer (third retardation layer pA) having a thickness of 1.5 μm, thereby producing a laminate pA. The obtained retardation layer was a positive A-plate, and Re(550)=120 nm.

| (Composition 1 for forming liquid crystal layer) | |
|---|---|
| Liquid crystalline compound R1 shown below | 84.00 parts by mass |
| Polymerizable compound B2 shown below | 16.00 parts by mass |
| Polymerization initiator P3 shown below | 0.50 parts by mass |
| Surfactant S3 shown below | 0.15 parts by mass |
| Hisolve MTEM (manufactured by TOHO Chemical Industry Co., Ltd.) | 2.00 parts by mass |
| NK Ester A-200 (manufactured by Shin-Nakamura Chemical Co., Ltd.) | 1.00 part by mass |
| Methyl ethyl ketone | 424.8 parts by mass |

Liquid Crystalline Compound R1

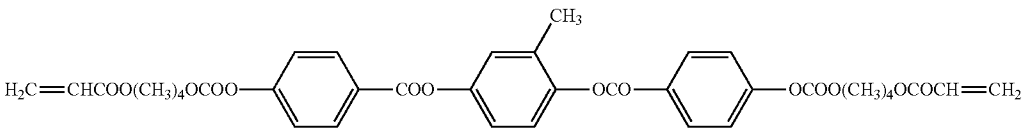

Polymerizable Compound B2

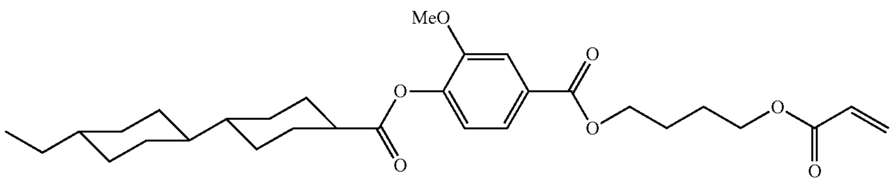 [SMILES: C=CC(=O)OCCCCOC(=O)c1ccc(OC(=O)C2CCC(C3CCC(CC)CC3)CC2)c(OC)c1]

Polymerization Initiator P3

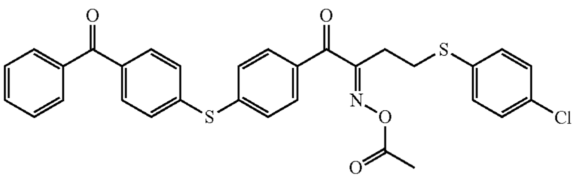 [SMILES: CC(=O)O/N=C(\CCSc1ccc(Cl)cc1)C(=O)c1ccc(Sc2ccc(C(=O)c3ccccc3)cc2)cc1]

Surfactant S3

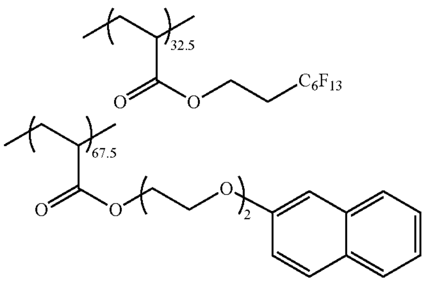

[Production of Laminate pC2 Including Fourth Retardation Layer pC2]

A laminate pC2 including a fourth retardation layer pC2 was produced by the same method as [Production of laminate pC1 including second retardation layer pC1] described above, except that the film thickness of the retardation layer was changed to 3.5 μm and the blending amount of the compound B03 was changed to 0.1 parts by mass.

[Production of Laminate nC Including Fifth Retardation Layer nC]

[Formation of Alignment Film]

A surface of Z-TAC (film thickness: 40 μm) which was a transparent film base material was saponified with an alkaline solution, and the following composition 1 for forming an alignment film was applied thereon using a wire bar. The support on which the coating film was formed was dried with hot air at 60° C. for 60 seconds, and further dried with hot air at 100° C. for 120 seconds to form an alignment film AL1, thereby obtaining a TAC film 1 with an alignment film. A film thickness of the alignment film AL1 was 1 μm.

| (Composition 1 for forming alignment film) | |
|---|---|
| Modified polyvinyl alcohol PVA-1 shown below | 3.80 parts by mass |
| IRGACURE 2959 | 0.20 parts by mass |
| Water | 70 parts by mass |
| Methanol | 30 parts by mass |

Modified Polyvinyl Alcohol PVA-1

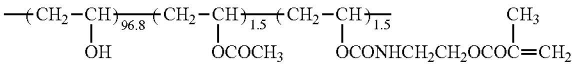

[Formation of Fifth Retardation Layer nC]

A fifth retardation layer nC was produced on the obtained TAC film 1 with an alignment film using the following composition 6 for forming a liquid crystal layer.

In the fifth retardation layer nC, Re(550)=0.2 nm, and Rth(550)=600 nm. A film thickness of the fifth retardation layer nC was 4.8 μm.

| (Composition 6 for forming liquid crystal layer) | |
|---|---|
| Discotic liquid crystalline compound A-1 shown below | 80 parts by mass |
| Discotic liquid crystalline compound A-2 shown below | 20 parts by mass |
| Discotic liquid crystalline compound B-1 shown below | 5.6 parts by mass |
| Polymerizable monomer T-1 | 5.6 parts by mass |
| Polymer C-1 shown below | 0.2 parts by mass |
| Polymerization initiator (IRGACURE 907, manufactured by BASF) | 3 parts by mass |
| Toluene | 170 parts by mass |
| Methyl ethyl ketone | 73 parts by mass |

Discotic Liquid Crystalline Compound A-1 (1,3,5-Substituted Benzene-Type Polymerizable Discotic Liquid Crystalline Compound)

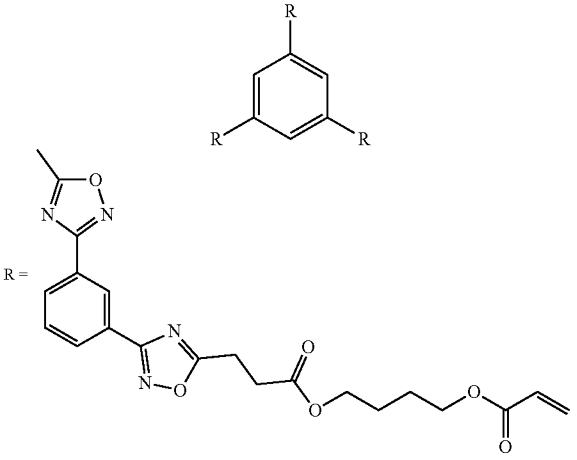

Discotic Liquid Crystalline Compound A-2 (1,3,5-Substituted Benzene-Type Polymerizable Discotic Liquid Crystalline Compound)

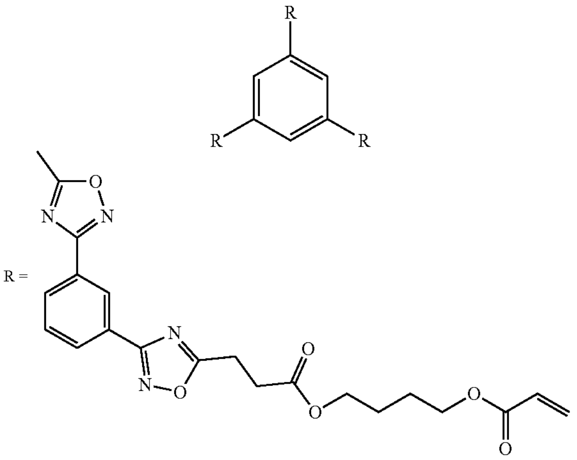

Discotic Liquid Crystalline Compound B-1 (Polymerizable Triphenylene-Type Discotic Liquid Crystalline Compound)

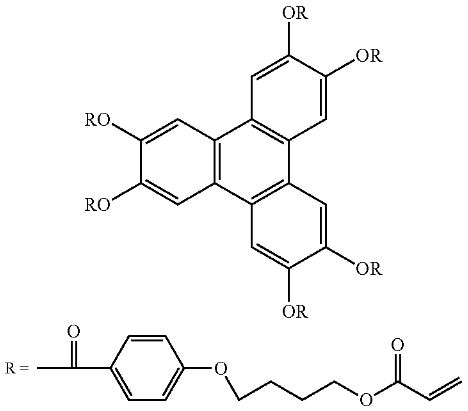

Polymerizable Monomer T-1

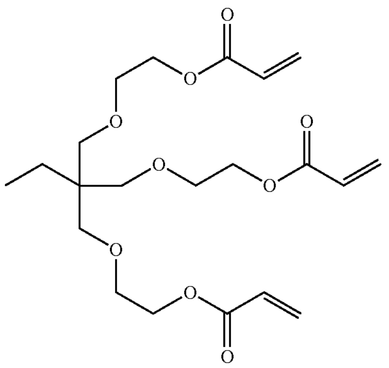 [SMILES: C=CC(=O)OCCOCC(CC)(COCCOC(=O)C=C)COCCOC(=O)C=C]

Polymer C-1 (Hereinafter, the Copolymerization Ratio of the Chemical Structural Formula is in Units of % by Mass)

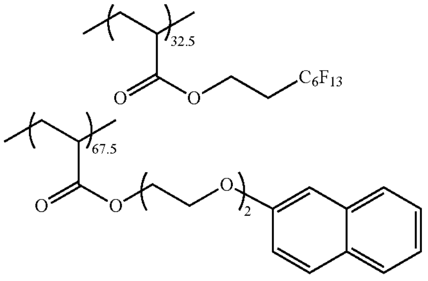

[Production of Pressure Sensitive Adhesives N1 and N2]

Next, an acrylate-based polymer was prepared according to the following procedure.

95 parts by mass of butyl acrylate and 5 parts by mass of acrylic acid were polymerized by a solution polymerization method in a reaction container equipped with a cooling pipe, a nitrogen introduction pipe, a thermometer, and a stirrer, thereby obtaining an acrylate-based polymer (NA1) with an average molecular weight of 2,000,000 and a molecular weight distribution (Mw/Mn) of 3.0.

Next, an acrylate-based pressure sensitive adhesive was produced with the following formulation using the obtained acrylate-based polymer (NA1). Each separate film which had been subjected to a surface treatment with a silicone-based release agent was coated with the composition using a die coater, dried in an environment of 90° C. for 1 minute, and irradiated with ultraviolet rays (UV) under the following conditions, thereby obtaining the following acrylate-based pressure sensitive adhesives N1 and N2 (pressure-sensitive adhesive layers). The composition and the film thickness of the acrylate-based pressure sensitive adhesive are shown below.

<UV Irradiation Conditions>

Electrodeless lamp H bulb (Fusion Co., Ltd.)

Illuminance: 600 mW/$cm^2$, light dose: 150 mJ/$cm^2$

The UV illuminance and the light dose were measured using “UVPF-36” (manufactured by Eye Graphics Co., Ltd.).

| Acrylate-based pressure sensitive adhesive N1 (film thickness: 5 μm, storage elastic modulus: 2.6 MPa) | |
|---|---|
| Acrylate-based polymer (NA1) | 100 parts by mass |
| (A) Polyfunctional acrylate-based monomer shown below | 11.1 parts by mass |
| (B) Photopolymerization initiator shown below | 1.1 parts by mass |
| (C) Isocyanate-based crosslinking agent shown below | 1.0 part by mass |
| (D) Silane coupling agent shown below | 0.2 parts by mass |

| Acrylate-based pressure sensitive adhesive N2 (film thickness: 15 μm, storage elastic modulus: 0.4 MPa) | |
|---|---|
| Acrylate-based polymer (NA1) | 100 parts by mass |
| (C) Isocyanate-based crosslinking agent shown below | 1.0 part by mass |
| (D) Silane coupling agent shown below | 0.2 parts by mass |

(A) Polyfunctional acrylate-based monomer: tris(acryloyloxyethyl) isocyanurate, molecular weight=423, trifunctional type (manufactured by Toagosei Co., Ltd., trade name “ARONIX M-315”)

(B) Photopolymerization initiator: mixture of benzophenone and 1-hydroxycyclohexyl phenyl ketone at mass ratio of 1:1, “IRGACURE 500” manufactured by Ciba Specialty Chemicals Corp.

(C) Isocyanate-based crosslinking agent: trimethylolpropane-modified tolylene diisocyanate (“CORONATE L” manufactured by Nippon Polyurethane Industry Co., Ltd.)

(D) Silane coupling agent: 3-glycidoxypropyltrimethoxysilane (“KBM-403” manufactured by Shin-Etsu Chemical Co., Ltd.)

Example 1

The first retardation layer Q side in the laminate Q described above was bonded to one surface of a temporary support PANA-PEEL NP-75-C(manufactured by PANAC Corporation) using the above-described pressure sensitive adhesive N2, and peeled at an interface between the photo-alignment film and the first retardation layer Q to remove the Z-TAC (film thickness: 40 μm) with the photo-alignment film.

Next, the oxygen-shielding layer D1 side in the laminate H described above was bonded onto the first retardation layer Q using the above-described pressure sensitive adhesive N1.

At this time, a slow axis of the first retardation layer Q and an absorption axis of the first light-absorbing anisotropic layer H were arranged at an angle of 45°.

Next, only the Z-TAC (film thickness: 40 μm) included in the laminate H described above was removed, and the removed surface and the surface of the laminate V at the protective layer B1 described above were bonded to each other using the above-described pressure sensitive adhesive N1. Thereafter, the Z-TAC (film thickness: 40 μm) included in the laminate V described above was removed.

Next, the temporary support PANA-PEEL NP-75-C was peeled off to produce a circularly polarizing plate 1 having a total thickness of 35.5 μm.

Example 2

The second retardation layer pC1 side in the laminate pC1 described above was bonded to one surface of a temporary support PANA-PEEL NP-75-C(manufactured by PANAC Corporation) using the above-described pressure sensitive adhesive N2, and peeled at an interface between the photo-alignment film and the second retardation layer pC1 to remove the Z-TAC (film thickness: 40 μm) with the photo-alignment film.

Next, the first retardation layer Q side in the laminate Q described above was bonded to the second retardation layer pC1 using the above-described pressure sensitive adhesive N1, and peeled at an interface between the photo-alignment film and the first retardation layer Q to remove the Z-TAC (film thickness: 40 μm) with the photo-alignment film.

Next, the oxygen-shielding layer D1 side in the laminate H described above was bonded onto the first retardation layer Q using the above-described pressure sensitive adhesive N1.

At this time, a slow axis of the first retardation layer Q and an absorption axis of the first light-absorbing anisotropic layer H were arranged at an angle of 45°. Next, only the Z-TAC (film thickness: 40 μm) included in the laminate H described above was removed, and the removed surface and the surface of the laminate V at the protective layer B1 described above were bonded to each other using the above-described pressure sensitive adhesive N1. Thereafter, the Z-TAC (film thickness: 40 μm) included in the laminate V described above was removed.

Next, the temporary support PANA-PEEL NP-75-C was peeled off to produce a circularly polarizing plate 2 having a total thickness of 41.3 μm.

Example 3

(Method for Producing Circularly Polarizing Plate 3)

The second retardation layer pC1 side in the laminate pC1 described above was bonded to one surface of a temporary support PANA-PEEL NP-75-C(manufactured by PANAC Corporation) using the above-described pressure sensitive adhesive N2, and peeled at an interface between the photo-alignment film and the second retardation layer pC1 to remove the Z-TAC (film thickness: 40 μm) with the photo-alignment film.

Next, the first retardation layer Q side in the laminate Q described above was bonded to the second retardation layer pC1 using the above-described pressure sensitive adhesive N1, and peeled at an interface between the photo-alignment film and the first retardation layer Q to remove the Z-TAC (film thickness: 40 μm) with the photo-alignment film.

Next, the oxygen-shielding layer D1 side in the laminate H described above was bonded onto the first retardation layer Q using the above-described pressure sensitive adhesive N1.

At this time, a slow axis of the first retardation layer Q and an absorption axis of the first light-absorbing anisotropic layer H were arranged at an angle of 45°.

Next, only the Z-TAC (film thickness: 40 μm) included in the laminate H described above was removed, and the removed surface and the surface of the laminate pA at the third retardation layer pA described above were bonded to each other using the above-described pressure sensitive adhesive N1. At this time, a slow axis of the third retardation layer pA was disposed to be orthogonal to an absorption axis of the first light-absorbing anisotropic layer H. Thereafter, the Z-TAC (film thickness: 40 μm) included in the laminate pA described above was removed. Next, the surface of the fourth retardation layer pC2 in the laminate pC2 described above was bonded to the third retardation layer pA using the above-described pressure sensitive adhesive N1. Thereafter, the Z-TAC (film thickness: 40 μm) included in the laminate pC2 described above was removed.

Next, the surface of the protective layer B1 in the laminate V described above was bonded to the fourth retardation layer pC2 using the above-described pressure sensitive adhesive N1. Thereafter, the Z-TAC (film thickness: 40 μm) included in the laminate V described above was removed.

Next, the temporary support PANA-PEEL NP-75-C was peeled off to produce a circularly polarizing plate 3 having a total thickness of 56.65 μm.

Example 4

(Method for Producing Circularly Polarizing Plate 4)

The second retardation layer pC1 side in the laminate pC1 described above was bonded to one surface of a temporary support PANA-PEEL NP-75-C(manufactured by PANAC Corporation) using the above-described pressure sensitive adhesive N2, and peeled at an interface between the photo-alignment film and the second retardation layer pC1 to remove the Z-TAC (film thickness: 40 μm) with the photo-alignment film.

Next, the first retardation layer Q side in the laminate Q described above was bonded to the second retardation layer pC1 using the above-described pressure sensitive adhesive N1, and peeled at an interface between the photo-alignment film and the first retardation layer Q to remove the Z-TAC (film thickness: 40 μm) with the photo-alignment film.

Next, the oxygen-shielding layer D1 side in the laminate H described above was bonded onto the first retardation layer Q using the above-described pressure sensitive adhesive N1.

At this time, a slow axis of the first retardation layer Q and an absorption axis of the first light-absorbing anisotropic layer H were arranged at an angle of 45°.

Next, only the Z-TAC (film thickness: 40 μm) included in the laminate H described above was removed, and the removed surface and the surface of the laminate pA at the third retardation layer pA described above were bonded to each other using the above-described pressure sensitive adhesive N1. At this time, a slow axis of the third retardation layer pA was disposed to be orthogonal to an absorption axis of the first light-absorbing anisotropic layer H. Thereafter, the Z-TAC (film thickness: 40 μm) included in the laminate pA described above was removed.

Next, the surface of the fourth retardation layer pC2 in the laminate pC2 described above was bonded to the third retardation layer pA using the above-described pressure sensitive adhesive N1. Thereafter, the Z-TAC (film thickness: 40 μm) included in the laminate pC2 described above was removed.

Next, the surface of the protective layer B1 in the laminate V described above was bonded to the fourth retardation layer pC2 using the above-described pressure sensitive adhesive N1. Thereafter, the Z-TAC (film thickness: 40 μm) included in the laminate V described above was removed.

Next, the surface of the fifth retardation layer nC in the laminate nC described above was bonded to the second light-absorbing anisotropic layer V using the above-described pressure sensitive adhesive N1. Thereafter, the Z-TAC (film thickness: 40 μm) included in the laminate nC described above was removed.

Next, the temporary support PANA-PEEL NP-75-C was peeled off to produce a circularly polarizing plate 4 having a total thickness of 67.45 μm.

Comparative Examples 1 to 4

In Comparative Examples 1 to 4, circularly polarizing plates 5 to 8 were respectively produced in the same manner as in Examples 1 to 4, except that, in the production procedure of the circularly polarizing plate in Examples 1 to 4, each layer was laminated without peeling off the Z-TAC (film thickness: 40 μm).

Comparative Example 5

[Production of Polarizer]

A PVA film having a film thickness of 30 μm, an average degree of polymerization of 2400, and a degree of saponification of 99.9 mol % was immersed in warm water at 25° C. for 120 seconds to swell the film. Next, the PVA film was dyed while being immersed in an aqueous solution having a concentration of 0.6% by weight of iodine/potassium iodide (weight ratio=2/3) and stretched 2.1 times. Thereafter, the film was stretched in a boric acid ester aqueous solution at 55° C. such that the total stretching ratio reached 5.5 times, washed with water, and dried to produce a polarizer. A thickness of the polarizer was 8 μm.

[Production of Circularly Polarizing Plate]

A saponified Z-TAC (film thickness: 40 μm) was laminated on both surfaces of the above-described polarizer by wetting the surface of the cellulose acylate film with pure water. Next, the polarizer on which the cellulose acylate film had been laminated was passed through a nip roll machine, and then dried at 60° C. for 10 minutes to obtain an iodine-based linear polarizer 1.

The cellulose acylate film was peeled off from one surface of the iodine-based linear polarizer 1, and the first retardation layer Q side in the laminate Q described above was bonded thereto using the above-described pressure sensitive adhesive N2, and peeled at an interface between the photo-alignment film and the first retardation layer Q to remove the Z-TAC (film thickness: 40 μm) with the photo-alignment film.

Next, the oxygen-shielding layer D1 side in the laminate H described above was bonded onto the first retardation layer Q using the above-described pressure sensitive adhesive N1.

At this time, a slow axis of the first retardation layer Q and an absorption axis of the first light-absorbing anisotropic layer H were arranged at an angle of 45°.

Next, only the Z-TAC (film thickness: 40 μm) included in the laminate H described above was removed, and the removed surface and the surface of the laminate V at the protective layer B1 described above were bonded to each other using the above-described pressure sensitive adhesive N1. Thereafter, the Z-TAC (film thickness: 40 μm) included in the laminate V described above was removed.

Next, the cellulose acylate film was also peeled off from the other surface of the iodine-based linear polarizer 1, thereby producing a circularly polarizing plate 9 having a total thickness of 40.7 μm.

With regard to the circularly polarizing plates 1 to 9 produced in Examples 1 to 4 and Comparative Examples 1 to 5, Table 1 shows layer configurations other than the alignment film, the protective layer, and the oxygen-shielding layer.

In addition, with regard to the circularly polarizing plates 1 to 9, a thermal shrinkage force and a dehumidification shrinkage force were measured by the methods described above. The results are shown in Table 1 below. "PSA" in Table 1 below represents a pressure sensitive adhesive.

TABLE 1

| | Circularly polarizing plate | Layer configuration | Thermal shrinkage force (N/m) | Dehumidification shrinkage force (N/m) | Total thickness (μm) |
|---|---|---|---|---|---|
| Example 1 | Circularly polarizing plate 1 | (First retardation layer Q)PSA(first light-absorbing anisotropic layer H)PSA(second light-absorbing anisotropic layer V) | 0.3 | 10 | 35.50 |
| Example 2 | Circularly polarizing plate 2 | (Second retardation layer pC1)PSA(first retardation layer Q)PSA(first light-absorbing anisotropic layer H)PSA(second light-absorbing anisotropic layer V) | 0.4 | 13 | 41.30 |
| Example 3 | Circularly polarizing plate 3 | (Second retardation layer pC1)PSA(first retardation layer Q)PSA(first light-absorbing anisotropic layer H)PSA(third retardation layer pA)PSA(fourth retardation layer pC2)PSA(second light-absorbing anisotropic layer V) | 0.6 | 20 | 56.65 |
| Example 4 | Circularly polarizing plate 4 | (Second retardation layer pC1)PSA(first retardation layer Q)PSA(first light-absorbing anisotropic layer H)PSA(third retardation layer pA)PSA(fourth retardation layer pC2)PSA(second light-absorbing anisotropic layer V)PSA(fifth retardation layer nC) | 0.7 | 23 | 67.45 |
| Comparative Example 1 | Circularly polarizing plate 5 | (First retardation layer Q/support)PSA(first light-absorbing anisotropic layer H/support)PSA(second light-absorbing anisotropic layer V/support) | 12 | 150 | 155.50 |

TABLE 1-continued

| | Circularly polarizing plate | Layer configuration | Thermal shrinkage force (N/m) | Dehumidification shrinkage force (N/m) | Total thickness (μm) |
|---|---|---|---|---|---|
| Comparative Example 2 | Circularly polarizing plate 6 | (Second retardation layer pC1/support)PSA(first retardation layer Q/support)PSA(first light-absorbing anisotropic layer H/support)PSA(second light-absorbing anisotropic layer V/support) | 16 | 200 | 201.30 |
| Comparative Example 3 | Circularly polarizing plate 7 | (Second retardation layer pC1/support)PSA(first retardation layer Q/support)PSA(first light-absorbing anisotropic layer H/support)PSA(third retardation layer pA/support)PSA(fourth retardation layer pC2/support)PSA(second light-absorbing anisotropic layer V/support) | 24 | 300 | 296.65 |
| Comparative Example 4 | Circularly polarizing plate 8 | (Second retardation layer pC1/support)PSA(first retardation layer Q/support)PSA(first light-absorbing anisotropic layer H/support)PSA(third retardation layer pA/support)PSA(fourth retardation layer pC2/support)PSA(second light-absorbing anisotropic layer V/support)PSA(fifth retardation layer nC/support) | 28 | 350 | 347.45 |
| Comparative Example 5 | Circularly polarizing plate 9 | (First retardation layer Q)PSA(iodine-based linear polarizer)PSA(second light-absorbing anisotropic layer V) | 10 | 100 | 40.70 |

[Evaluation]

GALAXY S5 manufactured by SAMSUNG, equipped with an organic EL panel (organic EL display device), was disassembled, a touch panel with a circularly polarizing plate was peeled off from the organic EL display device, and the organic EL display element was isolated.

The surface of each of the circularly polarizing plates 1 to 9 peeled off from the temporary support PANA-PEEL NP-75-C was bonded to a light emitting surface of the organic EL element, thereby producing image display devices 1 to 9.

The respective evaluations shown below were performed on the produced image display devices 1 to 9 by the methods shown below. The results are shown in Table 2 below.

[Antireflection Ability]

The produced image display device was evaluated for antireflection ability under bright light.

Specifically, a display screen of the image display device was displayed in black, and reflected light in a case where a fluorescent lamp was projected from a front surface and at a polar angle of 45 degree was observed. Antireflection ability was evaluated based on the following standard.

<Evaluation Standard>

A: luminance in 45-degree azimuth was as dark as that in 0-degree azimuth.

B: luminance in 45-degree azimuth was brighter than that in 0-degree azimuth.

[Viewing Angle Control Capability]

Figure 3:
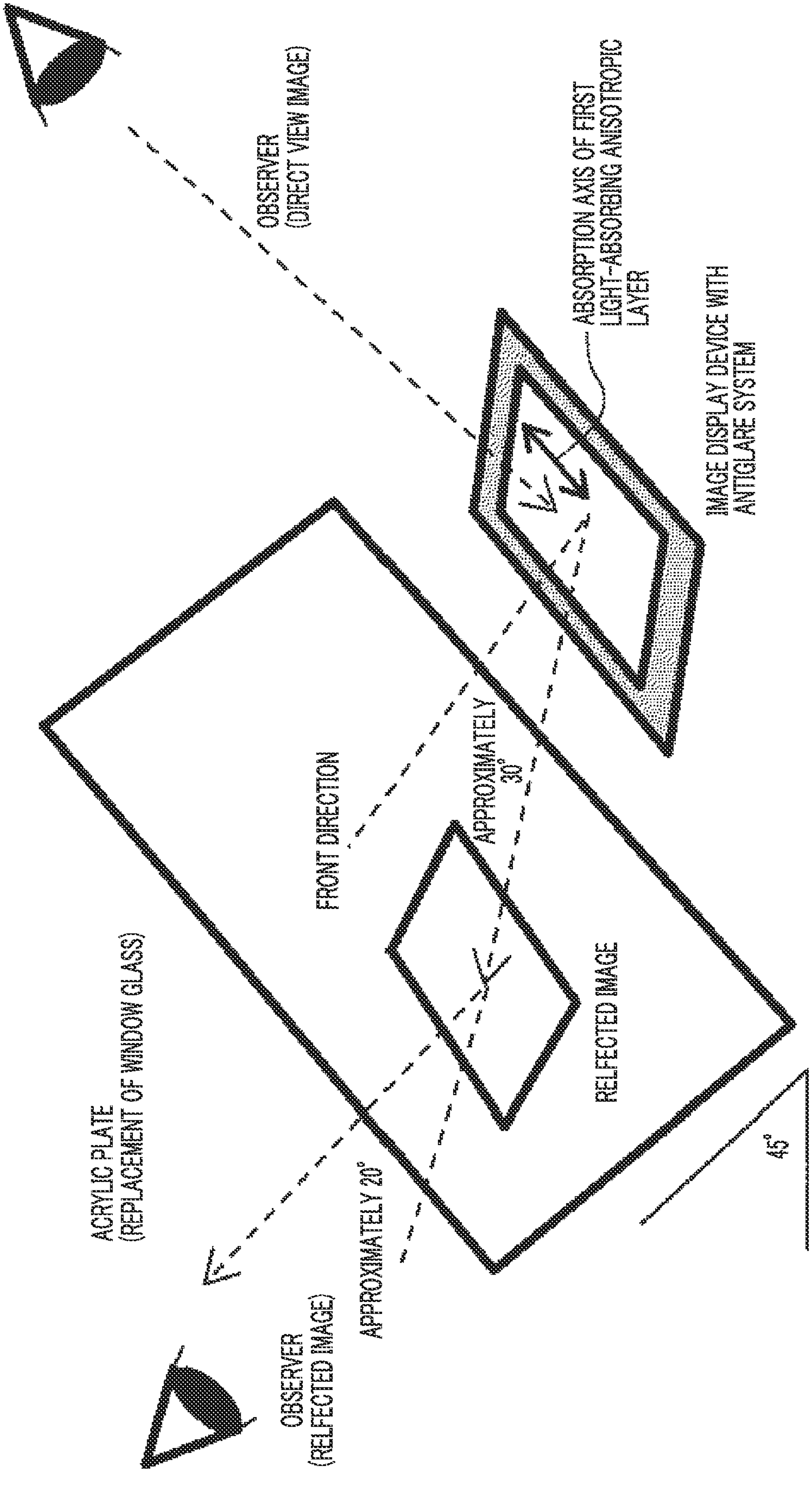
FIG. 3 is a schematic view of an evaluation system for a reflected image.

The produced image display device was installed in an evaluation system for a reflected image, shown in FIG. 3, in order to evaluate a reflected image with respect to a window glass. The image display device was installed such that an acrylic plate and the absorption axis of the first light-absorbing anisotropic layer were parallel to each other.

Next, in a state in which a white image was displayed on the entire surface of the display screen of the image display device, brightness of the image reflected on the surface of the acrylic plate installed instead of the window glass was evaluated.

At this time, the direction of observing the reflected images was set to an oblique direction at an angle of approximately 300 with respect to a straight line extending from the center of the image display device to the front direction of the acrylic plate as shown in FIG. 3, and the reflected images were observed from obliquely above at an angle of approximately 20° with respect to the plane of the acrylic plate. Viewing angle control ability was evaluated based on the following standard.

<Evaluation Standard>

A: reflected glare was not visible.

B: reflected glare was weakly visible.

C: reflected glare could be visible.

[Corner Light Leakage of Display Device]

(Influence of Thermal Shrinkage Force)

The image display device was placed in a constant temperature and humidity apparatus, held at an initial temperature of 25° C. for 5 minutes, then raised to 95° C. at a heating rate of 5° C./min, and held for 240 hours. Next, the image display device was taken out to an environment of 25° C. and 60% RH, and after 5 minutes, the display screen of the image display device was displayed in black, and light reflected in a case where fluorescent light was projected from the front surface was observed. Light leakage at the corner was evaluated based on the following standard.

(Influence of Dehumidification Shrinkage Force)

The image display device was placed in a constant temperature and humidity apparatus, held at a temperature of 30° C. and 50% RH as an initial state for 10 minutes, allowed to reach an intermediate state of 30° C. and 80% RH at a humidification rate of 0.5% RH/min, and held for 240 hours. Thereafter, a final state of 30° C. and 25% RH was reached at a dehumidification rate of 1% RH/min, and the image display device was held for 24 hours. Next, the image display device was taken out to an environment of 25° C. and 60% RH, and after 5 minutes, the display screen of the image display device was displayed in black, and light reflected in a case where fluorescent light was projected from the front surface was observed. Light leakage at the corner was evaluated based on the following standard.

<Evaluation Standard>

A: light leakage at a corner portion was not visible.

B: light leakage at a corner portion was visible.

C: light leakage at a corner portion was strongly visible.

[Corner Prominence of Reflected Image]
(Influence of Thermal Shrinkage Force)

The image display device was placed in a constant temperature and humidity apparatus, held at an initial temperature of 25° C. for 5 minutes, then raised to 95° C. at a heating rate of 5° C./min, and held for 240 hours. Next, the image display device was taken out to an environment of 25° C. and 60% RH, and installed in an evaluation system for a reflected image, shown in FIG. 3. The image display device was installed such that an acrylic plate and the absorption axis of the first light-absorbing anisotropic layer were parallel to each other.

After 5 minutes from the taken out, brightness of an image reflected on the surface of the acrylic plate installed instead of the window glass was evaluated in a state in which a white image was displayed on the entire surface of the display screen of the image display device.

At this time, the direction of observing the reflected images was set to an oblique direction at an angle of approximately 300 with respect to a straight line extending from the center of the image display device to the front direction of the acrylic plate as shown in FIG. 3, and the reflected images were observed from obliquely above at an angle of approximately 20° with respect to the plane of the acrylic plate. Corner prominence of the reflected image was evaluated based on the following standard.

(Influence of Dehumidification Shrinkage Force)

The image display device was placed in a constant temperature and humidity apparatus, held at a temperature of 30° C. and 50% RH as an initial state for 10 minutes, allowed to reach an intermediate state of 30° C. and 80% RH at a humidification rate of 0.5% RH/min, and held for 240 hours.

Thereafter, a final state of 30° C. and 25% RH was reached at a dehumidification rate of 1% RH/min, and the image display device was held for 24 hours.

Next, the image display device was taken out to an environment of 25° C. and 60% RH, and installed in an evaluation system for a reflected image, shown in FIG. 3. The image display device was installed such that an acrylic plate and the absorption axis of the first light-absorbing anisotropic layer were parallel to each other.

After 5 minutes from the taken out, brightness of an image reflected on the surface of the acrylic plate installed instead of the window glass was evaluated in a state in which a white image was displayed on the entire surface of the display screen of the image display device.

At this time, the direction of observing the reflected images was set to an oblique direction at an angle of approximately 30° with respect to a straight line extending from the center of the image display device to the front direction of the acrylic plate as shown in FIG. 3, and the reflected images were observed from obliquely above at an angle of approximately 20° with respect to the plane of the acrylic plate. Corner prominence of the reflected image was evaluated based on the following standard.

<Evaluation Standard>

A: light leakage at a corner portion was not visible.
B: light leakage at a corner portion was visible.
C: light leakage at a corner portion was strongly visible.

TABLE 2

| | | | | Influence of thermal shrinkage force | | Influence of dehumidification shrinkage force | |
|---|---|---|---|---|---|---|---|
| | Display device | Antireflection ability | Viewing angle control capability | Corner light leakage of display device | Corner prominence of reflected image | Corner light leakage of display device | Corner prominence of reflected image |
| Example 1 | Display device 1 | B | C | A | A | A | A |
| Example 2 | Display device 2 | A | C | A | A | A | A |
| Example 3 | Display device 3 | A | B | A | A | A | A |
| Example 4 | Display device 4 | A | A | A | A | A | A |
| Comparative Example 1 | Display device 5 | B | C | B | B | B | B |
| Comparative Example 2 | Display device 6 | A | C | B | B | B | B |
| Comparative Example 3 | Display device 7 | A | B | C | C | C | C |
| Comparative Example 4 | Display device 8 | A | A | C | C | C | C |
| Comparative Example 5 | Display device 9 | B | C | B | B | B | B |

From the results shown in Tables 1 and 2, it was found that, in a case where the circularly polarizing plate including the support between any layers of the retardation layer, the first light-absorbing anisotropic layer, and the second light-absorbing anisotropic layer and having a thermal shrinkage force of more than 5 N/in was used in a self-luminous display device in a high-temperature environment or an environment in which humidity changes, the light leakage occurred at the corner portion of the display device, and the corner was conspicuous in the reflected image (Comparative Examples 1 to 5).

On the other hand, it was found that, in a case where the circularly polarizing plate not including a support between any layers of the retardation layer, the first light-absorbing anisotropic layer, and the second light-absorbing anisotropic layer and having a thermal shrinkage force of 5 N/m or less was used in a self-luminous display device in a high-temperature environment or an environment in which humidity changes, it was possible to suppress the occurrence of light leakage at the corner portion of the display device and to suppress the corner portion from being conspicuous in the reflected image (Examples 1 to 4).

EXPLANATION OF REFERENCES

1: first retardation layer Q
2: first light-absorbing anisotropic layer H
3: second light-absorbing anisotropic layer V
4: organic EL display panel
5: pressure-sensitive adhesive layer
6: support
10, 20: self-luminous display device
11, 21: circularly polarizing plate
30: evaluation system for reflected image
31: windshield
32: self-luminous display device

What is claimed is:

1. A circularly polarizing plate comprising, in the following order:

a retardation layer;
a first light-absorbing anisotropic layer; and
a second light-absorbing anisotropic layer,
wherein a support is not provided between any layers of the retardation layer, the first light-absorbing anisotropic layer, and the second light-absorbing anisotropic layer,
the first light-absorbing anisotropic layer has an absorption axis in a plane of the first light-absorbing anisotropic layer,
an angle θ between a transmittance central axis of the second light-absorbing anisotropic layer and a normal direction to a surface of the second light-absorbing anisotropic layer is 0° or more and 450 or less, and
a thermal shrinkage force of the circularly polarizing plate is 5 N/m or less.

2. The circularly polarizing plate according to claim 1, wherein a dehumidification shrinkage force of the circularly polarizing plate is 30 N/m or less.

3. The circularly polarizing plate according to claim 1, wherein both the first light-absorbing anisotropic layer and the second light-absorbing anisotropic layer are layers formed from a liquid crystal composition containing a liquid crystalline compound and a dichroic substance.

4. The circularly polarizing plate according to claim 1, wherein the retardation layer is a layer formed from a liquid crystal composition containing a liquid crystalline compound.

5. The circularly polarizing plate according to claim 1, wherein a total thickness of the circularly polarizing plate is 10 to 100 μm.

6. The circularly polarizing plate according to claim 1, wherein all of the retardation layer, the first light-absorbing anisotropic layer, and the second light-absorbing anisotropic layer are laminated through pressure-sensitive adhesive layers.

7. The circularly polarizing plate according to claim 6, wherein a thickness of one layer of the pressure-sensitive adhesive layers is 2 to 50 μm.

8. The circularly polarizing plate according to claim 6, wherein a storage elastic modulus of the pressure-sensitive adhesive layer is 0.1 to 20 MPa.

9. The circularly polarizing plate according to claim 1, wherein the thermal shrinkage force is 0.1 to 5 N/m.

10. The circularly polarizing plate according to claim 1, wherein a dehumidification shrinkage force of the circularly polarizing plate is 5 to 30 N/m.

11. A self-luminous display device in which the circularly polarizing plate according to claim 1 is bonded to a panel on a viewing side through a pressure-sensitive adhesive layer.

12. The self-luminous display device according to claim 11, wherein the self-luminous display device is used for in-vehicle applications.

13. The circularly polarizing plate according to claim 2, wherein both the first light-absorbing anisotropic layer and the second light-absorbing anisotropic layer are layers formed from a liquid crystal composition containing a liquid crystalline compound and a dichroic substance.

14. The circularly polarizing plate according to claim 2, wherein the retardation layer is a layer formed from a liquid crystal composition containing a liquid crystalline compound.

15. The circularly polarizing plate according to claim 2, wherein a total thickness of the circularly polarizing plate is 10 to 100 μm.

16. The circularly polarizing plate according to claim 2, wherein all of the retardation layer, the first light-absorbing anisotropic layer, and the second light-absorbing anisotropic layer are laminated through pressure-sensitive adhesive layers.

17. The circularly polarizing plate according to claim 16, wherein a thickness of one layer of the pressure-sensitive adhesive layers is 2 to 50 μm.

18. The circularly polarizing plate according to claim 16, wherein a storage elastic modulus of the pressure-sensitive adhesive layer is 0.1 to 20 MPa.

19. The circularly polarizing plate according to claim 2, wherein the thermal shrinkage force is 0.1 to 5 N/m.

20. The circularly polarizing plate according to claim 2, wherein a dehumidification shrinkage force of the circularly polarizing plate is 5 to 30 N/m.

* * * * *